United States Patent
Goyal et al.

(10) Patent No.: US 10,083,200 B2
(45) Date of Patent: Sep. 25, 2018

(54) BATCH INCREMENTAL UPDATE

(71) Applicant: Cavium, Inc., San Jose, CA (US)

(72) Inventors: Rajan Goyal, Saratoga, CA (US);
Kenneth A. Bullis, Los Altos, CA (US); Satyanarayana Lakshmipathi Billa, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 192 days.

(21) Appl. No.: 13/831,415

(22) Filed: Mar. 14, 2013

(65) Prior Publication Data

US 2014/0279850 A1    Sep. 18, 2014

(51) Int. Cl.
*G06F 17/30* (2006.01)

(52) U.S. Cl.
CPC .... *G06F 17/30365* (2013.01); *G06F 17/3007* (2013.01); *G06F 17/30289* (2013.01)

(58) Field of Classification Search
CPC ......... G06F 17/30365; G06F 17/30286; G06F 17/30067; G06F 3/067; G06F 17/30575; G06Q 10/10
USPC ....................................... 707/609
See application file for complete search history.

(56) References Cited

U.S. PATENT DOCUMENTS

| | | | |
|---|---|---|---|
| 5,107,361 A | 4/1992 | Kneidinger et al. | |
| 5,463,777 A | 10/1995 | Bialkowski et al. | |
| 5,909,699 A | 6/1999 | Sarangdhar et al. | |
| 6,233,575 B1 | 5/2001 | Agrawal et al. | |
| 6,298,340 B1 | 10/2001 | Calvignac et al. | |
| 6,467,019 B1 | 10/2002 | Washburn | |
| 6,473,763 B1 * | 10/2002 | Corl et al. | |
| 6,476,763 B2 | 11/2002 | Allen | |
| 6,578,131 B1 | 6/2003 | Larson et al. | |
| 6,587,466 B1 | 7/2003 | Bhattacharya et al. | |
| 6,735,600 B1 | 5/2004 | Andreev | |
| 6,778,530 B1 | 8/2004 | Greene | |
| 6,868,414 B2 | 3/2005 | Khanna et al. | |
| 6,980,555 B2 | 12/2005 | Mar | |

(Continued)

FOREIGN PATENT DOCUMENTS

| | | |
|---|---|---|
| CN | 1535460 A | 10/2004 |
| CN | 101351784 A | 1/2009 |

(Continued)

OTHER PUBLICATIONS http://en.wikipedia.org/Access_control_list, downloaded Feb. 4, 2011.

(Continued)

*Primary Examiner* — Pierre M Vital
*Assistant Examiner* — Andrew N Ho
(74) *Attorney, Agent, or Firm* — Hamilton, Brook, Smith & Reynolds, P.C.

(57) ABSTRACT

A system, apparatus, and method are provided for adding, deleting, and modifying rules in one update from the perspective of an active search process for packet classification. While a search processor searches for one or more rules that match keys generated from received packets, there is a need to add, delete, or modify rules. By organizing a plurality incremental updates for adding, deleting, or modifying rules into a batch update, several operations for incorporating the incremental updates may be made more efficient by minimizing a number of updates required.

45 Claims, 42 Drawing Sheets

(56) References Cited

U.S. PATENT DOCUMENTS

| | | | |
|---|---|---|---|
| 7,023,807 B2 | 4/2006 | Michels et al. | |
| 7,039,641 B2* | 5/2006 | Woo | H04L 63/0263 370/389 |
| 7,415,472 B2* | 8/2008 | Testa | H04L 45/7457 707/999.006 |
| 7,441,022 B1 | 10/2008 | Schuba et al. | |
| 7,509,300 B2* | 3/2009 | Sahni | H04L 45/00 707/999.002 |
| 7,522,581 B2 | 4/2009 | Acharya et al. | |
| 7,536,476 B1* | 5/2009 | Alleyne | 709/238 |
| 7,546,234 B1* | 6/2009 | Deb et al. | 704/9 |
| 7,548,944 B2 | 6/2009 | Sahita | |
| 7,571,156 B1* | 8/2009 | Gupta | H04L 45/00 707/999.003 |
| 7,937,355 B2 | 5/2011 | Corl et al. | |
| 8,005,869 B2* | 8/2011 | Corl, Jr. | H03M 7/30 707/797 |
| 8,156,507 B2 | 4/2012 | Brjazovski et al. | |
| 8,447,120 B2 | 5/2013 | Ji et al. | |
| 8,477,611 B2* | 7/2013 | Lim | G06F 17/30 370/230 |
| 8,856,203 B1 | 10/2014 | Schelp et al. | |
| 8,934,488 B2 | 1/2015 | Goyal et al. | |
| 8,937,952 B2 | 1/2015 | Goyal et al. | |
| 8,937,954 B2 | 1/2015 | Goyal et al. | |
| 9,137,340 B2 | 9/2015 | Goyal et al. | |
| 9,183,244 B2 | 11/2015 | Bullis et al. | |
| 9,191,321 B2 | 11/2015 | Goyal et al. | |
| 9,195,939 B1 | 11/2015 | Goyal et al. | |
| 9,208,438 B2 | 12/2015 | Goyal et al. | |
| 9,430,511 B2 | 8/2016 | Billa et al. | |
| 9,595,003 B1 | 3/2017 | Bullis et al. | |
| 2002/0023089 A1* | 2/2002 | Woo | H04L 43/0876 370/256 |
| 2002/0124086 A1* | 9/2002 | Mar | H04L 29/06 709/226 |
| 2002/0143747 A1 | 10/2002 | Tal et al. | |
| 2003/0115403 A1 | 6/2003 | Bouchard et al. | |
| 2003/0123459 A1* | 7/2003 | Liao | H04L 29/06 370/401 |
| 2003/0135704 A1 | 7/2003 | Martin | |
| 2004/0095936 A1 | 5/2004 | O'Neill et al. | |
| 2005/0013293 A1 | 1/2005 | Sahita | |
| 2005/0240604 A1* | 10/2005 | Corl et al. | 707/100 |
| 2006/0026138 A1 | 2/2006 | Robertson et al. | |
| 2006/0098652 A1* | 5/2006 | Singh | H04L 45/00 370/389 |
| 2006/0136570 A1 | 6/2006 | Pandya | |
| 2006/0155915 A1* | 7/2006 | Pereira | H04L 45/00 711/100 |
| 2006/0221967 A1* | 10/2006 | Narayan | H04L 45/00 370/392 |
| 2006/0253465 A1 | 11/2006 | Willis et al. | |
| 2007/0168377 A1 | 7/2007 | Zabarsky | |
| 2008/0031258 A1 | 2/2008 | Acharya et al. | |
| 2008/0109392 A1 | 5/2008 | Nandy | |
| 2008/0120441 A1 | 5/2008 | Loewenstein | |
| 2008/0140631 A1* | 6/2008 | Pandya | 707/3 |
| 2008/0177994 A1 | 7/2008 | Mayer | |
| 2008/0310440 A1 | 12/2008 | Chen et al. | |
| 2009/0125470 A1 | 5/2009 | Shah et al. | |
| 2009/0185568 A1 | 7/2009 | Cho et al. | |
| 2009/0274384 A1 | 11/2009 | Jakobovits | |
| 2010/0034202 A1* | 2/2010 | Lu et al. | 370/392 |
| 2010/0067535 A1 | 3/2010 | Ma et al. | |
| 2010/0110936 A1* | 5/2010 | Bailey et al. | 370/256 |
| 2010/0175124 A1* | 7/2010 | Miranda | 726/13 |
| 2011/0038375 A1* | 2/2011 | Liu | H04L 45/7453 370/392 |
| 2011/0137930 A1* | 6/2011 | Hao | G06F 17/30958 707/769 |
| 2011/0167416 A1 | 7/2011 | Sager et al. | |
| 2011/0219010 A1* | 9/2011 | Lim | 707/747 |
| 2011/0270889 A1 | 11/2011 | Stevens et al. | |
| 2013/0036102 A1 | 2/2013 | Goyal et al. | |
| 2013/0039366 A1 | 2/2013 | Goyal et al. | |
| 2013/0060727 A1 | 3/2013 | Goyal et al. | |
| 2013/0070753 A1* | 3/2013 | Sahni et al. | 370/351 |
| 2013/0085978 A1 | 4/2013 | Goyal et al. | |
| 2013/0166886 A1 | 6/2013 | Sasanka et al. | |
| 2013/0201831 A1 | 8/2013 | Tal et al. | |
| 2013/0218853 A1 | 8/2013 | Bullis et al. | |
| 2013/0232104 A1 | 9/2013 | Goyal et al. | |
| 2013/0238576 A1 | 9/2013 | Binkert et al. | |
| 2013/0282766 A1 | 10/2013 | Goyal et al. | |
| 2014/0280357 A1 | 9/2014 | Goyal et al. | |
| 2014/0281809 A1 | 9/2014 | Goyal et al. | |
| 2015/0117461 A1 | 4/2015 | Goyal et al. | |
| 2016/0071016 A1 | 3/2016 | Goyal et al. | |

FOREIGN PATENT DOCUMENTS

| | | |
|---|---|---|
| CN | 101501637 A | 8/2009 |
| JP | 2002290447 A | 10/2002 |
| WO | WO 2009/145712 A1 | 12/2009 |
| WO | WO 2013/020002 A1 | 2/2013 |
| WO | WO 2013/020003 A1 | 2/2013 |

OTHER PUBLICATIONS

Baboescu, F., et al., "Packet Classification for Core Routers: Is there an alternative to CAMs?", *Proceedings f the 22nd IEEE Conference on Computer Communications (INFOCOM '03)*, vol. 1, pp. 53-63 (2003).

Baboescu, F. and Varghese, G., "Scalable Packet Classification," *Proceedings of the ACMSIGCOMM '01 Conference on Applications, Technologies, Architectures, and Protocols for Computer Communication (SIGCOMM '01)*, pp. 199-210 (2001).

Gupta, P. and McKeown, N. "Packet Classification on Multiple Fields," *Proceedings of SIGCOMM '99 Conference on Applications, Technologies, Architectures, and Protocols for Computer Communication (SIGCOMM '99)*, pp. 147-160 (1999).

Gupta, P. and McKeown, N. "Classifying Packets With Hierarchical Intelligent Cuttings," *IEEE Micro*, 20(1):34-41 (2000).

Qi, Y., et al., "Packet Classification Algorithms: From Theory to Practice," *Proceedings of the 28th IEEE Conference on Computer Communications (INFOCOM '09)*, pp. 648-656 (2009).

Singh, S., et al., "Packet Classification Using Multidimensional Cutting," *Proceedings of the ACMSIGCOMM '03 Conference on Applications, Technologies, Architectures, and Protocols for Computer Communication (SIGCOMM '03)*, pp. 213-224 (2003).

Fong et al., HaRP: Rapid Packet Classification via Hashing Round-Down Prefixes, *IEEE Transactions on Parallel and Distributed Systems, IEEE Service Center*, v. 22(7), pp. 1105-1119 (2011).

Gupta, P., "Algorithms for Packet Routing Lookups and Packet Classification," Dissertation submitted to the Dept. of Comp. Science of Stanford Univ. (Dec. 2000).

Zhang, B., et al., "On Constructing Efficient Shared Decision Trees for Multiple Packet Filters," Dept. Computer Science Rice University (2010).

Abdelghani, M., et al. "Packet Classification Using Adaptive Rule Cutting," IEEE Proc. of Adv. Indus. Conf. on Telecom. (2005).

Yu, L., et al., "A Novel IP Packet Classification Algorithm Based on Hierarchical Intelligent Cuttings," IEEE 6th Int. Conf. on Its Telecom. Proceedings 1033-1036 (2006).

Office Action for U.S. Appl. No. 13/565,775, dated Aug. 26, 2014.

Office Action for U.S. Appl. No. 13/565,775, dated Feb. 9, 2015.

Notice of Allowance for U.S. Appl. No. 13/565,775, dated Jul. 13, 2015.

Theiling, Henrik "Generating Decision Trees for Decoding Binaries" ACM 2001 [ONLINE] Downloaded Jul. 14, 2015 http://delivery.acm.org/10.1145/390000/384213/p112-theiling.pdf?ip=151.207.250.51&id=384213&acc=ACTIVE%20SERVICE&key=C15944E53D0ACA63%2E4D4702B0C3E38B35%2 E4 D4 702B0C3 E38B35%2E4 D4 702B0C3 E38B35&C FID=528083660&C FTOKEN=15678279& acm=1436903293 abc.

Office Action for U.S. Appl. No. 14/207,928, dated Nov. 10, 2015.

(56) References Cited

OTHER PUBLICATIONS

Notice of Allowance for U.S. Appl. No. 14/207,928, dated May 4, 2016.

* cited by examiner

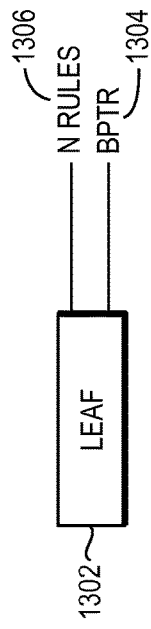
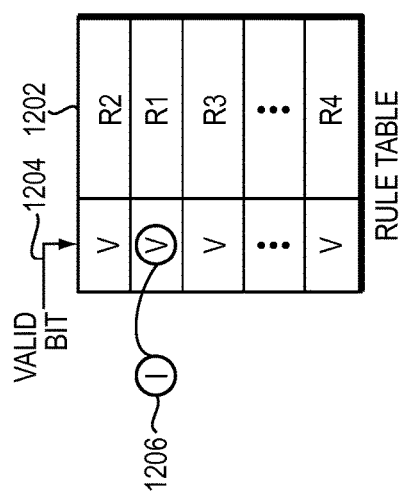
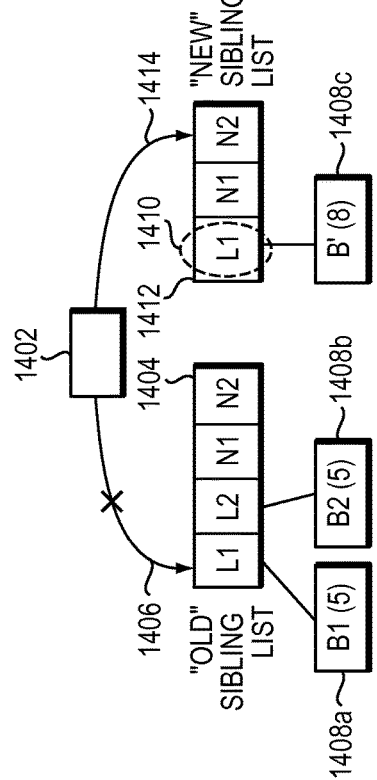
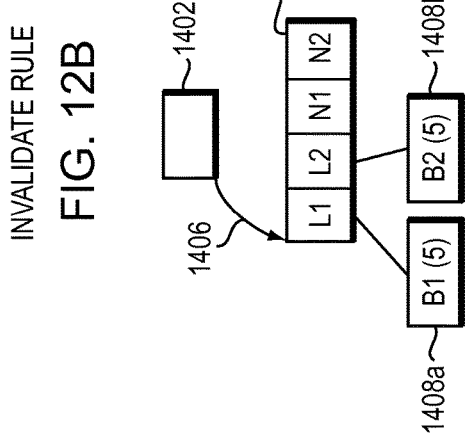

[Add a rule]                                            ─ 1900
    Append a rule and its priority to the rule table
        Write new row at end of table
        RMW last row of table
        Adjust priorities of a range of rules
            RMW a series of rows of the priority table
    Replace an invalidated rule with a new one
        RMW row(s) containing rule
    Add rule to bucket
        Create new version of bucket containing the rule
            Write the row(s) containing the bucket
        Update the leaf(s) pointing to the bucket
            RMW each leafs row

FIG. 19A

[Split leaf into node and leaves]                       ─ 1902
    Create node
        RMW row containing the node
    Find or create new buckets
        Write or RMW row(s) containing buckets
    Create array of leaves under node (1a)
        Write or RMW row(s) containing leaves
    Create array of leaf indices under node (2,3)
        Write or RMW row(s) containing leaf indices
    Find or create unique leaves (2,3)
        Write or RMW row(s) containing new leaves

FIG. 19B

[Add bucket to node]                                    ─ 1904
    Replace hole in node/leaf array with new leaf (1a)
        RMW row containing new leaf
    Replace hole in array of leaf indices with new leaf index (2,3)
        RMW row containing new leaf
    Create new array containing new leaf (1a)
        RMW row(s) containing new array
    Find or create new unique leaf (2,3)
        Write or RMW row(s) containing new leaf
    Create new array containing new leaf index (2,3)
        RMW row(s) containing new array
    Update node with new hash mask (1a)
        RMW row containing node
    Find or create bucket with specified rule list
        RMW row(s) containing bucket

FIG. 19C

```
[Recompile subtree]                                    1906
    Update root node of subtree
        Update the node itself
            RMW row containing subtree root node
        Create node/leaf array (1a)
            Write or RMW row(s) containing array
        Create node array (2,3)
            Write or RMW row(s) containing array
        Create leaf index array (2,3)
            Write or RMW row(s) containing array
        Find or create new unique leaves (2,3)
            Write or RMW row(s) containing new leaves Update pointer to root of tree
        Update TAT
    Create node and array
        Create node
            RMW row containing node
        Create node/leaf array (1a)
            Write or RMW row(s) containing array
        Create node array (2,3)
            Write or RMW row(s) containing array
        Create leaf index array (2,3)
            Write or RMW row(s) containing array
        Find or create new unique leaves (2,3)
            Write or RMW row(s) containing new leaves
```

FIG. 19D

```
[Delete a rule]
    Invalidate rule                                    1908
        Clear "valid" bit in rule
            RMW row containing the bit Remove rule from all buckets that reference it
        Remove rule from a bucket
            Create new bucket not containing rule
                Write or RMW row(s) containing bucket Mark leaf as empty (# rules = 0)
        RMW row containing leaf Shrink node/leaf array (1a)
        Update node's hash mask
            RMW row containing node
        Create new, smaller array
            Write or RMW row(s) containing array
```

FIG. 19E

[Modify a rule]　　　　　　　　　　　　　　　　　　← 1910
　　Set rule definition to intersection of old and new versions
　　　　RMW row(s) containing rule Set rule definition to new version
　　　　RMW row(s) containing rule

FIG. 19F

[Defragment]　　　　　　　　　　　　　　　　　　← 1912
　　Copy array of nodes and leaves (1 a)
　　　　Non-overlapping memory copy, half-row-aligned
　　Copy arrays of nodes and leaf indices (2,3)
　　　　Non-overlapping memory copy, half-row-aligned
　　Update node cptr to point to new array
　　　　RMW of row containing node
　　Copy bucket
　　　　RMW the row(s) containing bucket
　　Update leaves to point to new bucket
　　　　RMW the row(s) containing the leaves

FIG. 19G

BATCH INCREMENTAL UPDATE

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY OF THE INVENTION

According to one embodiment, a method may comprise receiving a batch update including a plurality of incremental updates for a Rule Compiled Data Structure (RCDS) representing a decision tree for a set of rules used for packet classification. The RCDS may be utilized for packet classification by an active search process. The method may update the set of rules and one or more rule lists based on the batch update received. Each of the one or more rule lists may be a subset of the set of rules associated with a category subtree of a housekeeping tree. The housekeeping tree may be an augmented representation of the RCDS. The method may update the housekeeping tree associated with each category subtree associated with the one or more rule lists updated. The method may build a changeset specifying one or more modifications to the RCDS based on the housekeeping tree updated. The method may apply the changeset built to the RCDS in a manner enabling the RCDS to atomically incorporate the plurality of incremental updates from the perspective of the active search process utilizing the RCDS.

A number of operations triggered by the plurality of incremental updates included in the batch update received may be less than another number of operations triggered by the plurality of incremental updates received on an incremental basis.

Applying the changeset built to the RCDS may include issuing a number of instructions to a device. The number of instructions and a size of the changeset built may be reduced in comparison to a cumulative number of instructions and a cumulative changeset size. The cumulative number of instructions and the cumulative changeset size may correspond to the plurality of incremental updates being received on an incremental basis.

The method may comprise determining one or more rule priority changes based on the batch update received. The method may include the one or more rule priority changes determined in the changeset built.

The method may comprise updating a shadow image based on the changeset built. The shadow image may reflect current resources being held by the RCDS and changes to the current resources being held based on the one or more modifications to the RCDS specified. The method may determine an update status indicating success or failure for one or more updates to the housekeeping tree and the shadow image. The method may determine a commit or partial rollback action based on the update status. The commit action may be determined given the update status indicates success and the partial rollback action may be determined given the update status indicates failure.

Applying the changeset built to the RCDS may be dependent on the commit action being determined.

The partial rollback action may include restoring the set of rules and the one or more rule lists by backing out updates made based on the batch update received. The partial rollback action may include restoring the housekeeping tree and the shadow image by rolling back the changeset, preventing the applying of the changeset built to the RCDS, and deleting the changeset built.

Restoring the housekeeping tree by rolling back the changeset may include restoring at least one bucket directly in a bucket database, restoring leaf nodes linked to the at least one bucket being restored, and restoring nodes linked to the leaf nodes being restored.

Restoring the shadow image by rolling back the changeset may include freeing memory allocated based on updating the shadow image.

The decision tree may include a plurality of nodes, each node may represent one or more rules of the set of rules. Each node may have a leaf node type or a non-leaf node type. Each node having the leaf node type may be a leaf node linked to a bucket representing rules of the leaf node. The one or more modifications specified by the changeset may include changes to one or more of the plurality of nodes. Each change may include a location, old value, and new value associated with the change.

The batch update received may includes an add, delete, or modify rule operation, or a combination thereof.

Applying the changeset built to the RCDS in the manner enabling the RCDS to atomically incorporate the plurality of incremental updates may include enabling a given search of the active search process to view the RCDS in either a before state or an after state. The before state may be a state of the RCDS before receiving the batch update for the RCDS, the after state may be another state of the RCDS having the series of one or more updates based on the changeset incorporated in the RCDS. The after state may be made visible to the given search based on a single update to the RCDS being searched.

Updating the housekeeping tree associated with each category subtree associated with the one or more rule lists updated may include adding a new rule based on the batch incremental update including an add rule operation, deleting an existing rule based on the batch incremental update including a delete rule operation, and modifying the existing rule based on the batch incremental update including a modify rule operation. Modifying the existing rule may include at least one of: modifying a priority of the existing rule or modifying at least one field of the existing rule.

Modifying the priority of the existing rule may include identifying a priority fit conflict based on a change in priority of the existing rule being inconsistent with a current priority ordering of the existing rule and one or more other rules, modifying the priority of the existing rule based on the priority fit conflict not being identified, and modifying the priority of the existing rule and priority of another rule based on the conflict being identified.

Modifying at least one field of the existing rule may include determining whether one or more rules need to be added or deleted and adding or deleting the one or more rules.

The decision tree may include a plurality of nodes, each node representing one or more rules of the set of rules. The batch incremental update received may include add, delete, or modify operations. The method may further comprise including a cover list of rules for each rule of a node in the housekeeping tree, building the changeset specifying one or more rules to add, delete, or modify based on the batch incremental update received and the cover list, and updating the cover list based on the changeset determined.

Another example embodiment disclosed herein includes an apparatus corresponding to operations consistent with the method embodiments described above.

Further, yet another example embodiment may include a non-transitory computer-readable medium having stored thereon a sequence of instructions which, when loaded and executed by a processor, causes the processor to complete methods consistent with the method embodiments described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 12B shows a rule table with rules according to one embodiment.

FIG. 13 shows a leaf pointing to a bucket and a rule counter according to one embodiment.

FIG. 14A illustrates an embodiment for deleting a rule.

FIG. 14B shows that to merge two buckets, according to one embodiment, includes creating a bucket.

FIG. 19A illustrates an incremental update according to another embodiment for adding a rule.

FIG. 19B illustrates an incremental update according to another embodiment for splitting a leaf into a node and leaves.

FIG. 19C illustrates an incremental update according to another embodiment for adding a bucket to a node.

FIG. 19D illustrates an incremental update according to another embodiment for recompiling a subtree.

FIG. 19E illustrates an incremental update according to another embodiment for deleting a rule.

FIG. 19F illustrates an incremental update according to another embodiment for modifying a rule.

FIG. 19G illustrates an incremental update according to another embodiment for defragmentation.

DETAILED DESCRIPTION OF THE INVENTION

A description of example embodiments of the invention follows.

The teachings of all patents, published applications and references cited herein are incorporated by reference in their entity.

Complexity of network applications is increasing due to the increasing number of network applications being implemented in network devices. Packet classification is widely used for various kinds of applications, such as service-aware routing, intrusion prevention and traffic shaping. Packet classification solutions are required to handle the exponentially increasing traffics on edge, access, and core devices.

Figure 1:
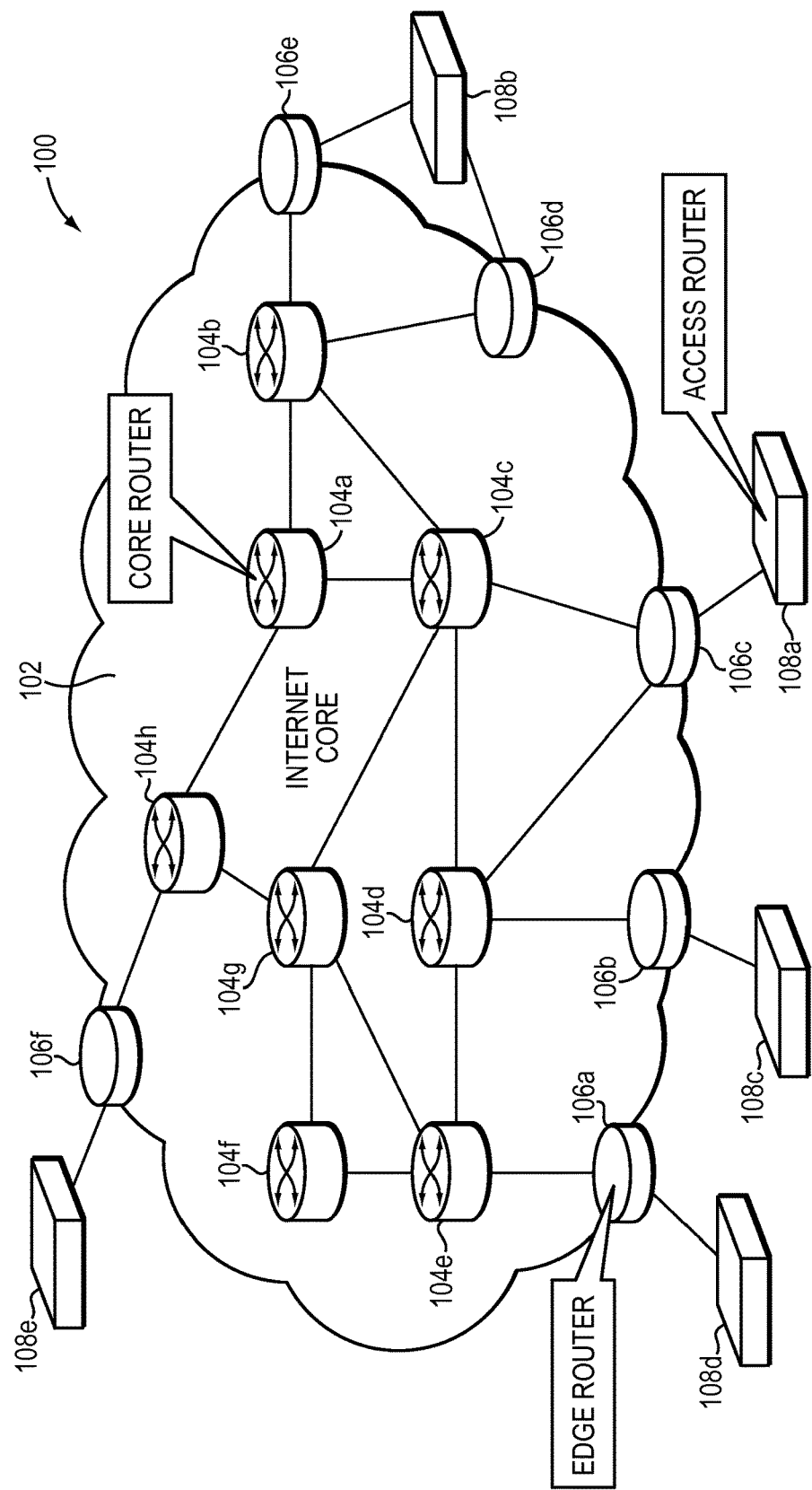
FIG. 1 is a block diagram of a typical network topology including network elements that may employ techniques disclosed herein.

FIG. 1 is a block diagram 100 of a typical network topology including network elements that may employ techniques disclosed herein. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102 (e.g., core routers 104b-e and 104h) are coupled with at least one edge router 106a-f. Each edge router 106a-f is coupled to at least one access router 108a-e.

The core routers 104a-h may be configured to operate in the Internet core 102 or Internet backbone. The core routers 104a-h may be configured to support multiple telecommunications interfaces of the Internet core 102 and may further be configured to forward packets at a full speed of each of the multiple telecommunications protocols.

The edge routers 106a-f may be placed at the edge of the Internet core 102. Edge routers 106a-f may bridge access routers 108a-e outside the Internet core 102 and core routers 104a-h in the Internet core 102. Edge routers 106a-f may be configured to employ a bridging protocol to forward packets from access routers 108a-e to core routers 104a-h and vice versa.

The access routers 108a-e may be routers used by an end user, such as a home user or an office, to connect to one of the edge routers 106a-f, which in turn may connect to the Internet core 102 by connecting to one of the core routers 104a-h. In this manner, the edge routers 106a-f may connect to any other edge router 106a-f via the edge routers 106a-f and the interconnected core routers 104a-h.

The processors described herein may reside in any of the core routers 104a-h, edge routers 106a-f, and access routers 108a-e. The search processor described herein, within each of these routers, may be configured to analyze (e.g., classify) Internet Protocol (IP) packets based on a set of rules and forward the IP packets along an appropriate network path. Packet classification must be intelligent to handle diverse types of rule sets without significant loss of performance. In addition, new technologies, such as multi-core processors provide unprecedented computing power, as well as highly integrated resources. Thus, packet classification solutions must be well suited to advanced hardware and software technologies.

Existing packet classification methods trade memory for time. Although the tradeoffs have been constantly improving, the time taken for a reasonable amount of memory is still generally poor. Because of problems with existing methods, vendors use Ternary Content-Addressable Memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header can be presented to a TCAM to determine which entry (rule) it matches. However, the complexity of TCAMs has allowed only small, inflexible, and relatively slow implementations that consume a lot of power. Therefore, a need continues for efficient methods operating on specialized data structures.

Current methods remain in the stages of mathematical analysis and/or software simulation (observation based solutions). Proposed mathematic solutions have been reported to have excellent time/special complexity. However, methods of this kind have not been found to have any implementation in real-life network devices because mathematical solutions often add special conditions to simplify a problem and/or omit large constant factors which might conceal an explicit worst-case bound. Proposed observation based solutions employ statistical characteristics observed in rules to achieve efficient solution for real-life applications. However, these methods generally only work well with specific type of rule sets. Because packet classification rules for different applications have diverse features, few observation based methods are able to fully exploit redundancy in different types of rule sets to obtain stable performance under various conditions.

Packet classification may be performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to according to criteria on 'F' fields of the packet header and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier (class ID) of the rule among them that appears first in the classifier.

Techniques disclosed herein may employ a decision tree that is used to match received packets with rules. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities.

As described herein, a processor, such as a search processor, may use a decision tree to select to match a received packet with a rule in a classifier table to determine how to process receive packets. Before runtime, rules may be compiled off-line and downloaded into a search processor. During runtime, packets flow through the search processor. The search processor may generate keys from the packets, search for one or more rules matching the keys, and return results of a match found or not found. While the search processor searches for one or more rules that match keys (e.g., the search processor is performing an active search process), there may be a need to add, delete or modify rules—an incremental update. According to techniques as disclosed herein, the search processor may add, delete or modify rules without affecting the ability of the search processor to search for one or more rules that match keys, in terms of both performance (e.g., how many packets are searched per a unit of time) and functionality.

Figure 2A:
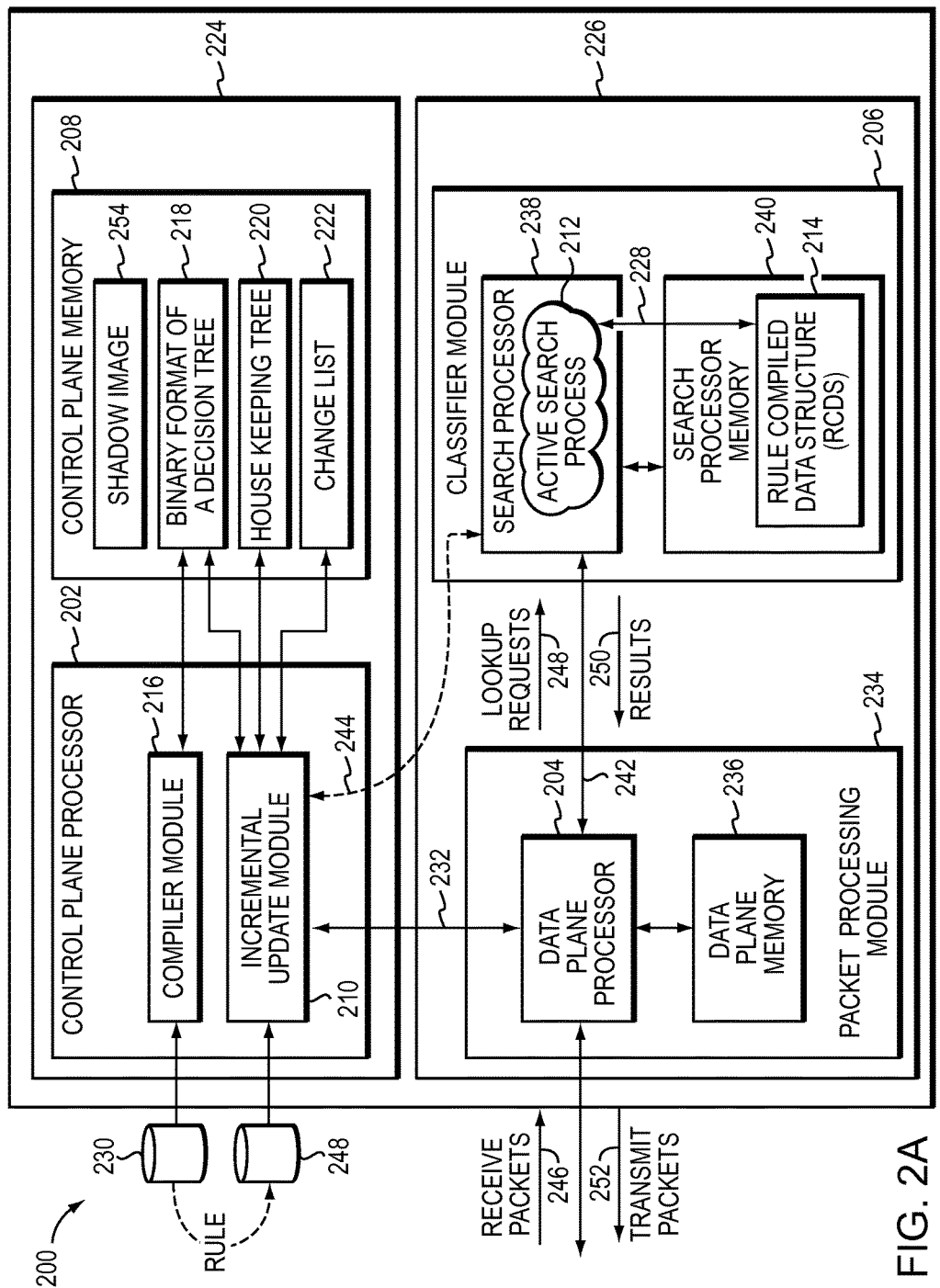
FIG. 2A illustrates one embodiment of a system including a control plane apparatus and a data plane apparatus that atomically updates a Rule Compiled Data Structure (RCDS).

FIG. 2A illustrates a system 200 including a control plane apparatus 224 and a data plane apparatus 226 that atomically updates a Rule Compiled Data Structure (RCDS) 214 from the perspective of an active search process 212 utilizing (228) the Rule Compiled Data Structure (RCDS) 214.

The control plane apparatus 224 may include a control plane processor 202 that may include a compiler module 216, an incremental update module 210, and may be coupled to control plane memory 208. The control plane memory 208 may include a binary format of a decision tree 218, a shadow image (254), a housekeeping tree 220, and a change list 222 (also referred to herein as a changeset). The compiler module 216 may be configured to receive a rule file 230 and to compile the received rule file into the binary format of the decision tree 218 (e.g., a data structure).

Figure 2B:
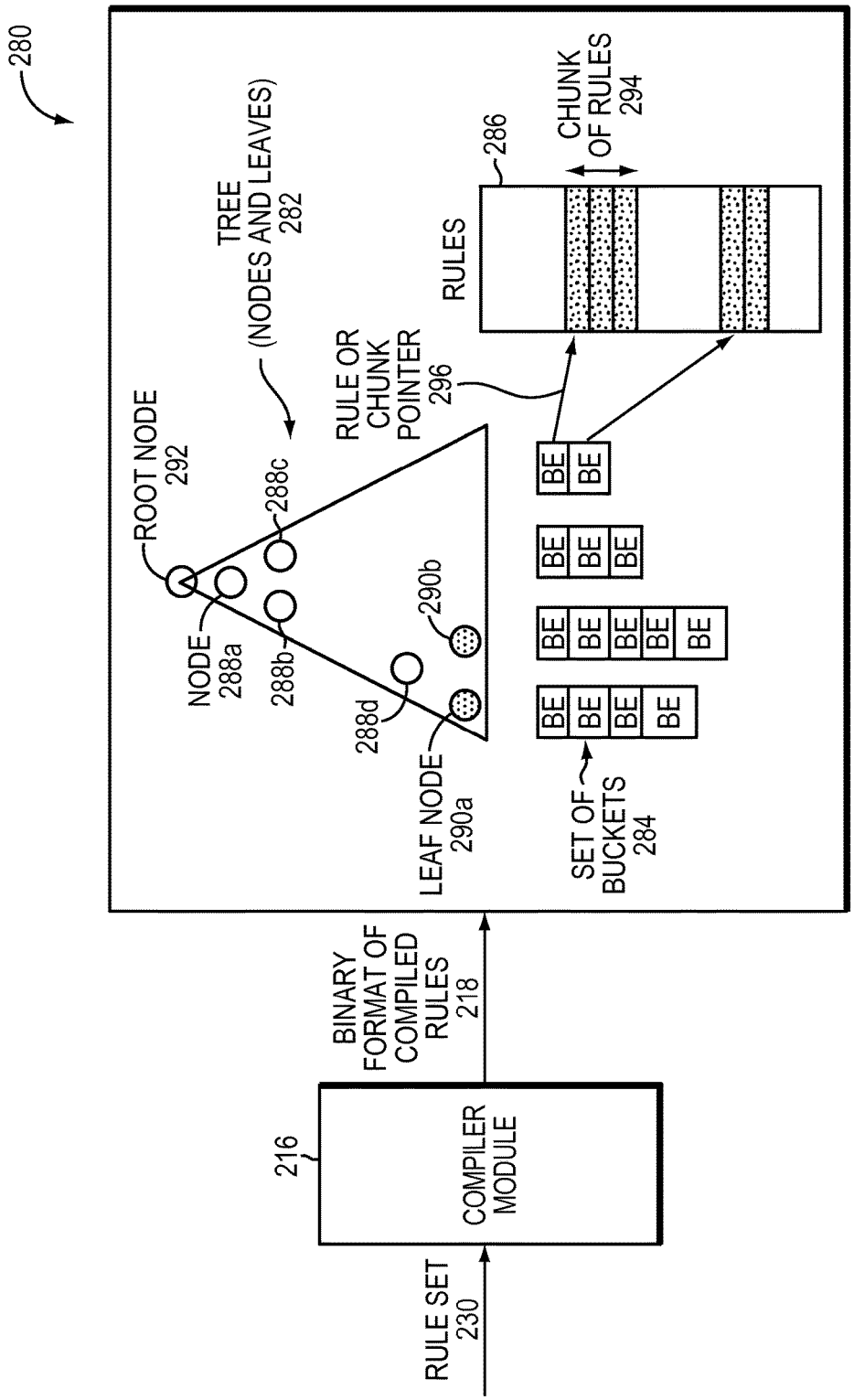
FIG. 2B is a block diagram illustrating an example embodiment of the compiler module loading rules into a memory structure.

FIG. 2B is a block diagram illustrating an example embodiment of the compiler module 216 loading rules into a memory structure. The compiler module 216 receives a rule set 230. The compiler module 216 generates a binary format of compiled rules (218). The binary format of compiled rules (218) includes a tree 282, buckets 284 and rules 286. The tree 282 includes nodes 288*a-d*, leaf nodes 290*a-b*, and a root node 292. Each leaf node 290*a-b* of the tree 282 points to one of a set of buckets 284.

Each bucket is a data structure that may include one or more bucket entries. A bucket entry may be a rule, an index to a rule, a pointer to a rule, a pointer to a set of rules, or a pointer to another bucket. A bucket may include entries including any combination thereof. For example, a bucket may have one entry that is a pointer to a rule and one entry that is a pointer to a set of rules, etc.

Each bucket may include bucket entries which may contain rule or chunk pointers 296. The rules 286 may include chunks of rules 294. A chunk 294 (of rules) can be a sequential group of rules, or a group of rules scattered throughout the memory, either organized by a plurality of pointers or by recollecting the scattered chunk 294 (e.g., using a hash function).

The binary format of the decision tree 218 may be downloaded to the data plane apparatus 226 over an interface 232. The interface 232 may be a Peripheral Component Interconnect Express (PCIe) interface, Intelligent Interface Controller (I2C) interface, or any other suitable interface that may be known to one skilled in the art.

The data plane apparatus may include a packet processing module 234 that includes a data plane processor 204 coupled to a data plane memory 236. The packet processing module 234 may be coupled to a classifier module 206 that may also be included in the data plane apparatus 226. The classifier module 206 may include a search processor 238 that may be coupled to a search processor memory 240. The data plane processor 204 may be coupled to the search processor 238 by an interface, such as an Interlaken look aside interface, or any other suitable interface that may be known by one skilled in the art.

The binary format of the decision tree 218 may be downloaded to the classifier module 206 over the interface 242 and stored as the Rule Compiled Data Structure (RCDS) 214 that may be included in the search processor memory 240. Alternatively, the binary format of the decision tree 218 may be downloaded over interface 244 to the search processor 238 and stored as the Rule Compiled Data Structure (RCDS) 214. The interface 244 may be an Intelligent Interface Controller (I2C) interface, or any other suitable interface that may be known to one skilled in the art.

The incremental update module 210 may receive a rule, or rule operation, for adding, deleting or modifying rules for the Rule Compiled Data Structure (RCDS). The incremental update module 210 may use the binary format of the decision tree 218 and housekeeping tree 220 to create a change list 222 for atomically updating the Rule Compiled Data Structure 214. The housekeeping tree 220 may be an augmented representation of the Rule Compiled Data Structure (RCDS) 214 including additional information of the tree in order to determine one or more updates for the tree. The shadow image 254 may reflect current resources being held by the RCDS 214 and changes to the current resources that will be applied based on the change list 222.

The housekeeping tree 220 may include and maintain information for each rule in the tree, such as a cover list. A cover list may include a set of rules that are covered by the rule, or not added to the tree because of a higher priority rule. Covered rules are "useless" rules because they are not matched. By maintaining a cover list for each rule, the incremental update module 210 may determine when to add and delete rules. For example, if a rule is to be deleted, the incremental update module 210 may determine to add one or more rules that were not added previously because they were covered by the rule now being deleted. If the covering rule is deleted, the previously "useless" rules may now be useful as there is a possibility that they may be matched on. Cover lists are one example of rule information that may be included and maintained in the housekeeping tree, other rule information may also be included in order to assist the incremental update in determining tree updates.

The change list may specify one or more commands for atomically updating the Rule Compiled Data Structure (RCDS) 214 stored in the search processor memory 240. On the other hand, it may be that a Rule Compiled Data Structure (RCDS) 214 is not stored because the compiler module 216 has not compiled the binary format of the decision tree 218. In that case, the incremental update module 210 may create a change list 222 that creates the Rule Compiled Data Structure (RCDS) 214. The change list 222 may be communicated to the data plane apparatus 226 over the interface 232 and then communicated to the search processor 238 over the interface 242. Alternatively, the change list 222 may be communicated to the search processor 238 over the interface 244. The Rule Compiled Data Structure 214 may be used by an active search process 212 to classify received packets 246.

The packet processing module 234 may be configured to transmit packets 252 and receive packets 246. The data plane processor 204 may send lookup requests 248 to the search processor 238 and receive results 250 from the search processor 238. The search processor 238 may be configured to find one or more rules (matching rules) that match a packet by utilizing the Rule Compiled Data Structure (RCDS) 214. For example, a packet may be broken down into parts, such as a header, payload, and trailer. The header of the packet (or packet header) may be further broken down into fields. The search processor 238 may be configured to find one or more rules that match one or more parts of a received packet.

The lookup request 248 may includes a packet header and group identifier (GID). The GID may index an entry in a global definition/description table (GDT). Each GDT entry may include n number of table identifiers (TID), a packet header index (PHIDX), and a key format table index (KFTIDX). Each TID may index an entry in a tree location table (TLT). Each TLT entry may identify a lookup engine (e.g., search processor) to look for the one or more matching rules. In this way, each TID may specify both who will look for the one or more matching rules and where to look for the one or more matching rules.

Each table identifier (TID) may also index an entry in a tree access table (TAT). A TAT may be used in the context in which multiple lookup engines, grouped together in a cluster, look for the one or more matching rules. Each TAT entry may provide the starting address, in memory, of a collection of rules (or pointers to rules) called a table or tree of rules. The terms table of rules or tree of rules (or simply table or tree) are used interchangeably throughout the disclosure. The TID identifies which collection or set of rules, such as the Rule Compiled Data Structure 214, in which to look for one or more matching rules.

The packet header index (PHIDX) may index an entry in a packet header table (PHT). Each entry in the PHT may describe how to extract n number of keys from the packet header. The key format table index (KFTIDX) may index an entry in a key format table (KFT). Each entry in the KFT may provide instructions for extracting one or more fields (e.g., parts of the packet header) from each of the n number of keys, which were extracted from the packet header.

Each of the extracted fields, together with each of the TIDs, all of which were derived starting with the lookup request, may used to look for subsets of the rules. Each subset contains rules that may possibly match each of the extracted fields. Each rule of each subset may be compared against an extracted field. Rules that match may be provided in responses (e.g., lookup responses) as results 250.

The lookup request and its enumerated stages, as described above, are being provided merely to present concepts. These concepts may be implemented in numerous ways. For example, according to example embodiments of the present invention, these concepts may be implemented by a search processor, such as search processor 238.

Figure 3:
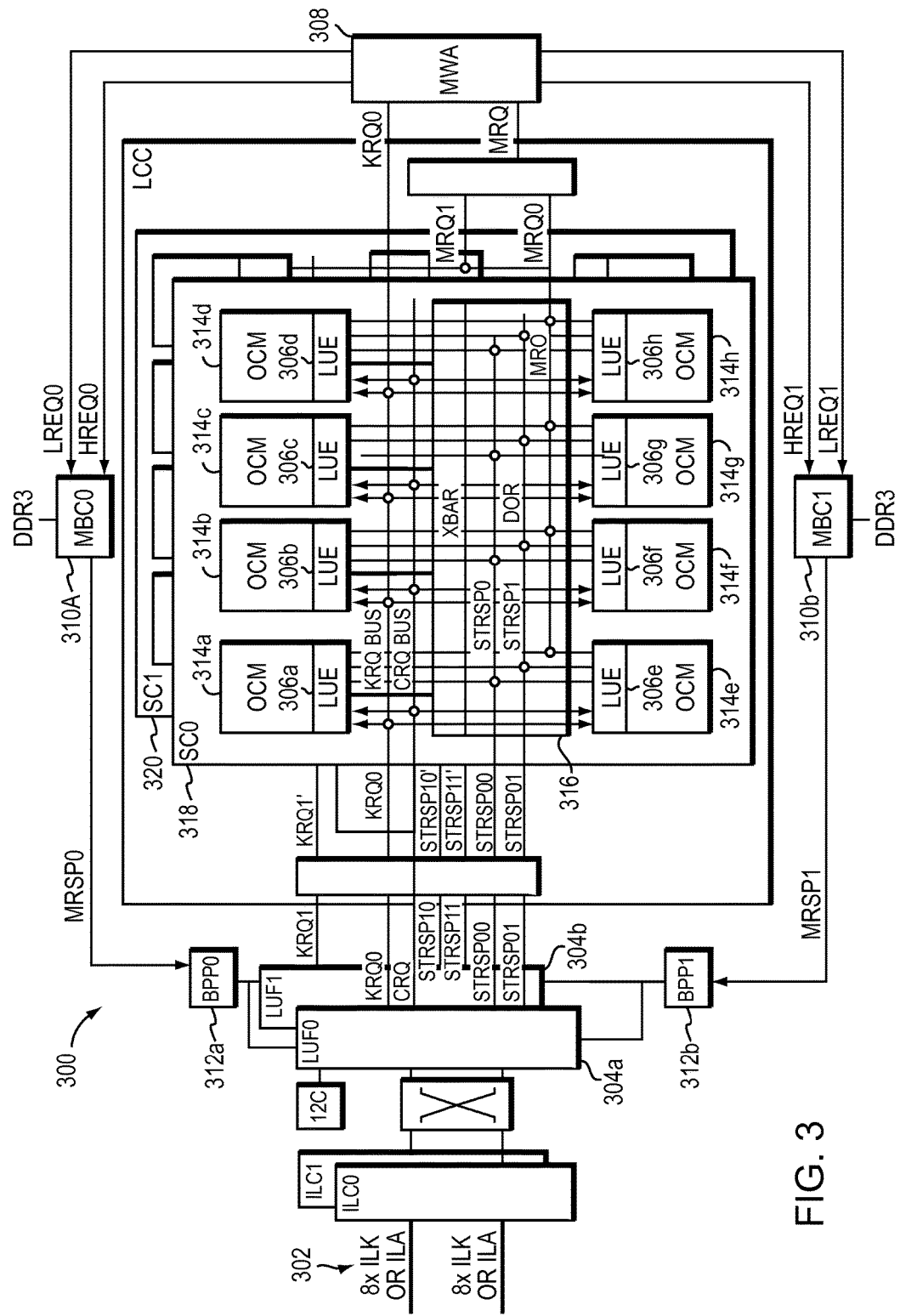
FIG. 3 shows the architecture of one embodiment of a search processor.

FIG. 3 shows the architecture of an example search processor 300 that provides for finding one or more rules that match one or more parts of a packet for packet classification, which may be referred to as "rule processing." The processor includes, among other things, an interface (e.g., Interlaken LA interface) 302 to receive requests from a host (e.g., data plane processor 204) and to send responses to the host; Lookup Front End (LUFs) 304*a-b* to process, schedule, and order the requests and responses; Lookup Engines (LUEs) 306*a-h* to look for rules, given the request, that match keys for packet classification; memory walker aggregator (MWA) 308 and memory block controllers (MBCs) 310*a-b* to coordinate reads and writes to memory located external to the processor (not shown); and Bucket Post Processor (BPPs) 312*a-b* to look for rules, which are stored in memory located external to the processor (not shown), that match keys for packet classification.

As shown in FIG. 3, the LUE is associated with on-chip memory 314*a-h*. Also shown in FIG. 3, multiple LUE 306*a-h* and their associated on-chip memories 314*a-h*, together with a cross bar device 316 are organized into a super cluster SC0 318. The example search processor may have more than one of such super clusters (e.g., SC0 318 and SC1 320).

Figure 4:
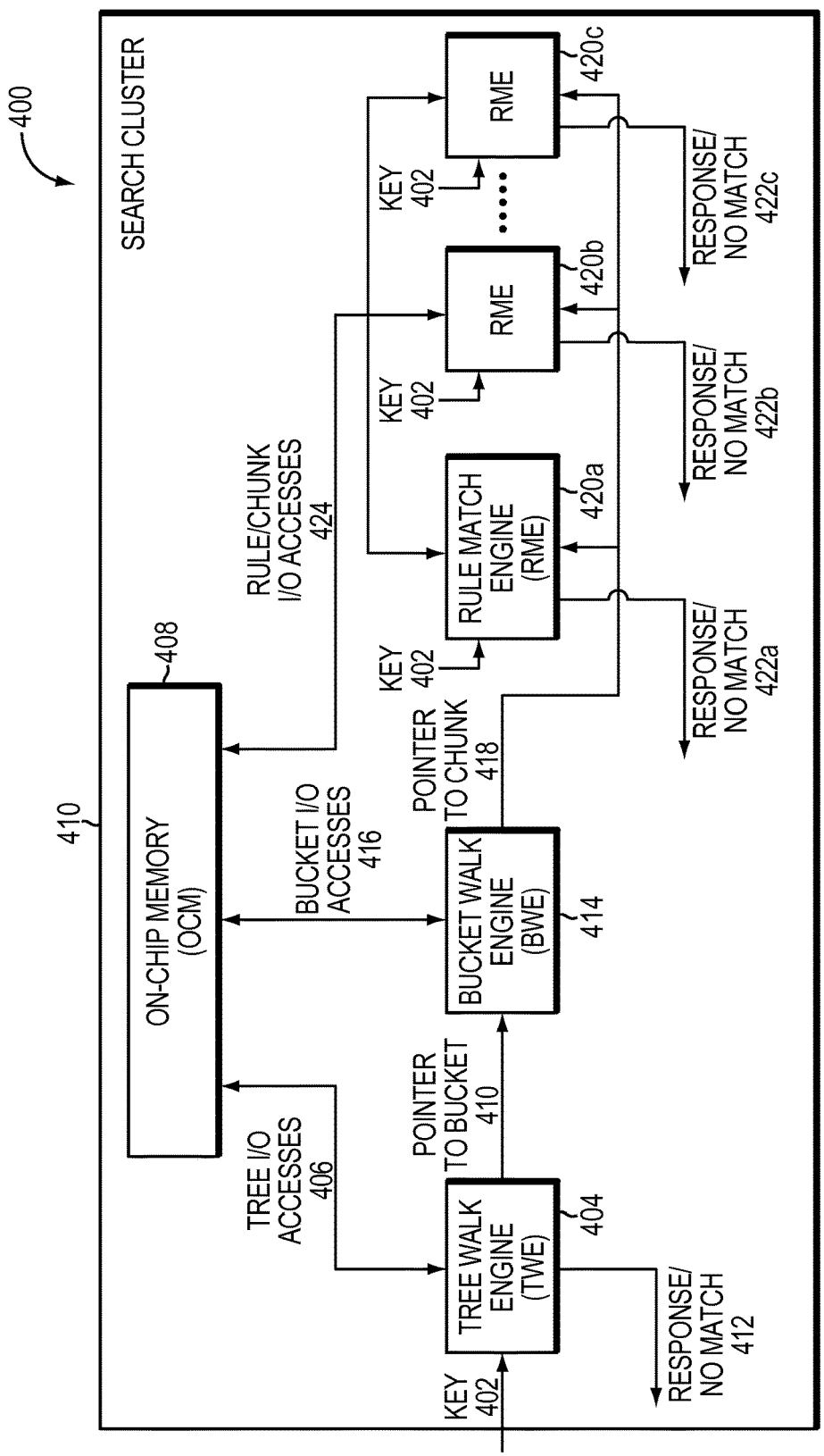
FIG. 4 is a block diagram illustrating an example embodiment of a search block or search cluster.

FIG. 4 is a block diagram 400 illustrating an example embodiment of a search block or search cluster 410. To highlight the operation of the example search processor, in reference to FIG. 2A, the search cluster 410 includes an on-chip memory (OCM) 408, a tree walk engine (TWE) 404, a bucket walk engine (BWE) 414 and a plurality of rule match engines (RME) 420*a-c*. The OCM 408 stores the Rule Compiled Data Structure (RCDS) as a tree data structure, a bucket storage data structure, and a chunk and/or rule data structure. The terms tree and Rule Compiled Data Structure (RCDS) are used interchangeably, herein. The tree data structure may include the bucket storage data structure, and the chunk and/or rule data structure.

The search cluster 410 receives a key 402 from the LUF 304a-b (FIG. 3) at the TWE 404. The TWE 404 issues and receives a plurality of tree input/output (I/O) accesses 406 to the OCM 408. Based on the key 402, the TWE 404 walks the tree from a root node to a possible leaf node. If the TWE 404 does not find an appropriate leaf node, the TWE 404 issues a no-match 412 (e.g., a no match). Then, if the TWE 404 finds an appropriate leaf node, the leaf node can indicate a pointer 410 to a bucket. The TWE 404 provides the pointer 410 to the bucket to the BWE 414. The BWE 414 accesses the OCM 408 by issuing bucket I/O accesses 416 to the OCM 408. The bucket I/O accesses 416 retrieve at least one pointer 418 to a chunk to the BWE 414. The BWE 414 provides the pointer 418 to the chunk to one of the plurality of RMEs 420a-c. The one of the chosen RMEs 420a-c also receives the key 402. Each of the plurality of RMEs 420a-c are configured to issue rule and/or chunk I/O accesses 424 to the OCM 408 using the pointer 418 to the chunk to download appropriate rules from the chunk in the OCM to analyze the key 402. The RMEs 420a-c then analyze the key using the rules accessed from the OCM 408 and issue a response or no-match 422a-c corresponding to whether the key matched the rule or chunk indicated by the tree and bucket stored in the OCM 408.

Having provided (in reference to FIG. 1) an overview of the search processor and its implementation of a lookup request, embodiments for incremental update of the Rule Compiled Data Structure (RCDS) 214 are now described. As described, the search processor should add, delete or modify rules without affecting the ability of the search processor to search for one or more rules that match keys, in terms of both performance (e.g., how many packets are searched per a unit of time) and functionality.

Figure 5A:
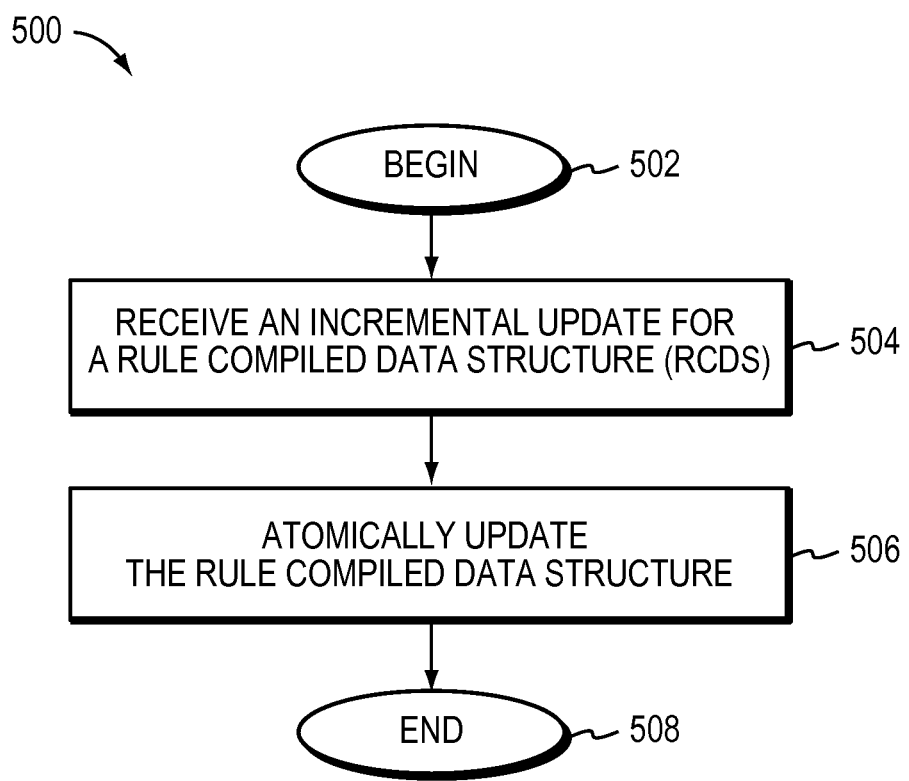
FIG. 5A is a flow diagram of one embodiment of a method for an incremental update for a Rule Compiled Data Structure (RCDS) according to one embodiment.

FIG. 5A is a flow diagram of a method 500 that begins (502) and may receive an incremental update for a Rule Compiled Data Structure (RCDS) (504) according to one embodiment. The Rule Compiled Data Structure (RCDS) may represent a set of rules for packet classification. The Rule Compiled Data Structure (RCDS) may be utilized for packet classification by an active search process and atomically updated based on the incremental update received, from the perspective of the active search process utilizing the Rule Compiled Data Structure (RCDS) (506) and end (508).

Figure 5B:
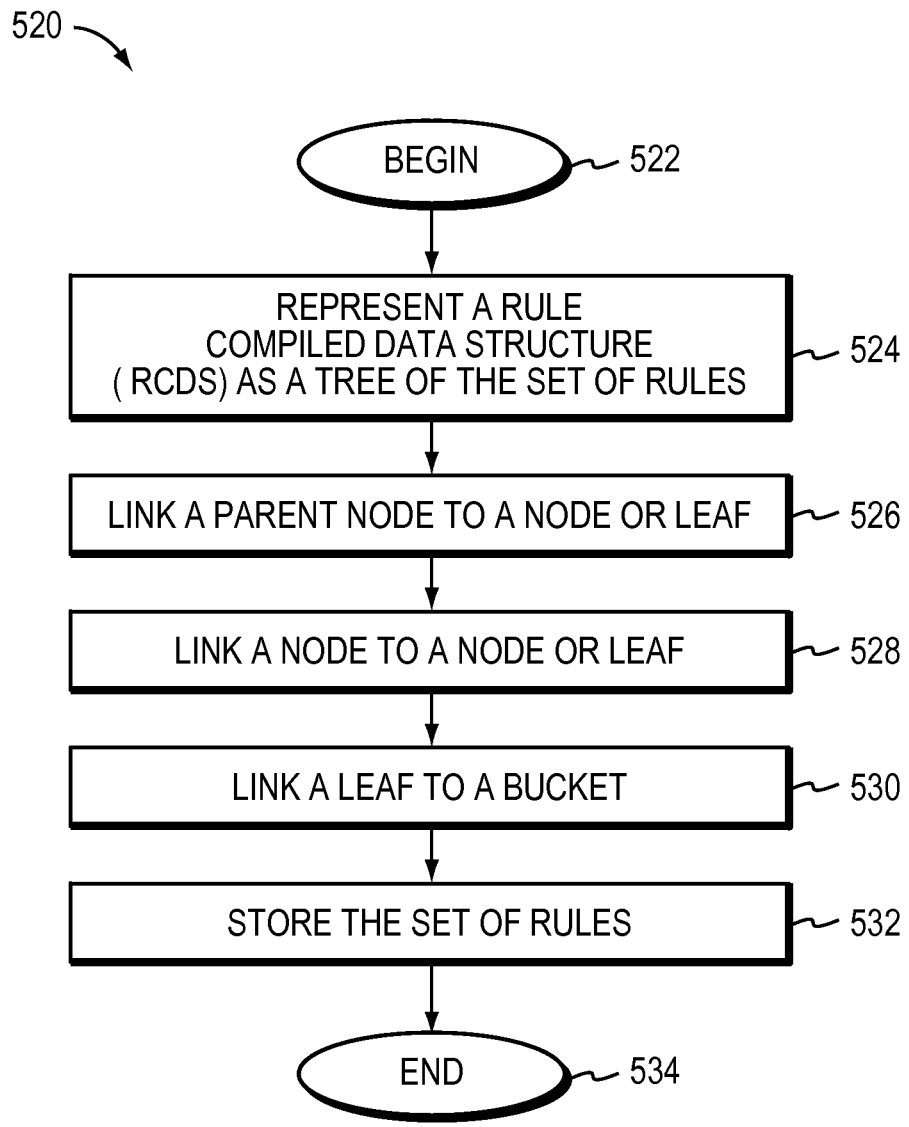
FIG. 5B is a flow diagram of one embodiment of a method for representing a Rule Compiled Data Structure (RCDS).

FIG. 5B is a flow diagram of a method 520 representing a Rule Compiled Data Structure (RCDS) according to one embodiment. The Rule Compiled Data Structure (RCDS) may be represented as a tree of the set of rules, the tree may be a binary data structure including one or more nodes and one or more leaves (524). At least one of the one or more nodes may be represented as a parent node and linked to one or more children, the one or more children may be a node or a leaf (526). The parent node may be linked to the one or more children by pointing the parent node to a sibling list that includes the one or more children. Nodes of the tree may be linked to one or more nodes and one or more leaves of the tree (528). Leaves of the tree may be linked to one or more buckets, each bucket may represent a subset of the set of rules, each bucket may include one or more bucket entries corresponding to the subset of the set of rules (530). The bucket entries may be ordered by increasing or decreasing rule priority. The storing the set of rules may be stored in a rule table, the rules within the rule table being ordered or unordered (532) and the method ends (534).

Regarding functionality, while the search processor performs a search, the search processor should find the state of the rules (or rule table) to be either "before" or "after" a rule is added, deleted or modified. The search processor should not find the state of the rules to be some intermediate state in between "before" and "after" a rule is added, deleted or modified. For example, it should not be the case that while searching, the search processor finds a rule that matches a key some of the time because of rule updating. The addition, deletion or modification of rules without affect functionality or performance, as described above, is referred to as an "atomic" update, or "atomically" updating.

The challenge to performing an atomic update (or atomically updating) is that any addition, deletion or modification of rules may take more than one update to complete. Some rules cannot be added, deleted or modified in a single update (e.g., a rule cannot be added, deleted or modified by simply changing a bit in that rule).

Figure 6A:
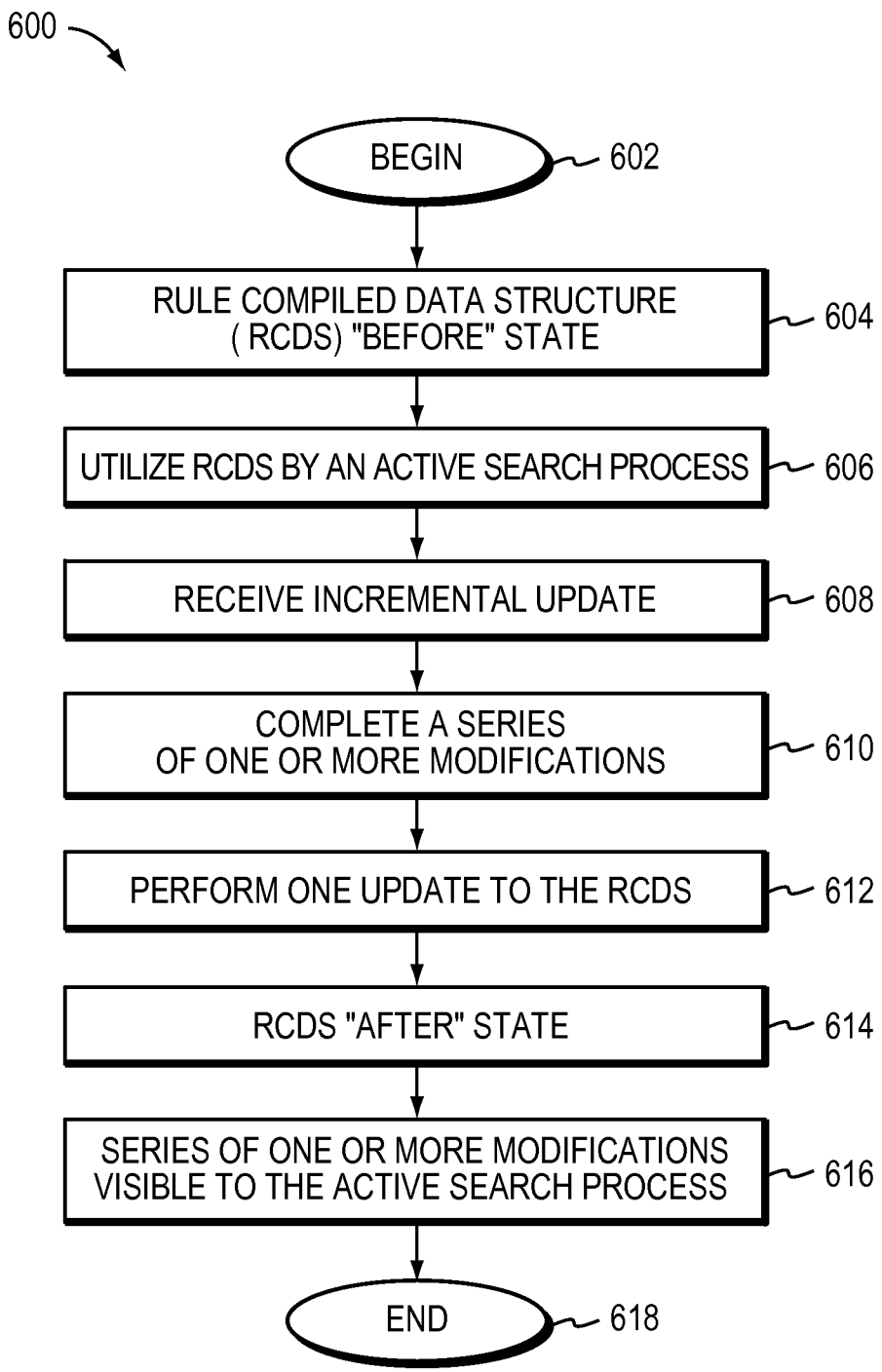
FIG. 6A illustrates a flow diagram of a method for an atomic update of a Rule Compiled Data Structure (RCDS) according to one embodiment.

FIG. 6A illustrates a flow diagram of a method for an atomic update (600) according to one embodiment. The method begins (602). The atomic update of the Rule Compiled Data Structure (RCDS) may include restricting a state of the Rule Compiled Data Structure (RCDS) to a before state and an after state. The before state is a state of the Rule Compiled Data Structure (RCDS) before receiving the incremental update for the Rule Compiled Data Structure (RCDS) (604). The Rule Compiled Data Structure (RCDS) may be utilized by an active search process (606) and an incremental update may be received (608). The series of one or more modifications is completed based on the incremental update received (610). One update to the Rule Compiled Data Structure (RCDS) may be preformed (612). The after state is a state of the Rule Compiled Data Structure (RCDS) after a series of one or more modifications to the Rule Compiled Data Structure (RCDS) has been completed (614). The series of one or more modifications may be made visible to the active search process (based on performing one update to the Rule Compiled Data Structure (RCDS) being searched. The method may end (618).

According to techniques disclosed herein, adding, deleting, and modifying a rule appear to take one update from the perspective of a search processor performing an active search. The Rule Compiled Data Structure (RCDS), or tree of rules, or tree, represents a set of rules. The tree is a binary data structure having nodes and leaves. Each leaf of the tree points to a subset of the rules, called a bucket of rules, or bucket. Each of the buckets represents a subset of the rules. Each bucket is a data structure (e.g., an array) containing rules, pointers to rules, pointers to chunks of rules, or any combination thereof, which may be stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

A rule has, among other things, a priority and one or more fields. In this way, modifying a rule includes modifying a priority and/or one or more fields. To describe modifying a priority of a rule, according to one embodiment, the following example is provided.

A network router maintains, in what may be called a "white list," rules for allowing traffic from particular networks. The white list may also includes a rule for dropping traffic from all networks, called a "default route" or "default rule." The rules may be prioritized such that the router compares traffic against the highest priority rule first, and if no match is found, compares the traffic against the next highest priority rule second. The router may continues comparing, working down the list of rules, until a match is found or until the router reaches the lowest priority rule, the default route, in which case the traffic is dropped.

The white list may be compromised and the router may be allowing offending traffic. Instead of going through each rule to find the rule that is allowing the offending traffic (which may be time consuming) an operator or administrator of the router may "reprioritize" the rules by changing the priority of the default route from the lowest to the highest priority. Giving the default route the highest priority stops all traffic including the offending traffic.

Modifying a priority of a rule, according to one embodiment, includes determining if changing the priority of the rule conflicts or overlaps a priority of another rule. Using the white list example above, assume the highest priority rule has a priority of 0 and there is no priority higher than 0. There is a conflict if the priority of the default route is changed to 0. In the case of conflicting priority, the priority of the rule and the priority of another rule may be updated. In the case of no conflicting priority (e.g., the highest priority rule has a priority of 1 and the priority of the default route is changed to 0), the priority of the rule is modified without deleting and adding rules. To describe modifying a field of a rule, according to one embodiment, the following example is provided.

Figure 6B:
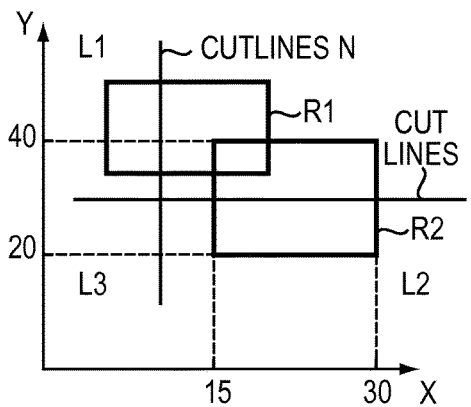
FIG. 6B illustrates a rule represented by a graph.

FIG. 6B illustrates a rule with 'n' fields can be represented by an 'n'-dimensional graph, in which each field is represented by a dimension. For example, FIG. 6B shows two rules, R1 and R2, as boxes. In the example illustration of FIG. 6B each rule has two fields, X and Y that are represented in FIG. 6B as dimension-X and dimension-Y. A side along the dimension-X represents a range of values (or a prefix) for field X. For example, as shown in FIG. 6B, the side of the box representing R2 along the dimension-X represents field X with a range of 15-30. Similarly, a side along the dimension-Y represents a range of values (or a prefix) for field Y. For example, as shown in FIG. 6B, the side of the box representing R2 along the dimension-Y represents field Y with a range of 20-40. The graph of FIG. 6B may be represented as a tree, having nodes and leaves, by "cutting" rule space that contains R1 and R2 with "cut lines," as shown in FIG. 6B.

Figure 6C:
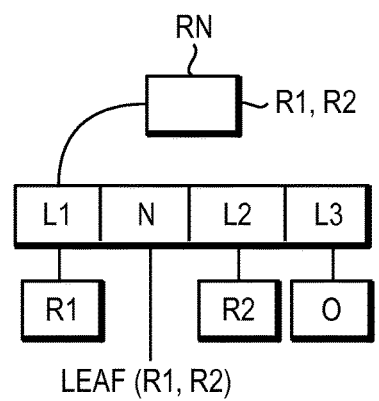
FIG. 6C shows an embodiment of a tree resulting from cutting rule space.

FIG. 6C shows a tree resulting from cutting rule space including R1 and R2 as shown in FIG. 6B. The tree has a root node (RN), node (N), and leaves (L1, L2, and L3). N points to leaves representing rules R1 and R2. Leaf L1 points to a bucket containing the rule R1; leaf L2 points to a bucket containing the rules R1 and R2; and leaf L3 points to a bucket containing no rules.

Figure 6D:
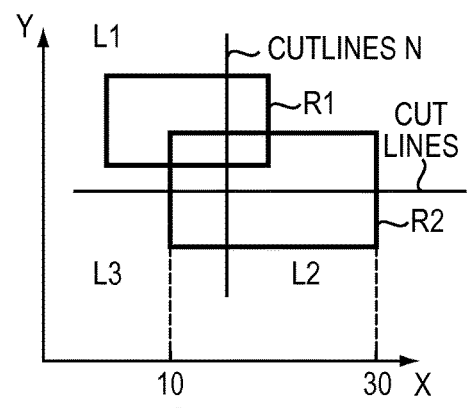
FIG. 6D shows an embodiment of a rule field change.

FIG. 6D shows for the rule R2, the range of field X changed from 15-30 to 10-30.

Figure 6E:
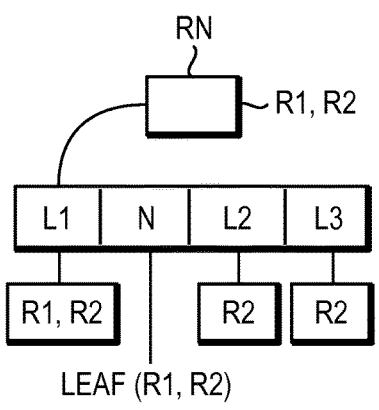
FIG. 6E shows an embodiment of a tree resulting from cutting rule space.

FIG. 6E shows a tree that result from cutting rule space including R1 and "modified" rule R2 with the same cut lines of FIG. 6B. As FIGS. 6C and 6E show, modifying field X of the rule R2 requires adding rule R2 to the bucket pointed to by leaf L1 and to the bucket pointed to by leaf L3. The rule may be added to the buckets as described by techniques disclosed herein.

Figure 6F:
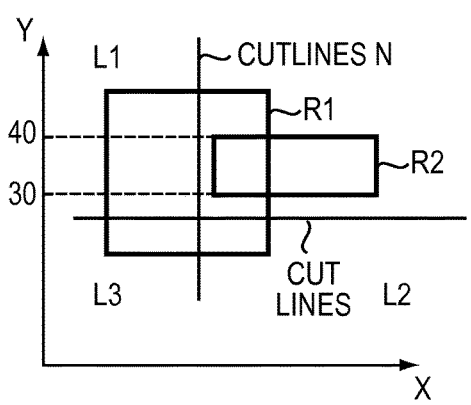
FIG. 6F shows an embodiment of a rule field change.

FIG. 6F shows for the rule R2, the range of field Y changed from 20-40 to 30-40.

Figure 6G:
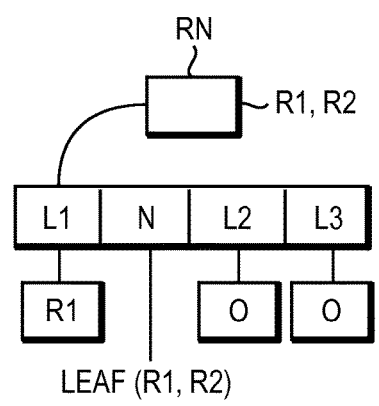
FIG. 6G shows an embodiment of a tree resulting from cutting rule space.

FIG. 6G shows a tree resulting from cutting rule space including R1 and "modified" rule R2" with the same cut lines of FIG. 6B. As FIGS. 6C and 6G show, modifying field Y of rule R2 requires deleting rule R2 from the bucket pointed to by leaf L2. The rule may be deleted from the bucket as described by techniques disclosed herein.

Figure 6H:
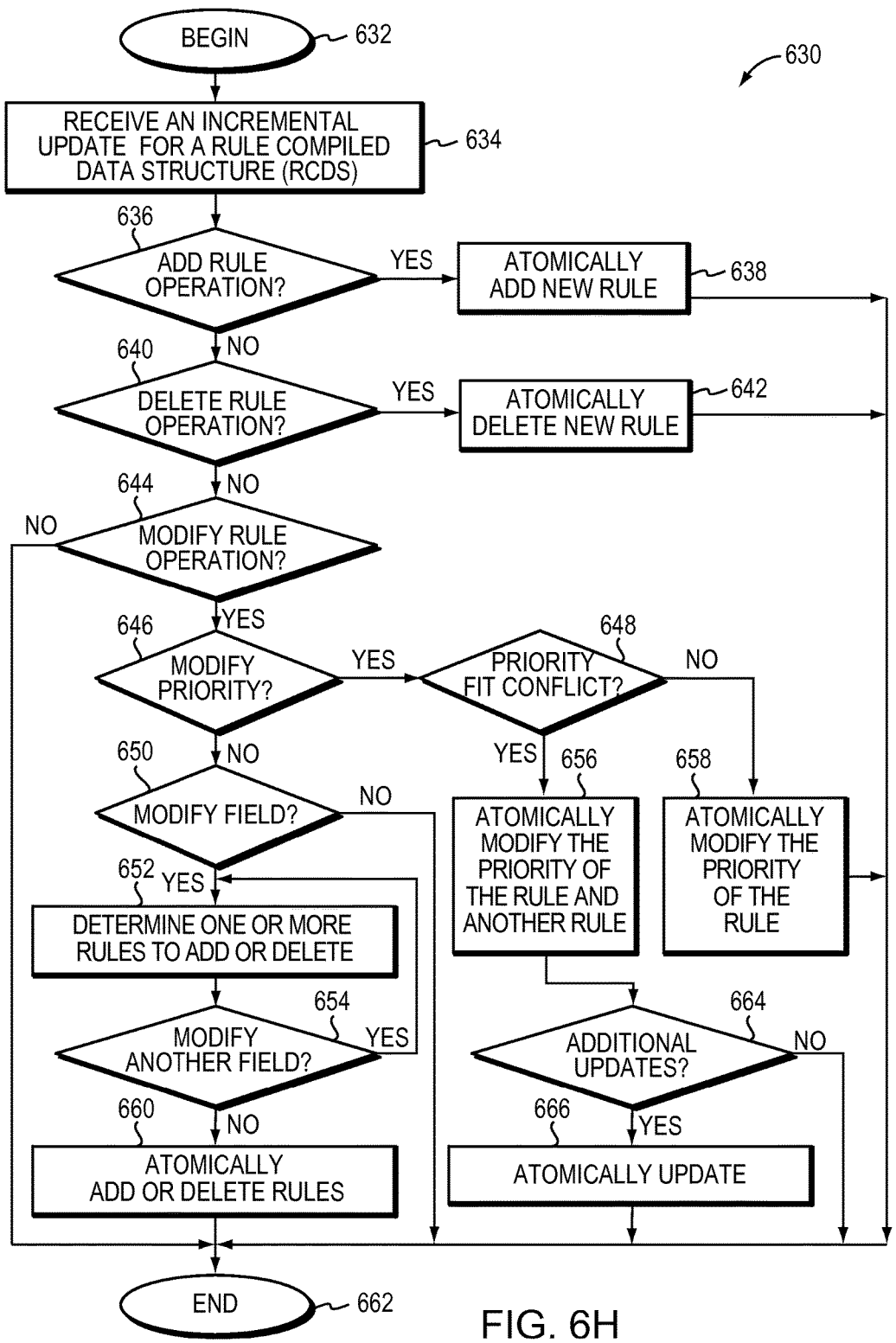
FIG. 6H illustrates a flow diagram of a method for modifying a rule according to one embodiment.

FIG. 6H illustrates a flow diagram of a method 630 for modifying a rule according to one embodiment. The method begins (632) by receiving an incremental update for a Rule Compiled Data Structure (RCDS). If the incremental update is an add rule operation (636) the new rule may be atomically added to the Rule Compiled Data Structure (RCDS) (638) according to embodiments described herein and the method ends (662). If the incremental update is a delete rule operation (640) the rule may be atomically deleted from the Rule Compiled Data Structure (RCDS) (638) according to embodiments described herein and the method ends (662). A check may be made to determine if the incremental update is a modify rule operation (644). Modifying the rule may include at least one of: modifying a priority of the rule or modifying at least one field of the rule.

If the rule is to be modified, a check may be made to determine if the rule priority is to be modified (646). If the priority is to be modified a check may be made to identify a priority fit conflict based on a change in priority of the rule being inconsistent with a current priority ordering of the rule and one or more other rules (648). If the priority fit conflict is not identified the priority of the rule may be atomically modified (658) and the method thereafter ends (662) in the example embodiment. If the priority fit conflict is identified, the priority of the rule and priority of another rule may be atomically modified (656). After priorities of rules are shifted around, new cover lists may be needed or updates to existing cover lists may be needed based on whether or not rules of the node cover other rules of the node due to the priority changes. As such, additional updates may be needed to remove covered rules from the node or to add rules to the node that have been uncovered due to the priority updates. A check may be made to determine if such additional updates are needed (664). If not, the method thereafter ends (662) in the example embodiment. If yes, the additional updates may be atomically incorporated (666) and the method thereafter ends (662) in the example embodiment. If the priority is not being modified, a check may be made to determine if at least one field of the rule is to be modified (650). If not, the method ends (662). If at least one field is to be modified, a determination may be made for identifying one or more rules that need to be added or deleted (652). In some cases, modifying a field of a rule may involve modifying the field without adding or deleting rules. A check may be made to determine if another field is being modified (654) and iterate to identify the one or more rules that need to be added or deleted (652). If there are no more fields to be modified, the one or more rules determined may be added or deleted and adding or deleting the one or more rules determined is atomic (660) and the method ends (662).

Rules may be added to a bucket until an upper limit is reached. Capping the number of rules that can be added to a bucket avoids making a search of the tree into a linear search of buckets. When the upper limit is reached, it can be said that there is no "space" in a bucket to add a rule. When adding a rule to a bucket that "fits," in terms of both space and priority, the rule is simply added to the end of the bucket. The rule and its priority are appended to the rule table. A rule may include its priority.

By including a rule priority, it may not be necessary to shuffle (move) rules in memory in order to realize a specific priority order. According to one embodiment, the priority of a rule or rules may be updated instead. Rule priority may be assigned in blocks. Holes (e.g., priority differential) may be present between rules in a bucket. A priority fit may be determined base on determining that holes that are present. If a rule's modified priority fits in a priority hole, other rules may not need to have their priority adjusted. In addition, rules included in a bucket (either directly or indirectly via pointers as disclosed herein) may have a same priority if the rules do not compete for a match. A priority fit may be determined even if the priority of a rule is being modified to a priority that is the same as another rule in the bucket.

Figure 7:
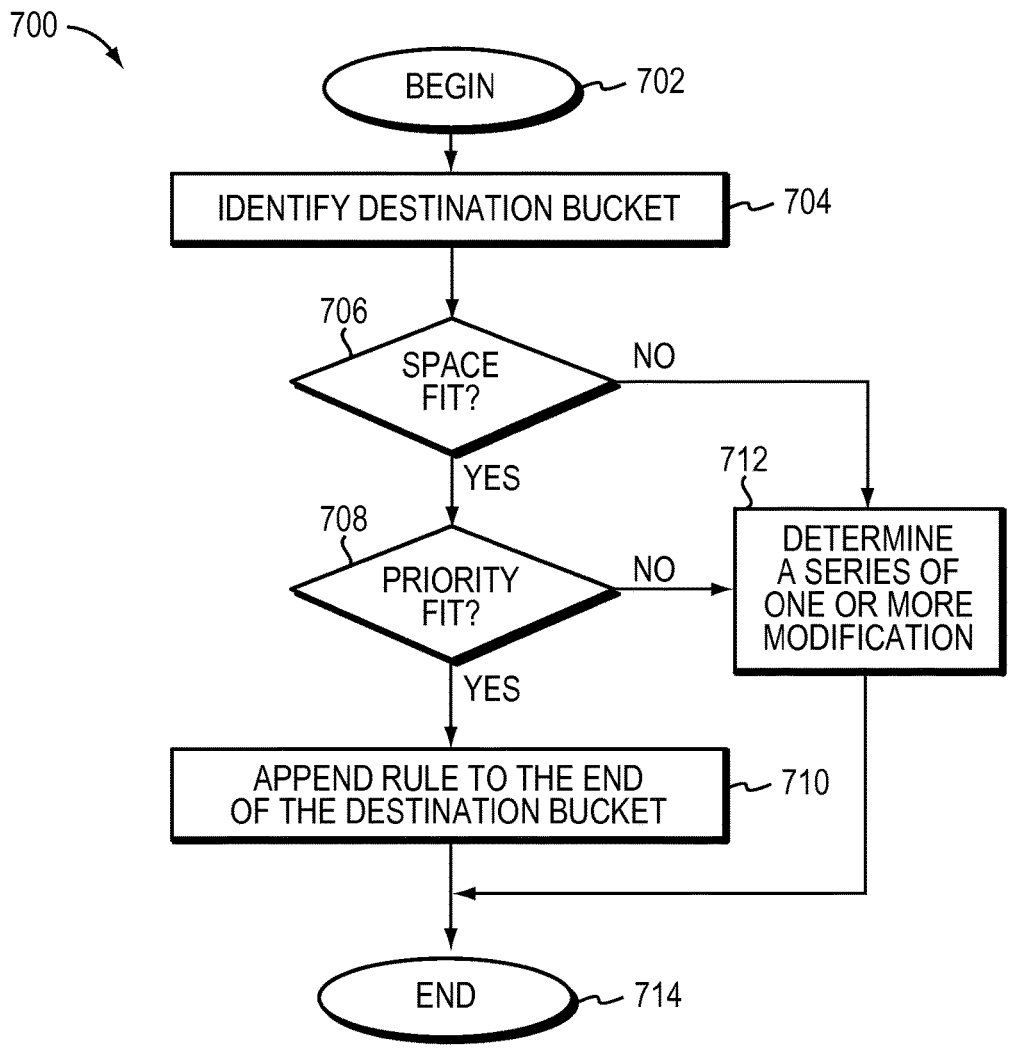
FIG. 7 is a flow diagram of adding a rule that may fit in a bucket according to one embodiment.

FIG. 7 is a flow diagram 700 of adding a rule that may fit in a bucket. The method begins (702) and identifies a destination bucket from among the one or more buckets to include the new rule (704). A check is made to determine if there is space fit (706). Space may be based on an adjustable threshold for the number of bucket entries that may be included in a bucket. If there is space fit, a check is made to determine if there is a priority fit (708). If there is a space fit and a priority fit the new rule may be appended to the end of the destination bucket. Appending the new rule to the end of the destination bucket takes one update (710). If there is no space fit or a priority fit a series of one or modifications may be determined (712) and the method ends (714).

For example, according to one embodiment, when adding a rule to a bucket that does not fit priority-wise (e.g., adding the rule to the end of the bucket results in an incorrect priority order), a "new" bucket is created. The new bucket may include the rules from the "old" bucket and the new rule being added in the correct priority order. The link from the tree (leaf) to the old bucket may be replaced with a new link from the tree to the new bucket. Establishing this new link to the new bucket is done in one update (which is one part of adding a new bucket) so as not to affect performance or any active searches being performed on the tree.

Figure 8A:
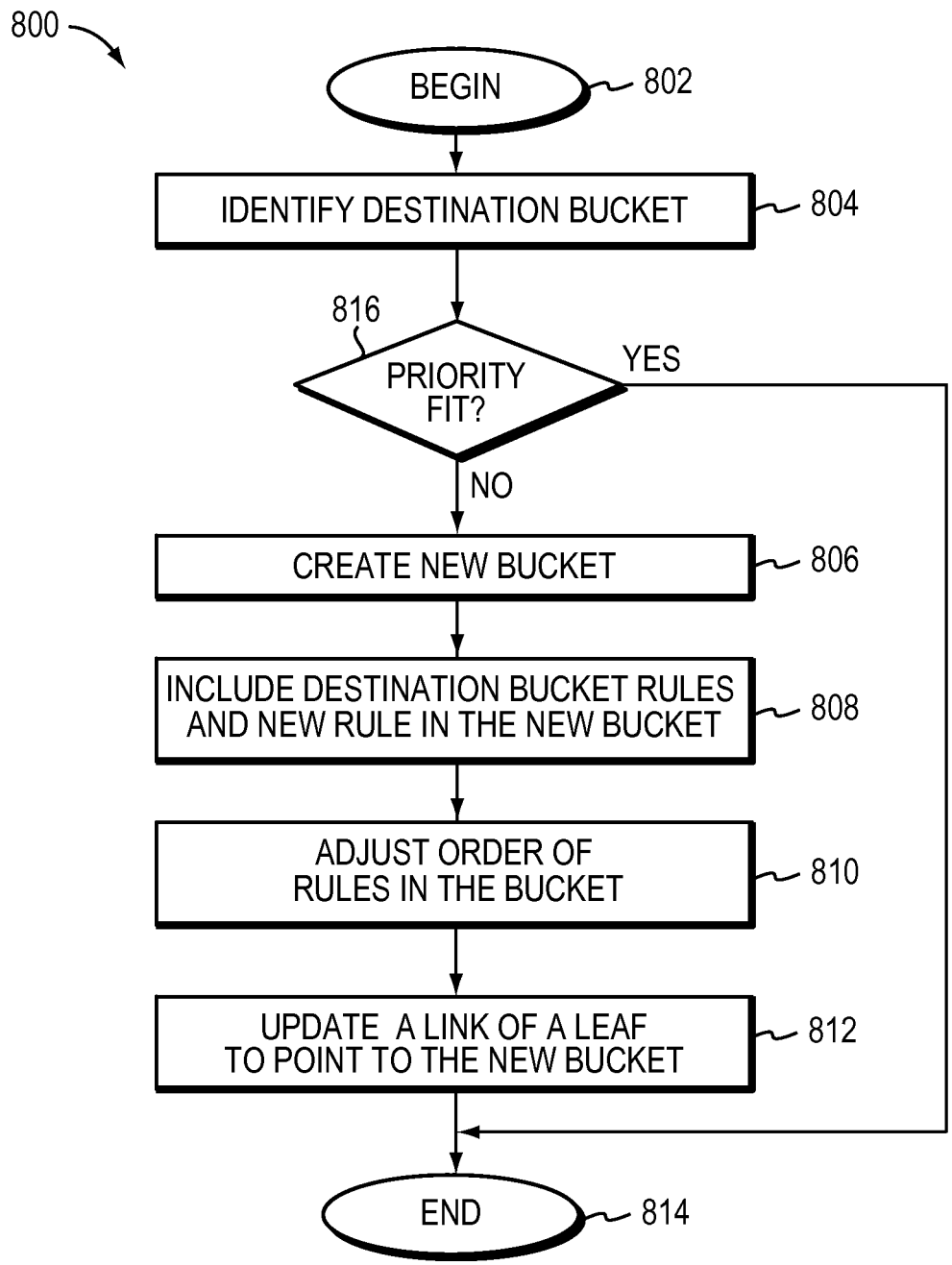
FIG. 8A is a flow diagram of the series of one or more modifications according to one embodiment.

FIG. 8A is a flow diagram of the series of one or more modifications that may be determined, according to one embodiment, if adding a rule to a bucket does not fit priority-wise. The method (800) begins (802) and identifies a destination bucket from among the one or more buckets to include the new rule (804). A check may be made as to whether or not the new rule fits priority-wise (816). If the new rule does not fit, a new bucket may be created based on determining the priority associated with the new rule being inconsistent with a priority ordering of rules in the destination bucket (806). The active search process is unaffected by the new bucket created. The set of rules of the destination bucket may be included in the new bucket (808). The order of the set of rules and the new rule may be adjusted based on increasing or decreasing priority order (810). A link of a leaf in the tree may be updated to point the leaf to the new bucket, the link update takes one update (812) and the method ends (814).

Figure 8B:
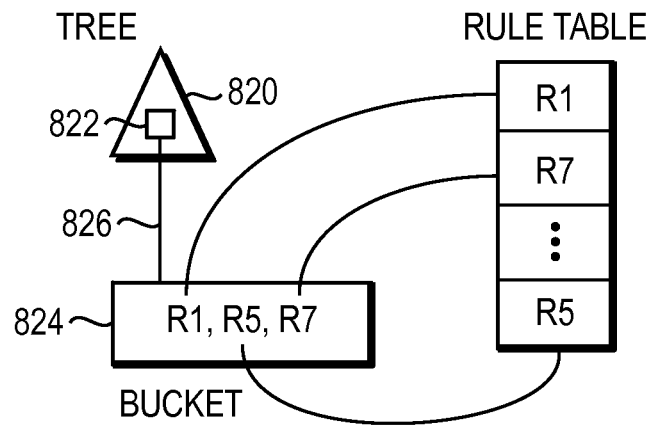
FIG. 8B illustrates a tree with a leaf pointing to a bucket according to one embodiment.

FIG. 8B illustrates a tree 820 with a leaf 822 pointing 826 to a bucket 824. The (old) bucket includes, in decreasing priority, rules R1, R5, and R7.

Figure 8C:
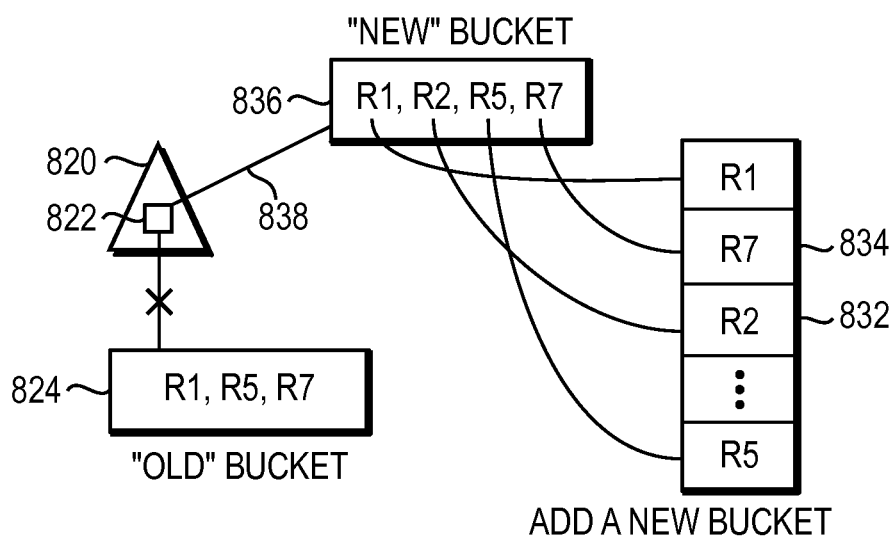
FIG. 8C shows, according to one embodiment, to add a rule, which has a higher priority than another rule, a new bucket may be created.

FIG. 8C shows, according to one embodiment, to add rule R2 832, which has a higher priority than rule R7 834, a new bucket 836 is created. The new bucket 836 includes, in decreasing priority, rules R1, R2, R5, and R7. In one update, the leaf is made to point 838 to the new bucket 836 instead of the old bucket 824.

When there is no space in a bucket to add a rule, according to one embodiment, a subtree is created, the rule is added to a bucket of the subtree, and a leaf of a tree is updated to point to the subtree.

Figure 9A:
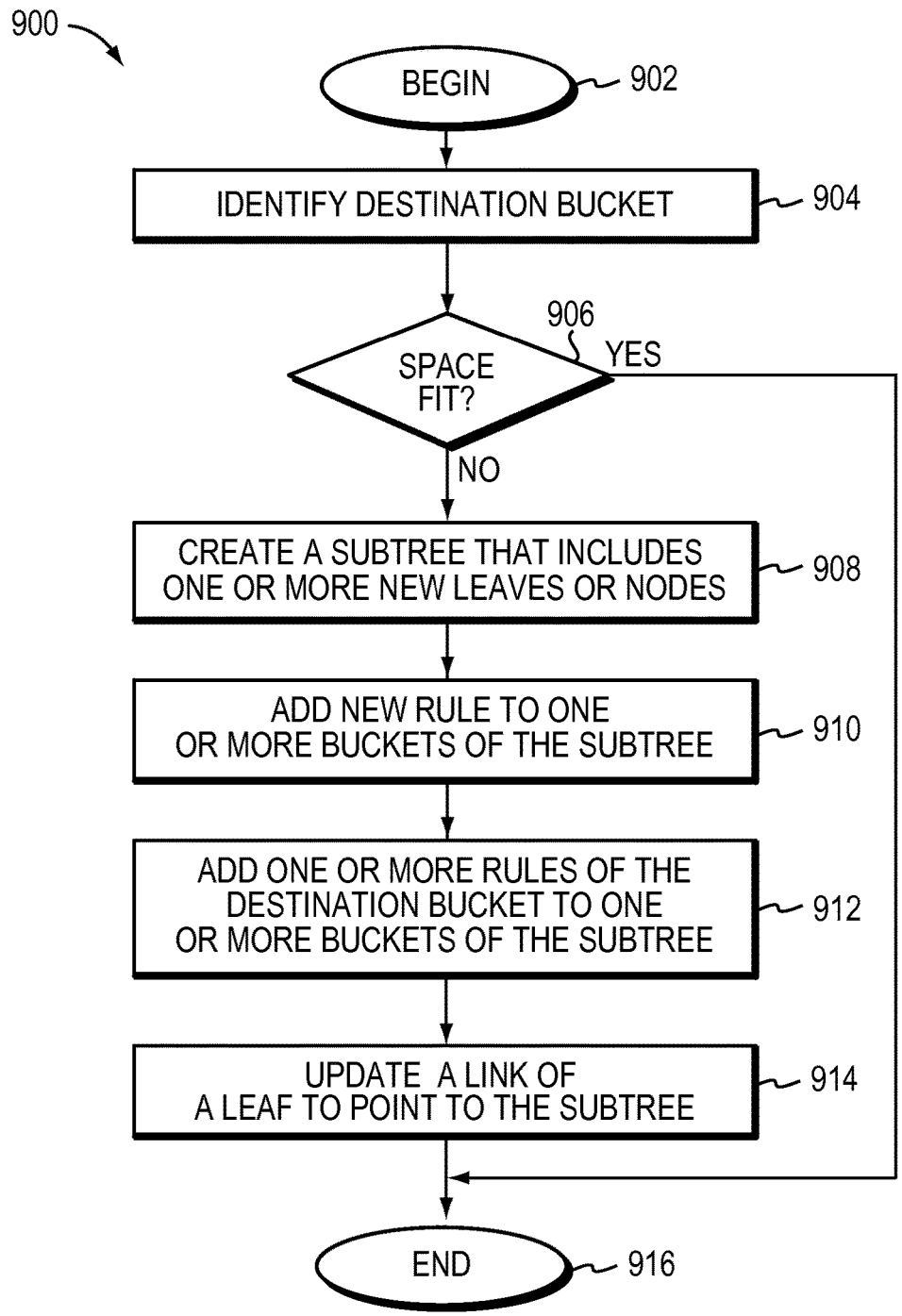
FIG. 9A is a flow diagram of an embodiment of a method that creates a subtree.

FIG. 9A is a flow diagram of an embodiment of a method that creates a subtree and atomically adds a new rule to the tree (900). The method begins (902) and identifies a destination bucket from among the one or more buckets to include the new rule (904). A check is made for a space fit in the bucket for the new rule (906). Lack of space in the destination bucket may be determined based on an adjustable maximum number of rules set for the destination bucket. If there is space the method ends (916), and may add the rule according to other embodiments disclosed herein. If there is no space fit, a subtree may be created based on determining lack of space in the destination bucket for the new rule, the subtree may include one or more nodes and leaves (908). The active search process is unaffected by the subtree created. The new rule may be added to one or more buckets of the subtree (910). One or more rules of the destination bucket may be added to one or more buckets of the subtree (912). The subtree may be linked to the tree by updating a link of a leaf in the tree to point to the subtree (914). For example, the leaf having a link to the destination bucket from among the one or more buckets may be updated by pointing the leaf to the subtree, thus converting the leaf to a node. The link update takes one update and the new rule is added atomically to the tree.

Figure 9B:
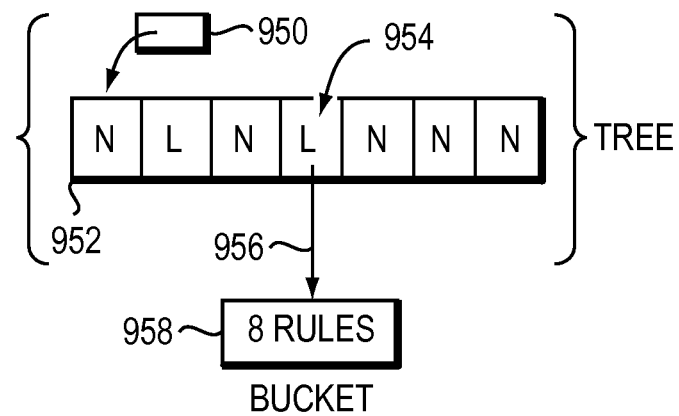
FIG. 9B illustrates an embodiment of nodes and leaves of a tree.

FIG. 9B illustrates nodes and leaves of a tree. A parent node 950 points to a sibling list 952 (e.g., a list of children) that includes nodes and leaves. Leaf 954 points 956 to a bucket 958 with eight rules (not shown). In one embodiment, the number of rules per bucket is limited to eight. There is no space to add another rule (e.g., 9th rule) to the bucket. According to one embodiment, a subtree is created.

Figure 9C:
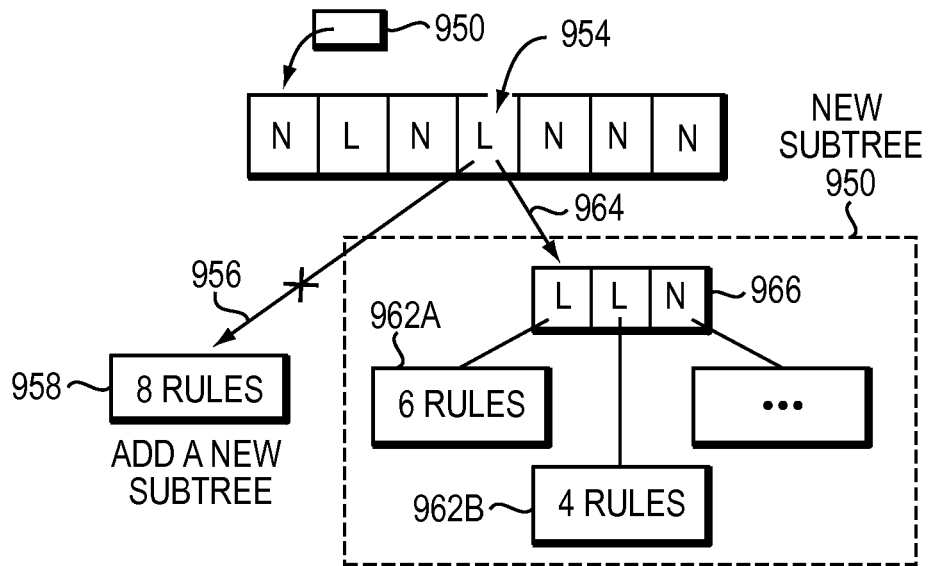
FIG. 9C illustrates creation of new subtree according to one embodiment.

FIG. 9C illustrates a new subtree 960 is created according to one embodiment. The leaf 954 may be converted to a node by pointing 964 the leaf to a new sibling list 966 that may include leaves and nodes. The rule may be added to one or more buckets 962*a-b* of the subtree 960 (e.g., using one of the add rule mechanisms as disclosed herein).

Creating the subtree may take more time than one update but it does not impact the performance and/or functionality of a search. While the subtree is being created, the subtree and tree are separate and distinct from one another. Therefore, the tree may still be searched without searching the subtree. Once the subtree is created, the leaf is updated to point to the subtree instead of the bucket, making the leaf into a node of the tree. Updating the leaf (which is one part of adding a new subtree) takes one update and is atomic. Because the tree includes the subtree after updating, a search of the tree includes the added rule.

As described earlier, a tree represents a set of rules. When adding a new "area" of a rule to the set (e.g., cutting rules) a leaf, or in some cases a node, is added to the tree. To add a leaf/node to a tree, according to one embodiment, includes creating a sibling list of nodes and leaves including the leaf/node being added and then updating a parent node to point to the sibling list.

Figure 10A:
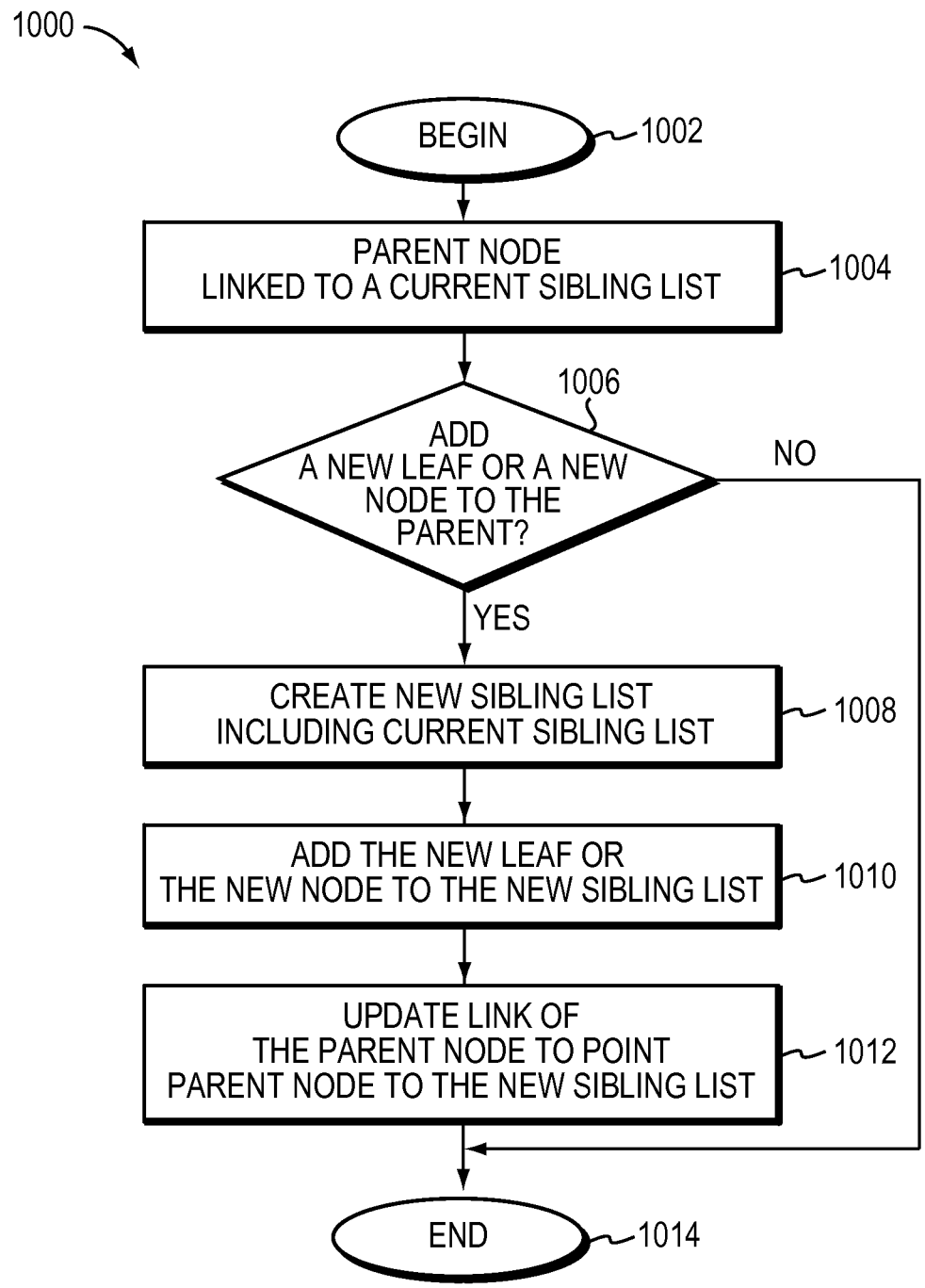
FIG. 10A is a flow diagram of one embodiment of a method for atomically adding a new leaf or a new node to a parent node in the tree.

FIG. 10A is a flow diagram of one embodiment of a method for atomically adding a new leaf or a new node to a parent node in the tree (1000). The parent node in the tree is linked to a current sibling list; the current sibling list may include one or more leaves or one or more nodes (1004). If no determination is made to add a new leaf or a new node to the parent, the method ends (1014). A new sibling list may be created if the determination is made to add a new leaf or a new node and the active search process is unaffected by the new sibling list created (1008). The new leaf or the new node may be added to the new sibling list, the new sibling list may include the current sibling list (1010). The new sibling list may be included in the tree by updating a link of the parent to point the parent node to the new sibling list (1012). The link update takes one update and the method ends (1014).

Figure 10B:
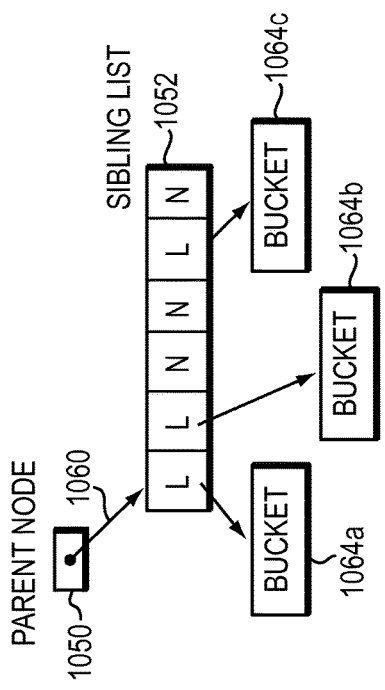
FIG. 10B illustrates a parent node and its children according to one embodiment.

FIG. 10B illustrates a parent node 1050 and its children, which are nodes and leaves arranged in a sibling list 1052 pointed to 1060 by the node 1050. Leaves point to buckets 1064*a-c* of rules (not shown). According to one embodiment, to add a leaf/node to the tree, a new sibling list with the leaf/node added may be created.

Figure 10C:
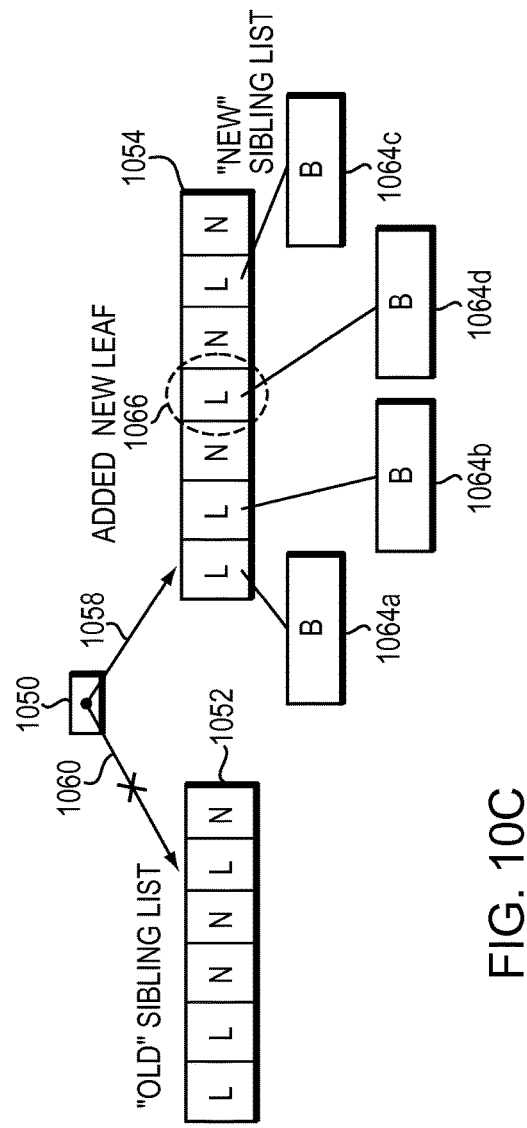
FIG. 10C illustrates that to add a leaf/node to the tree, a new sibling list with the leaf/node added is created according to one embodiment.

FIG. 10C illustrates that to add a leaf/node to the tree, a new sibling list with the leaf/node added is created according to one embodiment. For example, once the new sibling list 1054 is created, the parent node 1050 is updated to point 1058 to the new sibling list instead of pointing 1060 to the old sibling list 1052. A new leaf 1066 is included in the new sibling list 1054. The new leaf 1066 points to a new bucket 1064*d* of rules (not shown). Updating the parent node 1050 to point 1058 to the new sibling list 1054 takes one update and is atomic.

When a tree of rules (nodes and leaves) and buckets of rules are first created, they are contiguous in memory, e.g., they occupy a memory layout starting at one memory address and ending at another memory address. Over time, adding and deleting rules, as described above, results in "old" leaves and "old" buckets that are no longer referenced. This creates "holes" or "patches" in the memory layout of unused memory. The memory layout is said to be fragmented. To recover these holes or patches in the memory layout, a defragment or defrag mechanism is used. Like the incremental update mechanisms described above, the defrag mechanism is atomic and appears to take one update from the perspective of a search processor performing an active search.

Figure 11A:
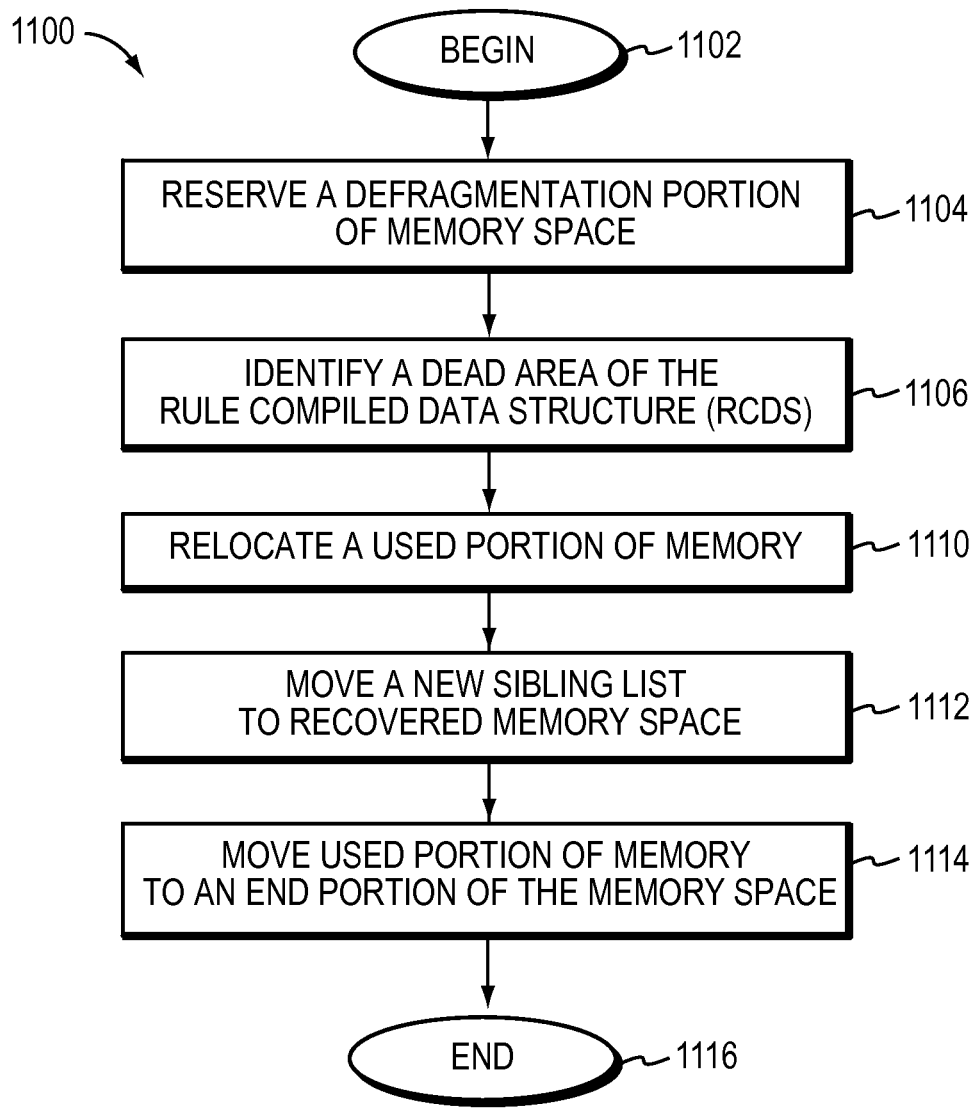
FIG. 11A is a flow diagram of a defragmentation process according to one embodiment.

FIG. 11A is a flow diagram of a defragmentation process according to one embodiment (1100). According to one embodiment, defragmentation may include reserving some portion of memory (e.g., a defrag area or designated area) for the defragmentation process. The method begins (1102) by reserving a defragmentation portion of the memory space, the defragmentation portion of the memory space may be a designated defragmentation area that is a contiguous portion of the memory space reserved at a designated area of the memory space (1104). A dead area of the Rule Compiled Data Structure (RCDS) may be identified (1106). The dead area may be a portion of the memory space being occupied by at least one unreferenced leaf, node, bucket, or sibling list. Recovering the dead area may include relocating a used portion of memory, the used portion including one or more nodes or leaves located adjacent to the dead area identified to the designated defragmentation area (1110). A new sibling list may be moved to a recovered memory space (1112). The recovered memory space may include the dead area identified and the used portion of memory relocated. The used portion of memory may be relocated out of the defragmentation area to an end portion of the memory space reserved for the Rule Compiled Data Structure (RCDS) (1114) and the method ends (1116). The Rule Compiled Data Structure (RCDS) may be defragmented by recovering the dead area, the active search process is unaffected by the dead area recovered because the Rule Compiled Data Structure (RCDS) is defragmented atomically.

Figure 11B:
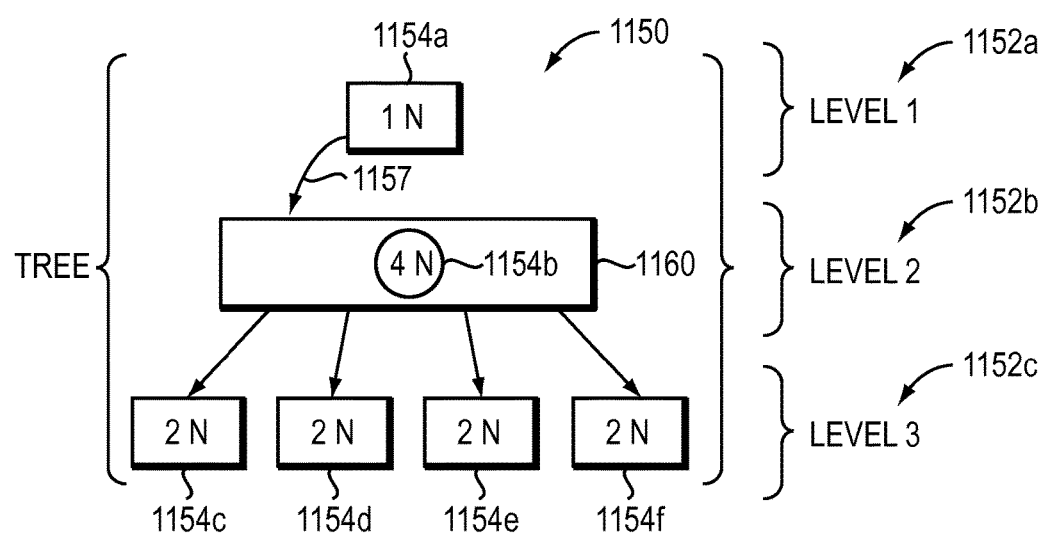
FIG. 11B illustrates one embodiment of a tree with three levels.

FIG. 11B illustrates a tree 1150 with three levels 1152*a-c*, each level containing one or more nodes 1154*a-f*. Each node occupies a unit of memory. At level one of the tree 1152*a*, there is one node 1154*a*, a root node, which occupies one unit of memory. The parent node points 1157 to a sibling list 1160 that includes four nodes (1154*b*). At the level two of the tree, there are four nodes (1154*b*), child nodes of the root node, which occupy four units of memory. At the level three of the tree, there are eight nodes (1154*c-f*), grandchild nodes of the root node, which occupy eight units of memory.

Figure 11C:
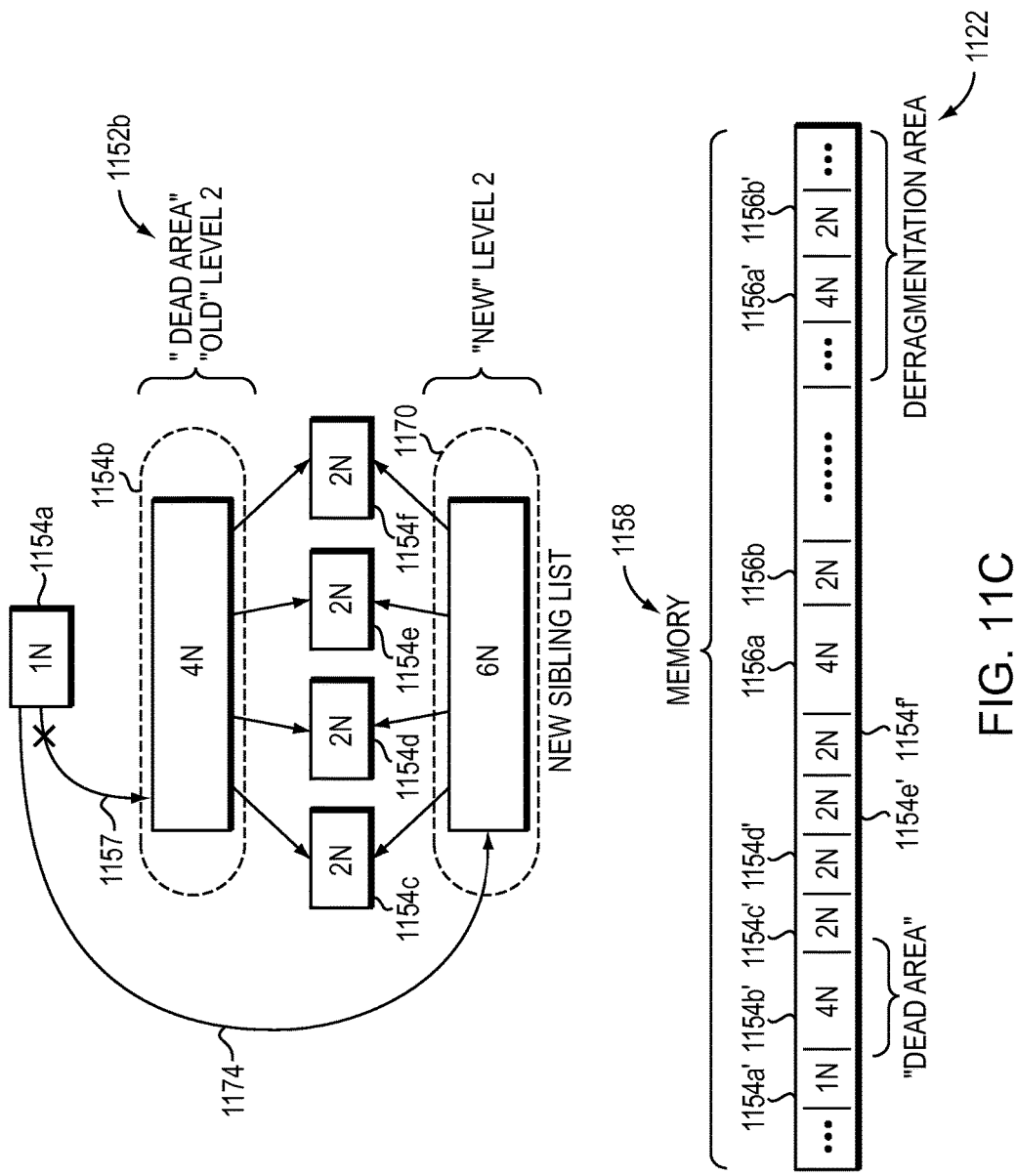
FIG. 11C illustrates adding a rule according to one embodiment.

FIG. 11C illustrates adding a rule, at the level two of the tree (1152*b*), that includes, according to one embodiment, creating a new sibling list of six nodes (1170), which occupies six units of memory. The new sibling list 1170 cannot be created in the memory space occupied by the "old" level two of the tree (1152*b*) because there is not enough space, six units of memory are required but only four units of memory (contiguous memory) are available.

Memory space 1158 shows contiguous memory units 1154*a'-f'* corresponding to nodes 1154*a-f*. Memory space 1156*a* and 1156*b* is allocated for the new sibling list 1170 and the node 1154*a* link is updated such that it no longer points 1157 to the old sibling list 1154*b* but instead points 1174 to the new sibling list 1170 located in memory units 1156*a-b*. The link update takes one update and is atomic. The memory space 1154*b'*, occupied by the "old" level two of the tree is now unused, and illustrates an example of "dead area."

To recover the dead area (e.g., four memory units in this example), space for the new sibling list (six memory units) may be made by moving, in memory, one or more nodes after the dead area (viz., two nodes at level three of the tree 1152*c*, which occupy two memory units 1154*c'-d'*) to the dead area 1154*b'*. The node is moved by copying the memory unit to a different location and updating the node link. Updating the node link for each node moved takes one update and is atomic. The nodes 1154*e* and 1154*f* may then be moved by copying the memory units 1154*e'-f'* to 1154*c'-d'* and then updating the corresponding links atomically in one update. The new sibling list 1170 may be moved by copying 1156*a* and 1156*b* to a location of a designated defragmentation area 1172, for example, by copying 1156*a* and 1156*b* to 1156*a'* and 1156*b'*. The link from 1154*a* to the new sibling list 1170 may then be updated in one update and is atomic. The new sibling list 1170 now located in the defragmentation may be moved once again by copying 1156*a'* and 1156*b'* to memory units 1154*e'-f'* and a needed two node portion of 1156*a*. The new sibling list may be moved by updating the node 1154*a* link to point to the new sibling list 1170 relocated. Thus the dead area is now recovered and the memory is utilized in a contiguous manner. Optionally, the one or more nodes moved to the defrag area may be moved out of the defrag area to the end of the memory layout occupied by the tree.

According to one embodiment, deleting a rule may include invalidating a rule in a rule table.

Figure 12A:
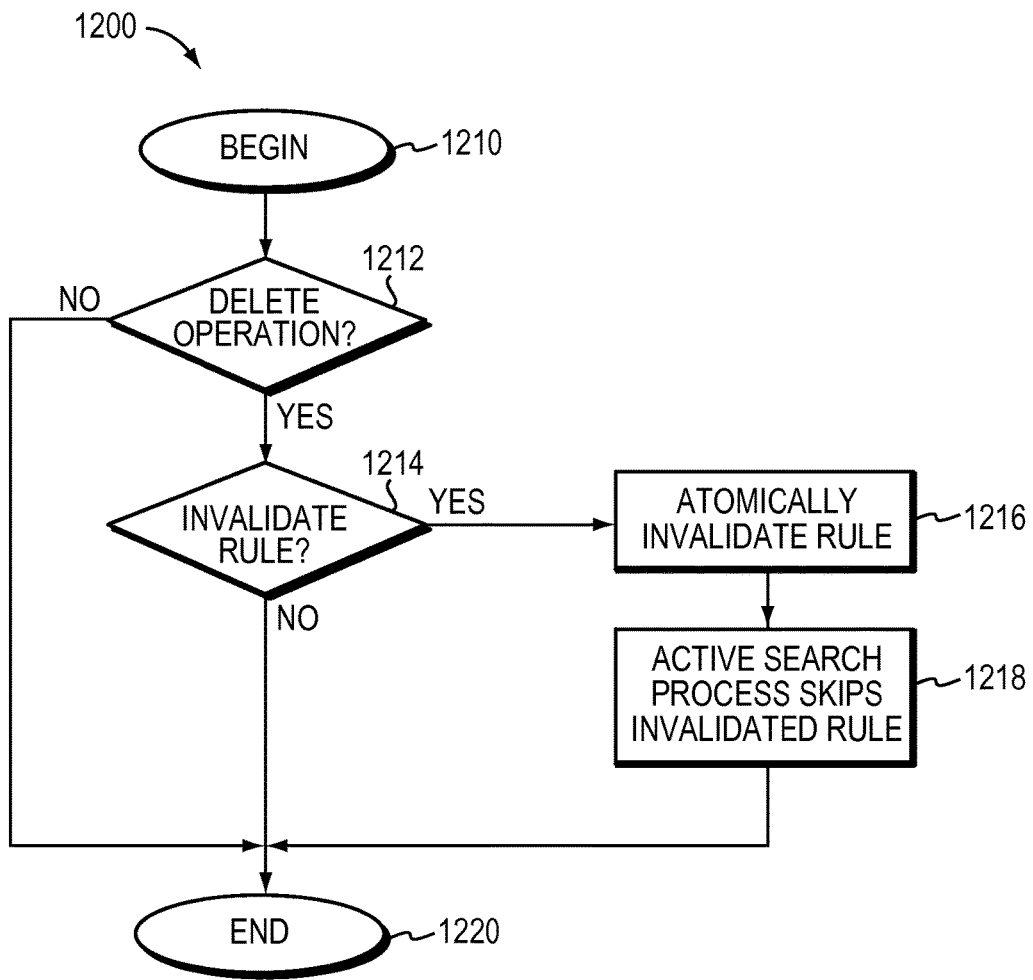
FIG. 12A is a flow chart that illustrates deleting a rule according to one embodiment.

FIG. 12A is a flow chart that illustrates deleting a rule according to one embodiment (1200). The method begins (1210) and determines that a rule is to be deleted (1212). If a rule is not being deleted the method ends (1220). If the rule is being deleted a determination is made to invalidate the rule (1214). If the rule is not being invalidated the method ends (1220). The specified rule in the Rule Compiled Data Structure (RCDS) is deleted atomically based on the incremental update being a delete operation specifying the rule. The rule is invalidated in one update by setting a valid bit corresponding to the rule to invalid. The active search process skips the specified rule invalidated (1218) and the method ends (1220).

FIG. 12B shows a rule table 1202 with rules R1, R2, R3, and R4. A valid bit 1204 may be associated with each of the rules. Setting the valid bit of a given rule (e.g., R1) to (I)NVALID 1206 identifies the rule as an invalid rule. When a rule match engine (RME) compares rules against a key (or other data), the RME skips over the invalid rule, and the rule is effectively deleted.

A leaf of a tree may include a pointer to a bucket of rules (bPTR) and a counter of the number of rules in the bucket (nRule). The counter of the number of rules in the bucket may be included and maintained in the housekeeping tree 220.

FIG. 13 shows a leaf 1302 having a pointer bPtr 1304 to a bucket and a rule counter nRule 1306. When a rule from the bucket is deleted (invalidated), the nRule counter 1306 may be decremented. When the nRule counter 1306 reaches zero, the leaf is said to have zero rules. The bPtr 1304 may be set to null.

When a tree walk engine (TWE) walks a tree, the TWE skips over a leaf with a bucket pointer set to null (e.g., the leaf points to a bucket with zero rules). By skipping over the leaf, a bucket pointed to by that leaf (the bucket associated with the leaf) is not passed to a bucket walk engine (BWE) for processing and the bucket may be deleted by setting the bucket pointer to null.

FIG. 14A illustrates an embodiment for deleting a rule. FIG. 14A illustrates that, when deleting rules, two or more buckets of rules may be merged into a new bucket. FIG. 14A shows a parent node and its children, leaves L1 and L2, and nodes N1 and N2. The children are organized in a sibling list 1404 pointed to 1406 by the parent 1402. Each of the leaves L1 and L2 points to a bucket 1408a-b (B1 and B2) of 5 rules (not shown). A rule is deleted from each bucket, leaving four rules in each bucket.

FIG. 14B shows that to merge the two buckets, according to one embodiment, includes creating a bucket B' 1408c with the eight remaining rules and creating a new leaf L1 1410 pointing to the new bucket B' 1408c. A new sibling list 1412 including L1 is created. The parent node 1402 is updated to point 1414 to the new sibling list (L1, N1, N2) 1412 instead of the old sibling list (L1, L2, N1, N2) 1404. Updating the parent node takes one update (which is one part of merging buckets) and is atomic. Merging buckets may cause one or more subtrees to be recompiled, as described later in detail.

Figure 15:
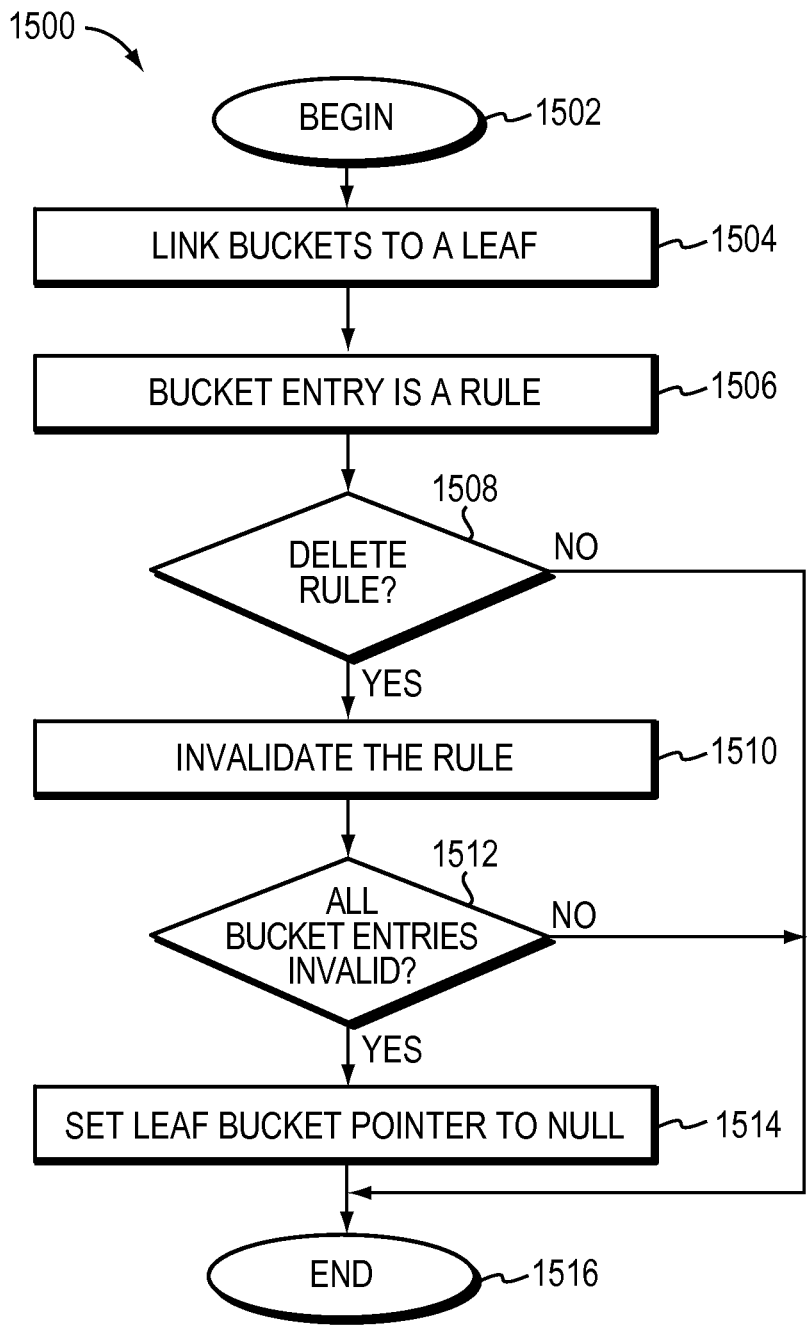
FIG. 15 is a flow diagram illustrating a method for atomically deleting a specified rule from the tree according to one embodiment.

FIG. 15 is a flow diagram illustrating a method for atomically deleting a specified rule from the tree, wherein a bucket entry of a bucket includes the specified rule (1500). The method begins (1502) and the bucket is linked to a leaf by a leaf bucket pointer (1504). The bucket includes a bucket entry that is the specified rule (1506). A check is made for deleting the specified rule (1508), if the rule is not being deleted the method ends (1516). If the specified rule is to be deleted, the specified rule in the bucket entry may be invalidated (1510). A check may then be made to determine if all bucket entries in the bucket are invalid (1512). If the bucket contains at least one valid entry the method ends (1516). If all bucket entries in the bucket are invalid, the link to the bucket may be updated by setting the leaf bucket pointer to null (1514). Invalidating the specified rule and updating the leaf bucket pointer to null take one update. In addition, the active search process may skip a bucket if the leaf bucket pointer is null.

Figure 16:
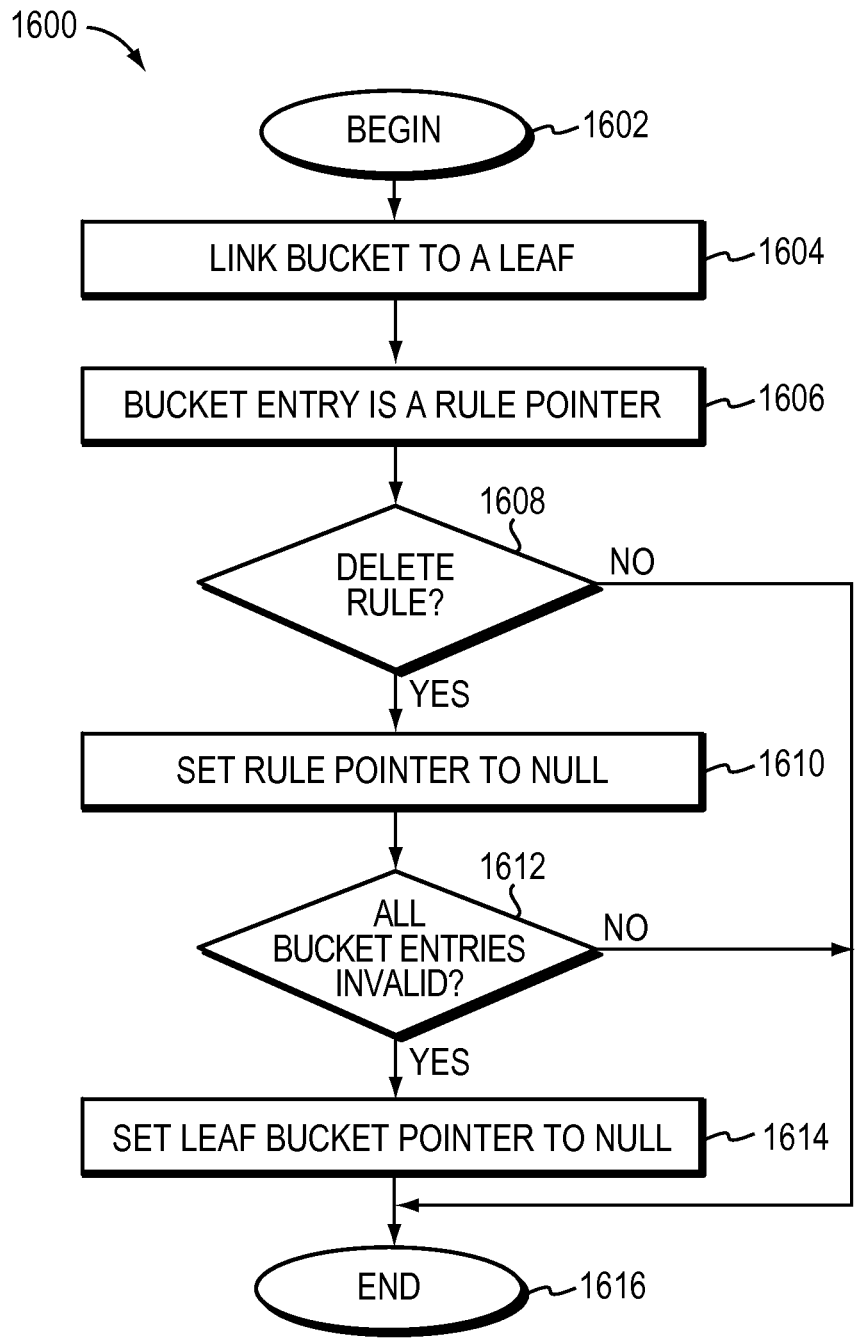
FIG. 16 is a flow diagram according to another embodiment of a method for atomically deleting a specified rule from the tree.

FIG. 16 is a flow diagram according to another embodiment of a method for atomically deleting a specified rule from the tree, wherein a bucket entry of a bucket includes a rule pointer pointing to the specified rule (1600). The method begins (1602) and the bucket is linked to a leaf by a leaf bucket pointer (1604). The bucket includes a bucket entry that is a rule pointer pointing to the specified rule (1606). A check is made for deleting the specified rule (1608), if the rule is not being deleted the method ends (1616). If the specified rule is to be deleted, the rule pointer is set to null (1610). A check may be made to determine if all bucket entries in the bucket are invalid (1612). If the bucket contains at least one valid entry the method ends (1616). If all bucket entries in the bucket are invalid, the link to the bucket may be updated by setting the leaf bucket pointer to null (1614). Setting the rule pointer to null and setting the leaf bucket pointer to null take one update, wherein the active search process skips null leaf bucket pointers and skips null rule pointers.

Figure 17:
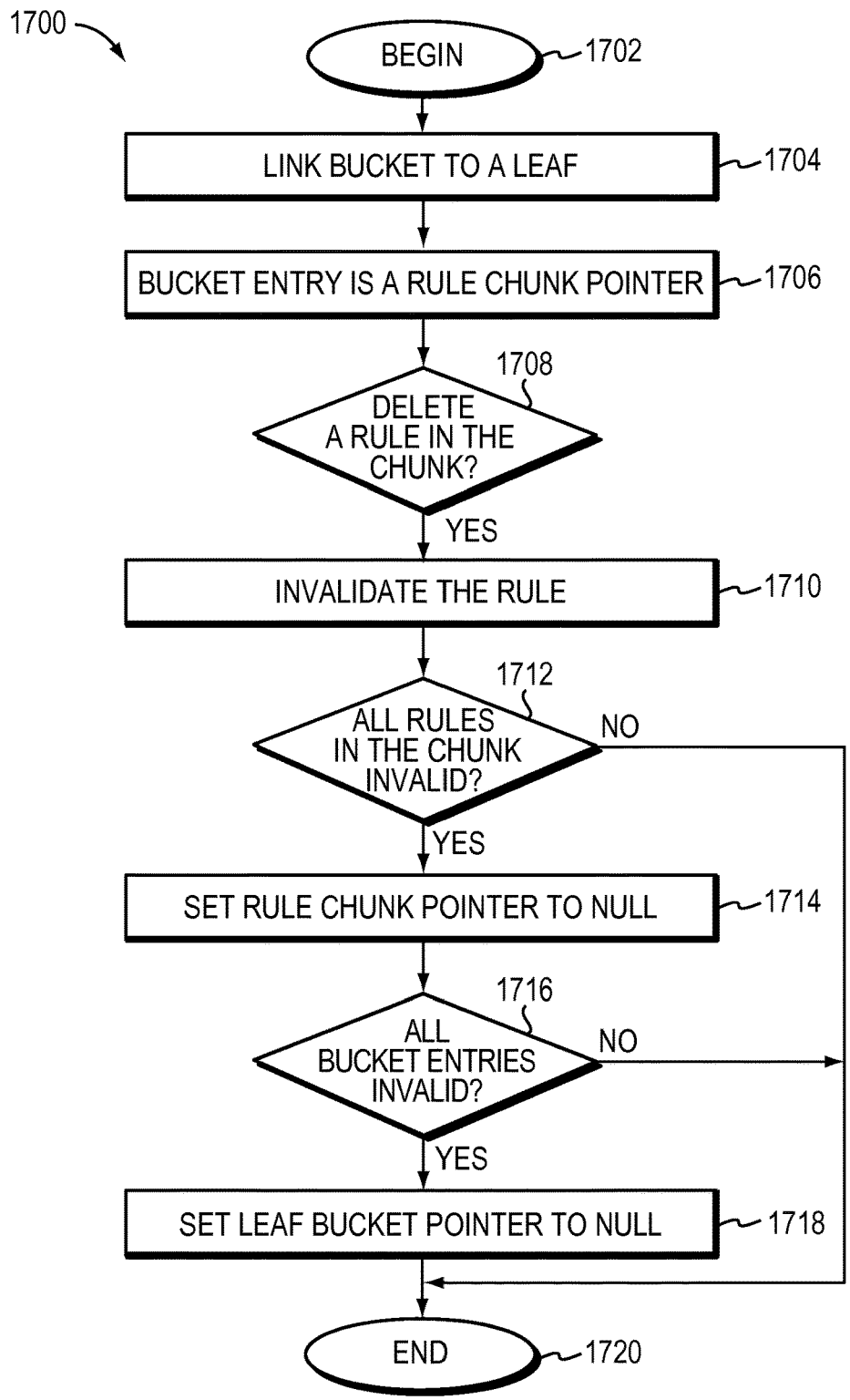
FIG. 17 is a flow diagram according to yet another embodiment of a method for atomically deleting a specified rule from the tree.

FIG. 17 is a flow diagram according to yet another embodiment of a method for atomically deleting a specified rule from the tree, wherein a bucket entry of a bucket includes a rule chunk pointer pointing to a set of one or more rules that includes the specified rule (1700). The method begins (1702) and the bucket is linked to a leaf by a leaf bucket pointer (1704). The bucket includes a bucket entry that is a rule chunk pointer that points to a set of rules that includes the specified rule (1706). A check is made for deleting the specified rule (1708). If the rule is not being deleted the method ends (1720). If the specified rule is to be deleted, the specified rule may be invalidated (1710). A check may be made to determine if all rules in the set are invalid (1712). If not, the method ends (1720. If all rules in the set are invalid, the rule chunk pointer may be set to null (1714). A check may be made to determine if all bucket entries in the bucket are invalid (1716). If the bucket contains at least one valid entry the method ends (1720). If all bucket entries in the bucket are invalid, the link to the bucket may be updated by setting the leaf bucket pointer to null (1718) and the method ends (1720). Invalidating the specified rule, setting the rule chunk pointer to null, and setting the leaf bucket pointer to null take one update. The active search process skips null leaf bucket pointers, null rule chunk pointers, invalid (e.g., invalidated) rules.

In adding, deleting, and modifying rules, nodes, as described above, node, leaves and/or buckets of a tree may be added, deleted, split, or merged. The tree may become less than optimal, in terms of depth and storage, compared to the tree when it was first compiled. For example, a tree may represent 100 rules. The tree of 100 rules may be divided into 4 leaves/nodes and result on average, in 25 rules per leaf/node. Rules may be deleted and two or more buckets may be merged as described in embodiments herein. A merge may reduce the number leaves/nodes from 4 to 3 and result on average, in 33 rules per leaf/node. One or more sub-trees may be formed. To "improve" the tree, in terms of depth and storage, after incremental updating, a portion of the tree or subtree may be recompiled.

Recompiling a subtree, according to one embodiment, called "adaptive adjustment of tree" includes tracking the number of updates that occur with a counter at each node of the tree. For example, the housekeeping tree 220 may include and maintain the update counter. For a given node, a ratio may be determined from the number of updates tracked for the given node and the number of rules represented by the given node. When this ratio for a given node is greater than a value (which may be preconfigured or dynamically configured, for example, by feedback mechanism), a subtree of the given node may be recompiled.

Figure 18:
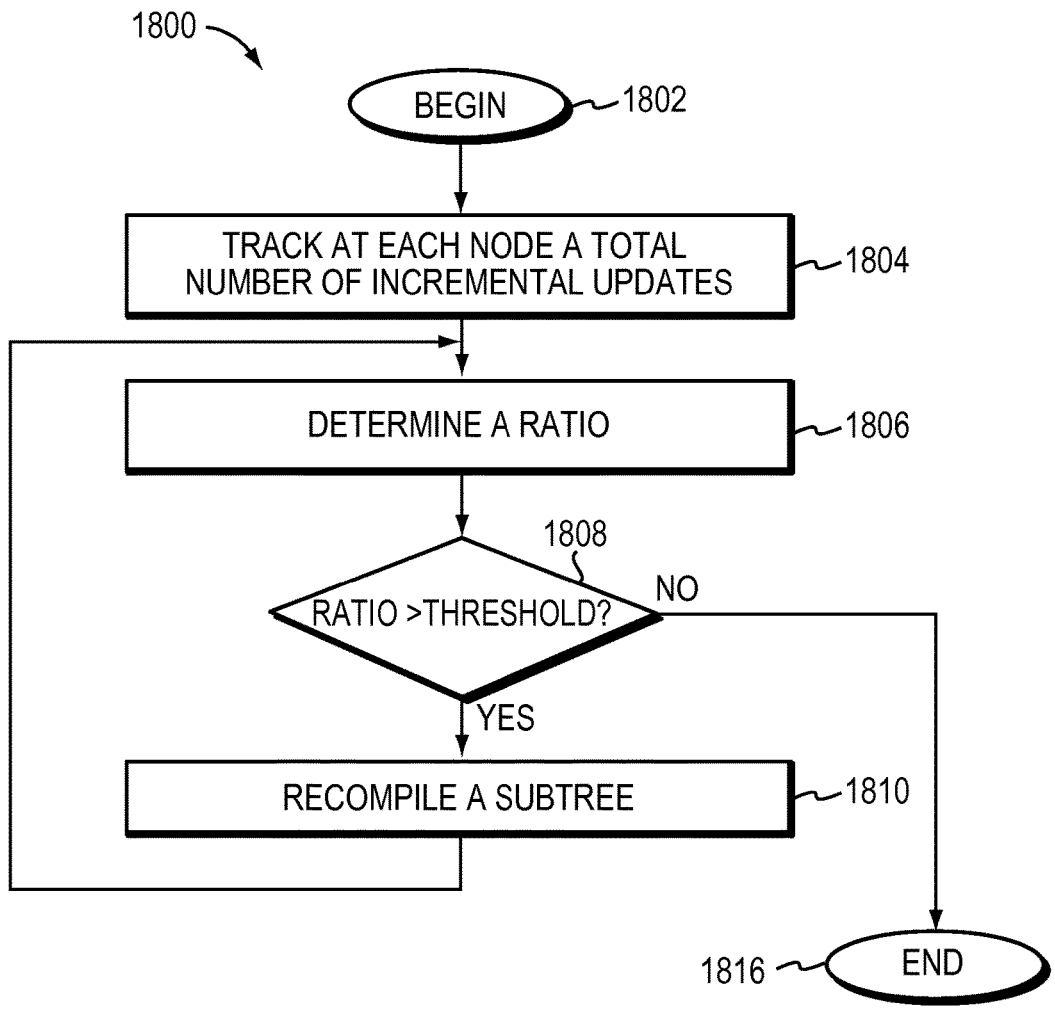
FIG. 18 is a flow diagram of a method for adaptive adjustment of the tree according to one embodiment.

FIG. 18 is a flow diagram of a method (1800) for adaptive adjustment of the tree according to one embodiment. The method begins (1802). At each node a total number of incremental updates may be tracked (1804). A ratio of the total number to a number of rules represented by the given node may be determined (1806). A check may be made to determine if the ratio is greater than the threshold. If the ratio is less than or equal to the threshold the method ends (1816). If the ratio is greater than the threshold the tree may be adjusted by recompiling a subtree (1810) and a ratio of the total number of incremental updates tracked for the given node to a number of rules represented by the given node since a last recompilation may be again be determined (1806) and the method may continue as described above. FIG. 19A illustrates an incremental update according to another embodiment for adding a rule (1900). In the example embodiment, a rule may be added by appending the rule and its priority to the rule table, replacing an invalidated rule with a new rule, and adding the rule to a bucket. As shown, the incremental update may include read modify write operations (RMW).

FIG. 19B illustrates an incremental update according to another embodiment for splitting a leaf into a node and leaves (1902). In the example embodiment splitting a leaf into a node and leaves may include creating a node, finding or creating new buckets, creating an array of leaves under the node created, creating an array of leaf indices under the node created, and finding or creating unique leaves.

FIG. 19C illustrates an incremental update according to another embodiment for adding a bucket to a node (1904). In the example embodiment, adding a bucket to a node may include replacing a hole in the node/leaf array with a new leaf, replacing a hole in the array of leaf indices with a new leaf index, creating a new array containing the new leaf, finding or creating a new unique leaf, creating a new array containing a new leaf index, updating the node with a new hash mask, and finding or creating a bucket with a specified rule list.

FIG. 19D illustrates an incremental update according to another embodiment for recompiling a subtree (1906). In the example embodiment, recompiling a subtree may include updating a root node of the subtree, updating a pointer to the root of the tree, and creating a node and an array.

FIG. 19E illustrates an incremental update according to another embodiment for deleting a rule (1908). In the example embodiment, deleting a rule may include invalidating a rule, removing the rule from all buckets that may reference it, marking the leaf as empty, and shrinking the node/leaf array.

FIG. 19F illustrates an incremental update according to another embodiment for modifying a rule (1910). In the example embodiment, modifying the rule may include setting a rule definition to an intersection of old and new versions and setting the rule definition to the new version.

FIG. 19G illustrates an incremental update according to another embodiment for defragmentation (1912). In the example embodiment, defragmentation may include copying an array of nodes and leaves, copying arrays of nodes and leaf indices, updating a node child pointer to point to the new array, copying a bucket, and updating leaves to point to the new bucket (e.g., the bucket copy).

Figure 20:
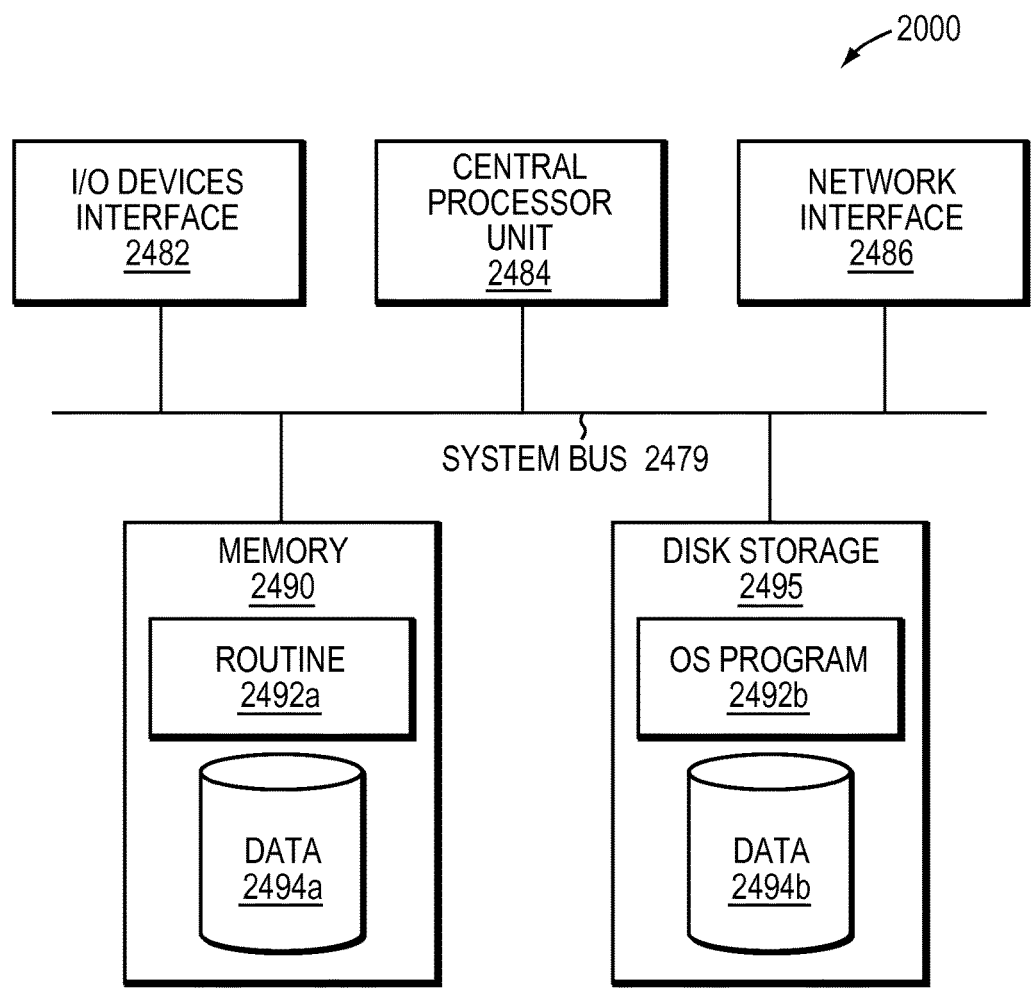
FIG. 20 is a block diagram of a computer in which various embodiments disclosed herein may be implemented.

FIG. 20 is a block diagram of the internal structure of a computer 2000 in which various embodiments of the present invention may be implemented. The computer 2000 contains system bus 2479, where a bus is a set of hardware lines used for data transfer among the components of a computer or processing system. Bus 2479 is essentially a shared conduit that connects different elements of a computer system (e.g., processor, disk storage, memory, input/output ports, network ports, etc.) that enables the transfer of information between the elements. Attached to system bus 2479 is I/O device interface 2482 for connecting various input and output devices (e.g., keyboard, mouse, displays, printers, speakers, etc.) to the computer 2000. Network interface 2486 allows the computer 2000 to connect to various other devices attached to a network. Memory 2490 provides volatile storage for computer software instructions 2492a and data 2494a. Disk storage 2495 provides non-volatile storage for computer software instructions 2492b and data 2494b. Central processor unit 2484 is also attached to system bus 2479 and provides for the execution of computer instructions.

The processor routines 2492a-b and data 2494a-b are a computer program product, including a computer readable medium (e.g., a removable storage medium, such as one or more DVD-ROM's, CD-ROM's, diskettes, tapes, etc.) that provides at least a portion of the software instructions for embodiments of the invention system. Computer program product 2492a-b may be installed by any suitable software installation procedure, as is well known in the art. In another embodiment, at least a portion of the software instructions may also be downloaded over a cable, communication and/or wireless connection.

Further, embodiments of the present invention may be implemented in a variety of computer architectures. The general computer of FIG. 20 is for purposes of illustration and not limitation of any techniques disclosed herein.

Figure 21A:
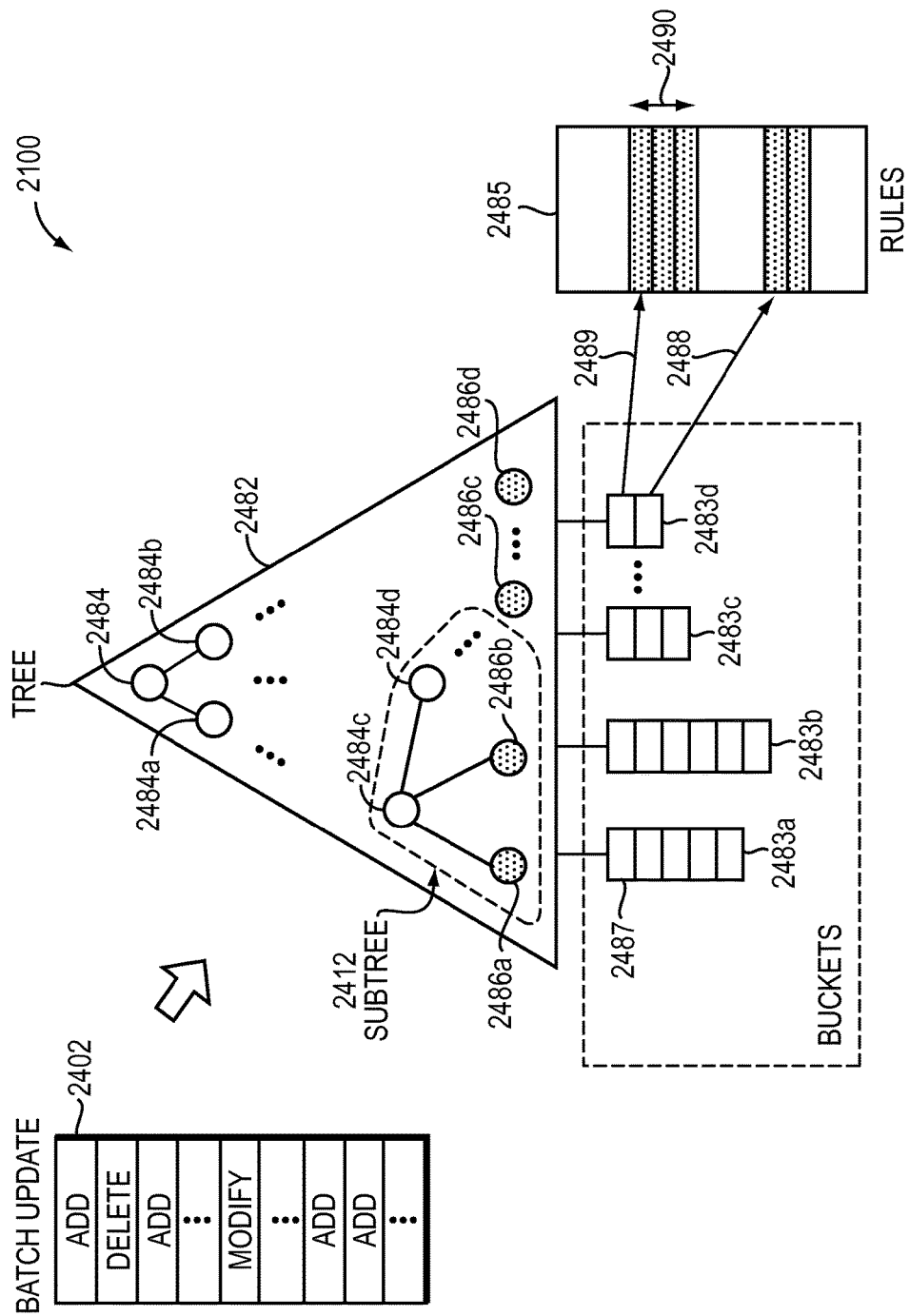
FIG. 21A is a diagram of an example embodiment of a decision tree data structure including another example embodiment of a decision tree, buckets, and rules.

FIG. 21A is a diagram of an example embodiment of a decision tree data structure 2100 including another example embodiment of a decision tree 2482, buckets 2483a-d, and rules (2485). The decision tree 2482 may include a plurality of nodes representing a plurality of rules 2485 used for packet classification. For example, the decision tree 2482 may include a root node 2484, nodes 2484a-d, and leaf nodes 2486a-d. Each node may represent a subset of a plurality of the rules 2485. Each node may have a leaf node type or a non-leaf node type. Each node having the leaf node type may be referred to herein as a leaf node or a leaf.

Each node having the non-leaf node type may be cut on one or more selected bits of a selected one or more fields of at least one field of a rule, creating one or more child nodes. For example, the root node 2484 may be cut, creating child nodes 2484a and 2484b. The one or more child nodes created may have the non-leaf node type or the leaf node type. Each node cut may also be referred to herein as a parent node of the one or more child nodes created. For example, a parent node of child nodes 2484a and 2484b may be the root node 2484. The parent of node of child nodes 2486a, 2486b, and 2484d may be 2484c. Child nodes created may represent one or more rules of the parent node. Child nodes having a same parent may be referred to herein as siblings. For example, nodes 2486a, 2486b, and 2484d are siblings as each has the same parent node (e.g., node 2484c). Nodes 2484a and 2484b are siblings as each has the same parent node (e.g., node 2484).

Each node having the leaf node type may be linked to a bucket. The bucket may represent the subset of the plurality of rules represented by the leaf node. For example, each leaf node 2486a-d of the tree 2482 points to a bucket, such as 2483a-d. Each bucket may include one or more bucket entries 2487. A leaf node may include bucket information that may be used to locate the bucket entries or a bucket list of entries. A bucket entry may be a pointer to rule (2488), or a pointer (2489) to a set of rules (2490). The decision tree 2482 may include multiple subtrees, such as subtree 2412.

While the search processor searches for one or more rules that match keys (e.g., the search processor is performing an active search process) in a decision tree, such as the decision tree 2482, there may be a need to apply a plurality of incremental updates to the decision tree, such as the plurality of incremental updates of a batch update 2402. The batch update 2402 is an example of a plurality of incremental updates, the plurality may be any number of incremental updates and may be of any type (e.g., add, delete, or modify) or order. By receiving the plurality of incremental updates as a batch update a number of benefits may be recognized according to embodiments disclosed herein. Such benefits may also apply to category subtrees that are also decision trees as described below.

Figure 21B:
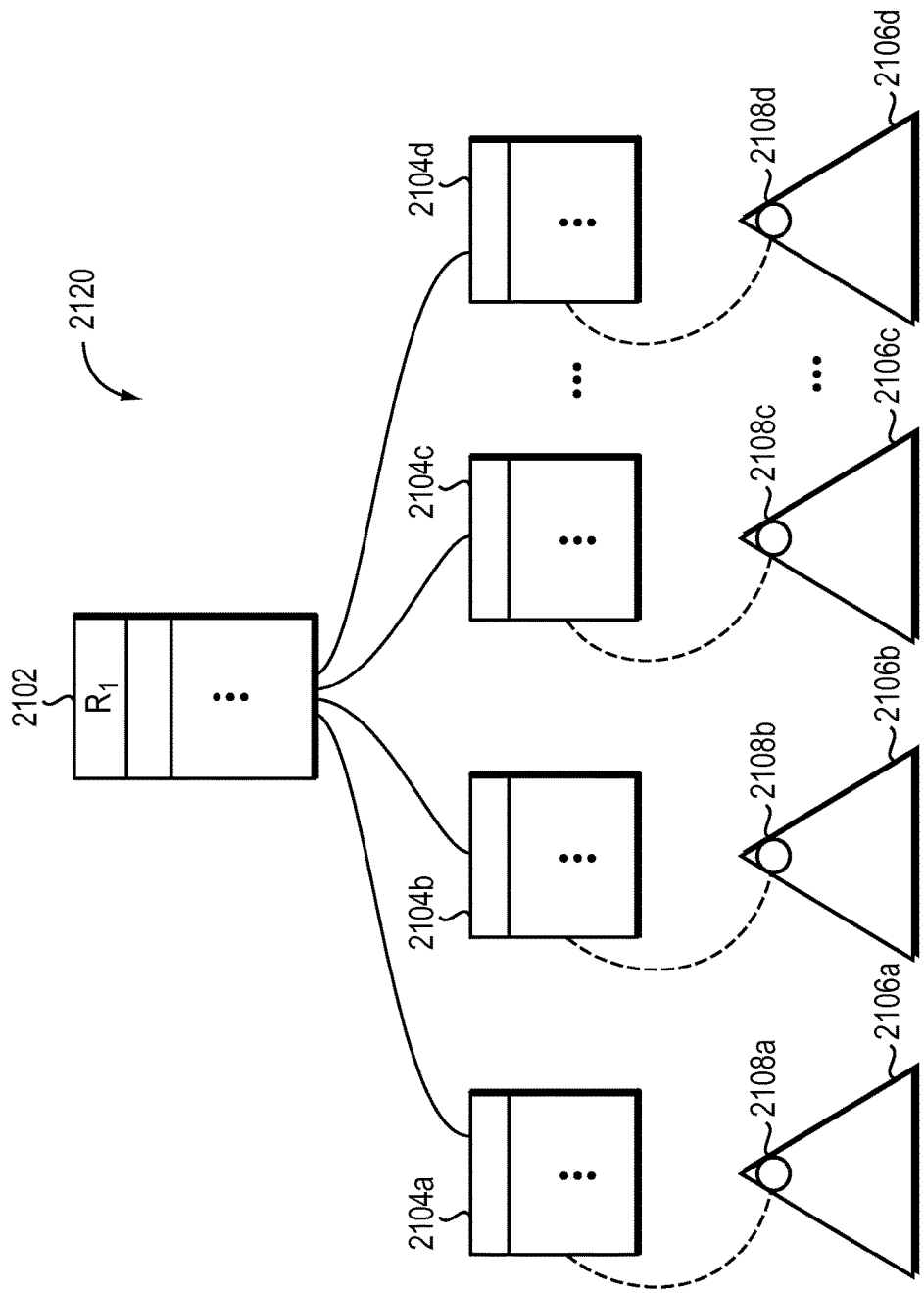
FIG. 21B is a block diagram of an example embodiment of category subtrees.

FIG. 21B is a block diagram (2120) of an example embodiment of category subtrees. According to embodiments disclosed herein, a classifier table including a plurality of rules for packet classification may be parsed into categories of rules and decision trees may be built for each category. The rules of the classifier table may be separated into categories in any suitable manner. A decision tree that represents a set of rules of a category may be referred to herein as a category subtree.

The block diagram 2120 includes a rule database 2102 including a plurality of rules, such as the plurality of rules of a classifier table. Rule lists 2104a-d may each include a subset of rules from the rule database 2102 and represent the set of rules for category subtrees. According to one embodiment, each subset may be a unique subset. Each of the rule lists 2104a-d may represent a set of rules for an associated decision tree, such as the category subtrees 2106a-d. For example, each of the category subtrees 2106a-d may have a corresponding root node 2108a-d that represents the plurality of rules 2104a-d for its corresponding category subtree 2106a-d.

As the category subtrees 2106a-d are being searched, a need for updating one or more rules of a category subtree may arise. A batch update, such as the batch update 2402 of FIG. 21A may be received for a category subtree similar to receiving the batch update 2402 for the decision tree 2482. Category subtrees 2106a-d may each have an associated housekeeping tree as described above. Alternatively, a single housekeeping tree may be associated with the category subtrees 2106a-d.

By receiving the plurality of incremental updates as a batch update a number of benefits may be recognized such as reducing a number of operations needed to apply the plurality of incremental updates as a batch as compared to another number of operations for applying the plurality of incremental updates on an incremental basis. Thus, performance may be improved by receiving a batch update including a plurality of incremental updates as opposed to receiving each of the plurality of incremental updates on an incremental basis.

For example, by receiving the plurality of incremental updates as a batch update, a context of all changes needed may reduce a number of memory allocate and free operations. A batch update including a plurality of incremental rule updates provides a context that enables a reduced size of a changeset (also referred to herein as a change list). By providing a collective set of a plurality of incremental updates, embodiments disclosed herein may determine a reduced set of updates for the RCDS. Thus, a number of accesses to a device (e.g., a data plane apparatus 226) storing the RCDS as a decision tree or category subtree, may be reduced.

As described above, a sibling list of a node may require updates based on an incremental update. For example, adding a rule to a child may cause a number of rules represented by the child to exceed a threshold, thus, the sibling list may need to be updated to split the child into one or more other children.

Figure 21C:
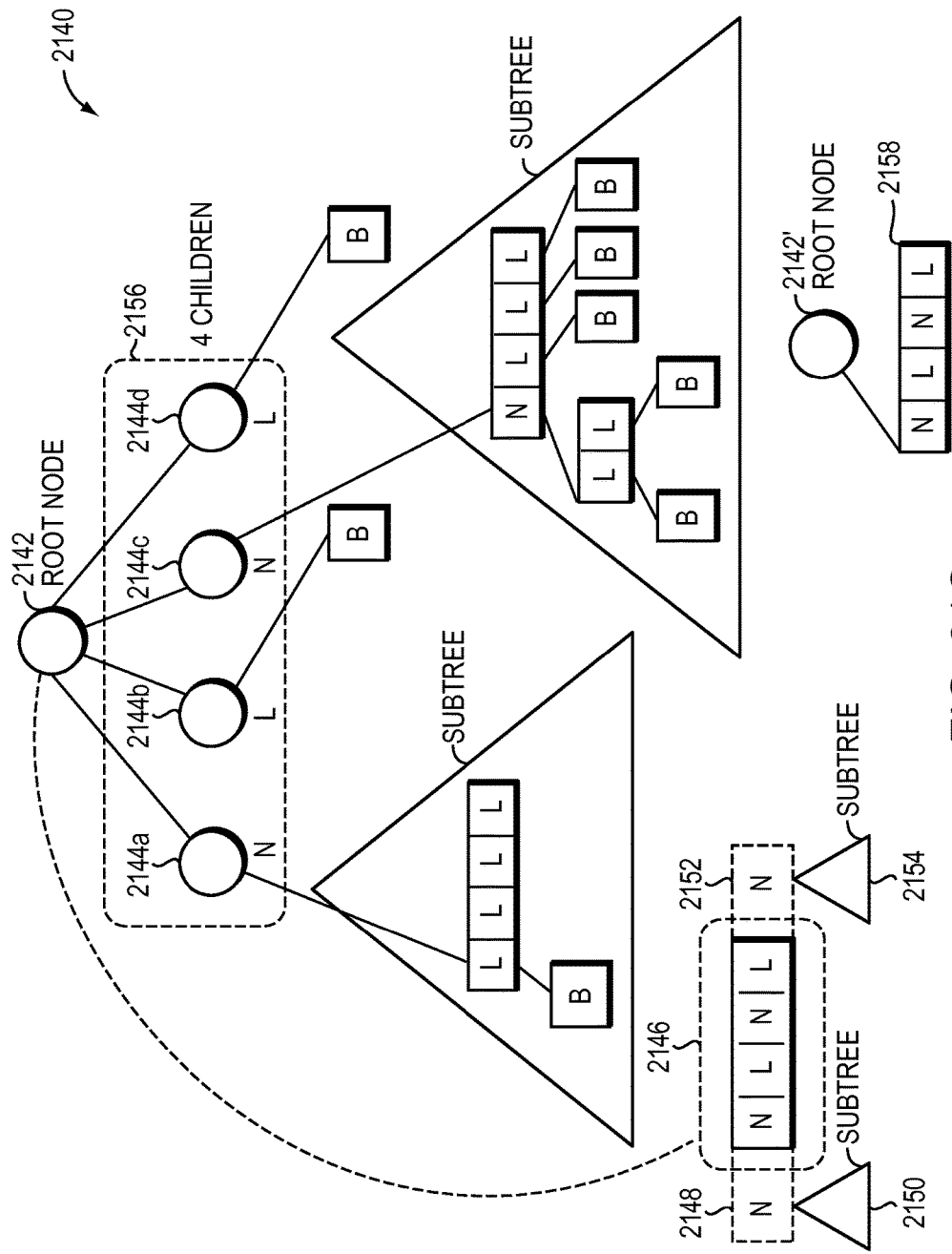
FIG. 21C is a block diagram of an example embodiment of a sibling list being updated.

FIG. 21C is a block diagram of an example embodiment of a sibling list being updated (2140). A root node 2142 may have four children 2144a-d. A sibling list 2146 of the root node 2142 may include the four children that may be node 2144a, leaf 2144b, node 2144c, and leaf 2144d. Two incremental updates may be received on an incremental basis. The first incremental update may cause a new node 2148 to be added to the sibling list 2146 as well as a subtree 2150 below the node 2148. A second incremental update may cause a new node 2152 to be added to the sibling list 2146 as well as a subtree 2154 below the node 2152.

Such updates may require operations such as allocation of a copy of the old sibling list 2146 to create a new sibling list (not shown) including the four children 2156 and the new nodes 2148 and 2152. Operations such as linking the new nodes to the subtrees 2150 and 2154, operations to link the new sibling list to the root node 2142, and operations to free the old sibling list 2146 may be needed as a result of the multiple incremental updates. A third incremental update may be received causing another sibling list update 2158 for the root node 2142 that may be include the same four children 2156 as in the original sibling list 2146. Further operations may be needed to update the root node's sibling list back to the original sibling list.

In contrast, by receiving a batch update including the multiple incremental updates, an affect of the multiple incremental updates on each other may be taken into account and, as result, a batch incremental update including the same first, second, and third incremental updates may recognize the affect resulting in no sibling list update, thus reducing operations as compared to receiving the incremental updates on an incremental basis.

In order to update the sibling list, a node's sibling list may be re-allocated and re-hashed or re-compressed. By receiving a batch update including a plurality of incremental updates, embodiments disclosed herein may avoid re-allocation, re-hashing, or re-compressing of sibling lists in some cases.

For example, if a child is added to the sibling list it may be added to empty locations in a hashed or compressed table for the sibling list. An existing hash mask may be used to compress new children enabling existing children to occupy a same location of the hashed or compressed table. By enabling an existing hash mask (e.g., a hash mask indicating null and non-null children in a sibling list) to remain intact in some cases, a batch incremental update provides a benefit by avoiding a computationally intensive function, such as a hash function.

A number of operations triggered by the plurality of incremental updates included in the batch update received may be less than another number of operations triggered by the plurality of incremental updates received on an incremental basis. For example, adding a rule may trigger a number of operations.

For example, adding a rule may convert a leaf to a node because the additional rule causes a number of rules of the leaf to exceed a threshold. Adding a rule may trigger a subtree to rebuild because a number of incremental updates tracked for a node increases such that the increase causes a ratio for the node to exceed a given threshold for the node. Further, adding a rule may result in a cover list update for a rule of the node. For example, the rule being added may be of higher priority relative to other rules of the node resulting in the lower priority rules being removed from the node and adding the lower priority rules to the cover list for the rule.

By receiving a plurality of incremental updates as a batch update, the performance for applying the overall update including the plurality of the incremental updates may be improved because a number of operations performed may be reduced. For example, if priorities for multiple rules are being updated, a context for determining a final priority order of the rules may be used to update the rules with less operations than may be needed by receiving the plurality of priority updates on an incremental basis. Each priority update received incrementally may cause re-ordering of the rules to maintain a priority order of the rules. In contrast, a batch update enables one re-ordering update to be applied based as a final priority order of the rules that may be determined since a context for all priority changes to the rules may be understood from the batch update received.

As described above, adding a rule may result in a leaf node exceeding a threshold for a number of rules for the leaf node (e.g., a number of rules for the bucket of the leaf node). By receiving a batch update, embodiments disclosed herein may avoid converting the leaf node to a node (e.g., a subtree) if an add rule causes the number of rules for the leaf node to exceed a threshold. By receiving the batch update, a delete rule operation following an add rule operation may be taken into account, enabling a determination that conversion of the leaf node to a node (e.g., a subtree) is not needed, thus, avoiding operations triggered by an alternative non-batch update (e.g., receiving the plurality of incremental updates on an incremental basis).

As such, several operations that may be performed as a result of an incremental update, such as an add rule operation, that may be implemented more efficiently based on a batch update received, may include a) adding rules to a leaf and possibly turning it into a subtree, b) rebuilding a subtree because the number of updates exceeds a threshold, c) updating a cover list at a node or bucket, and d) determining which children of a node need to be updated.

Figure 21D:
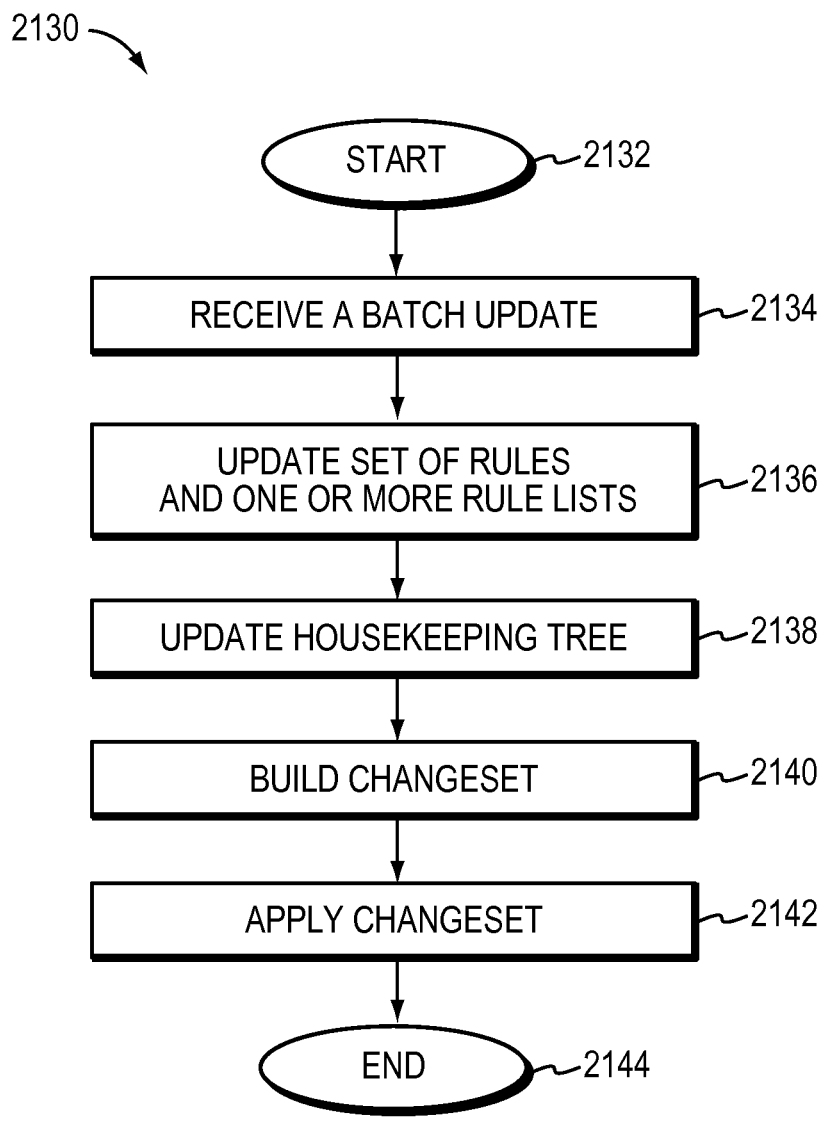
FIG. 21D is a flow diagram of an example embodiment of a method for an incremental batch update.

FIG. 21D is a flow diagram of an example embodiment of a method for an incremental batch update (2130). The method may begin (2132) and receive a batch update including a plurality of incremental updates for a Rule Compiled Data Structure (RCDS) representing a decision tree for a set of rules used for packet classification (2134). The RCDS may be utilized for packet classification by an active search process. The method may update the set of rules and one or more rule lists based on the batch update received (2136). Each of the one or more rule lists may be a subset of the set of rules associated with a category subtree of a housekeeping tree. The housekeeping tree may be an augmented representation of the RCDS. The method may update the housekeeping tree associated with each category subtree associated with the one or more rule lists updated (2138). The method may build a changeset specifying one or more modifications to the RCDS based on the housekeeping tree updated (2140). The method may apply the changeset built to the RCDS in a manner enabling the RCDS to atomically incorporate the plurality of incremental updates from the perspective of the active search process utilizing the RCDS (2142) and the method thereafter ends (2144) in the example embodiment.

Figure 22:
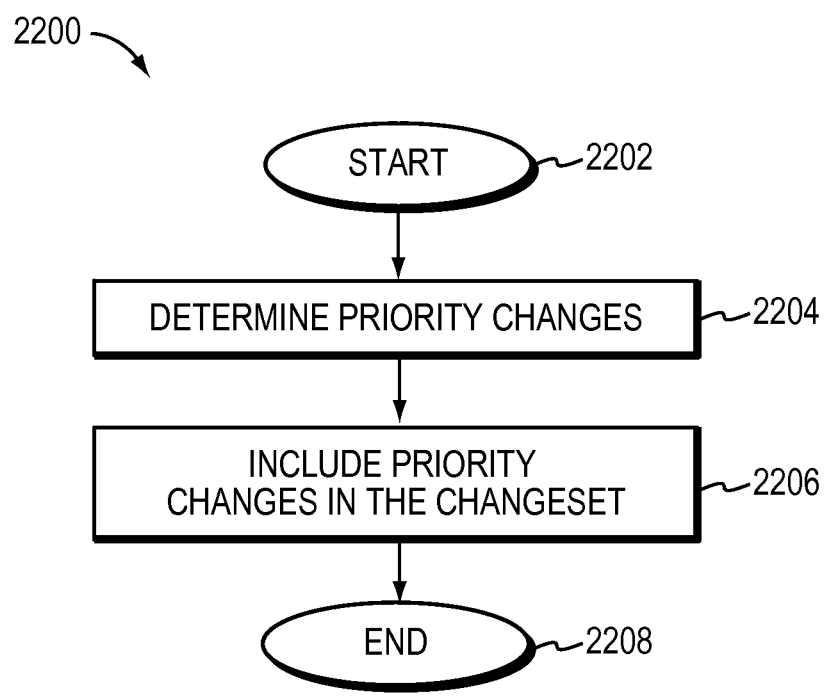
FIG. 22 is a flow diagram of an example embodiment of a method for a building a changeset.

FIG. 22 is a flow diagram of an example embodiment of a method for a building a changeset. The method may begin (2202) and determine one or more rule priority changes based on the batch update received (2204). The method may include the one or more rule priority changes determined in the changeset built (2206) and the method thereafter ends (2208) in the example embodiment.

Figure 23:
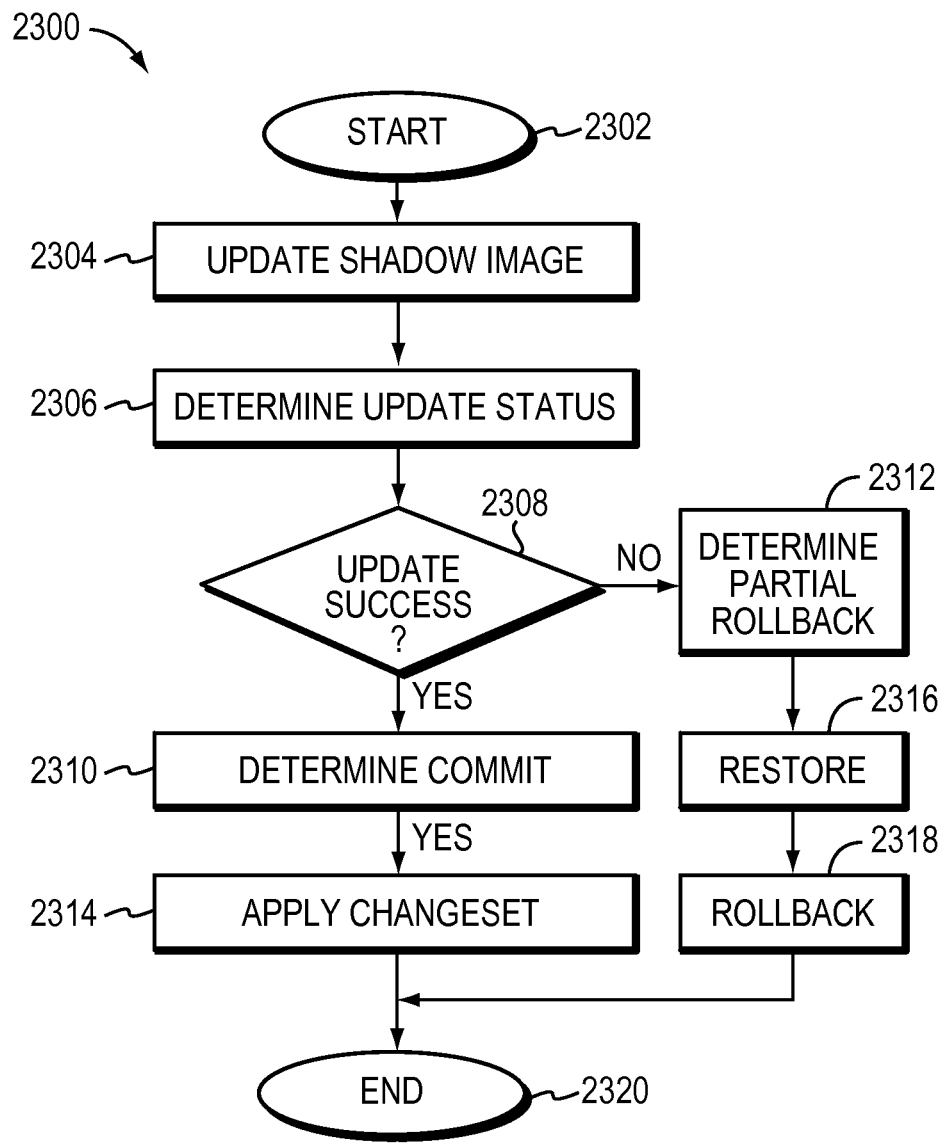
FIG. 23 is a flow diagram of another example embodiment of a method for a batch update.

FIG. 23 is a flow diagram of another example embodiment of a method for a batch update (2300). The method may begin (2302) and update a shadow image based on the changeset built (2304). The shadow image may reflect current resources being held by the RCDS and changes to the current resources being held based on the one or more modifications to the RCDS specified. The shadow image may maintain counters, such as rule counters, or other suitable counters that enable rollback. The shadow image may be a software copy of the RCDS that includes a free and allocated pool. The shadow image may include status, such as executed or pending status, for operations associated with the RCDS.

The method may determine an update status indicating success or failure for one or more updates to the housekeeping tree and the shadow image (2306). The method may check if the update status indicates success (2308). If yes, the method may determine a commit action (2310) and apply the changeset built to the RCDS (2314) and the method thereafter ends (2320) in the example embodiment. If no, the method may determine a partial rollback action (2312) and restore the set of rules and the one or more rule lists by backing out updates made based on the batch update received (2316).

The partial rollback action may include restoring the housekeeping tree and the shadow image by rolling back the changeset, preventing the applying of the changeset built to the RCDS, and deleting the changeset built (2318) and the method thereafter ends (2320) in the example embodiment.

The housekeeping tree may be rolled back bottom up (e.g., first buckets, then leaves, then nodes, on up to the root), or in any order. Rollback may updating (add/delete) rules directly in a bucket database (e.g., no shadow copy). By checking and adding new buckets to the bucket database directly, duplicates buckets may be avoided. All changes to the leaves and nodes may be stored in the changeset.

A changeset may be defined as a set of changes where each change includes at least: a location to be changed (e.g., a pointer to a location), the old value, and the new value. Whenever a leaf or node needs to be updated, its location, old and new value may be added to the changeset and the new value may be written to the location. If an update fails at some sub-tree in the tree, then all or a partial set of the changes added to the changeset may be rolled back by writing the old values to the location. If all updates succeed, the changeset may be freed.

If a bucket is added by the housekeeping tree, memory may be allocated for it and the data may be prepared for it. The data may be held on host (not shown) until the housekeeping module commits the update. If the bucket is deleted, the associated memory may be freed, but not released to a free pool. The memory may be released to the free pool only at the time of commit.

If a leaf or node is updated, memory for it may be allocated (if needed) and the leaf or node data may be prepared for it. The data may be held on the host (not shown) until the housekeeping module commits the update. An order of the updates for rollback may be maintained to enable a search perform on the data to either read the old data or the new data. If an update fails, as may be the case due to lack of resources, such as memory, then all data prepared and freed may be ignored. Newly allocated memory may be freed back to the pool. If an update succeeds, writes may be issued to the device in the order they were added and the freed memory may be released to the pool.

Figure 24:
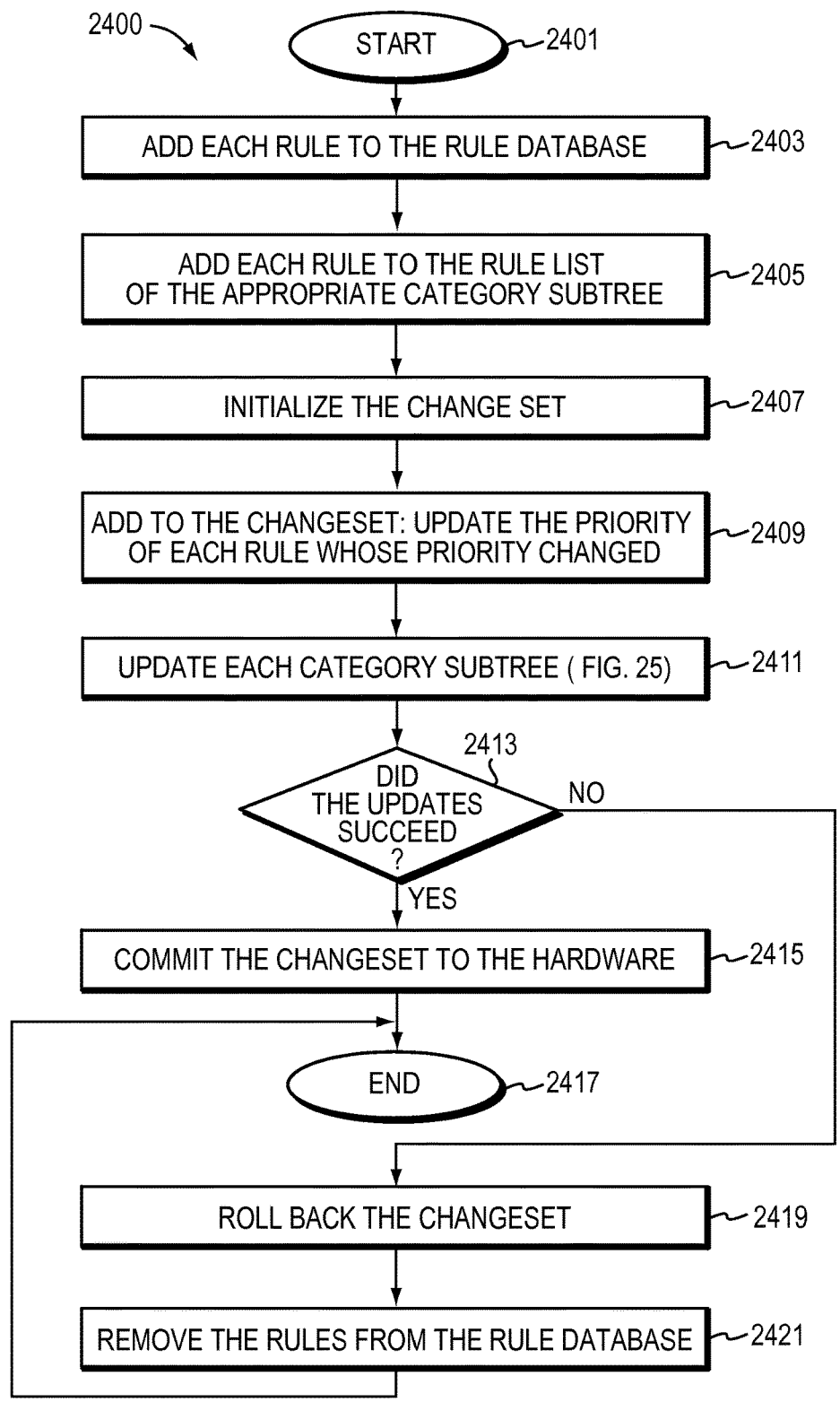
FIG. 24 is a flow diagram of an example embodiment of a method for receiving a plurality add rule operations in a batch update.

FIG. 24 is a flow diagram of an example embodiment of a method for receiving a plurality add rule operations in a batch update (2400). The method may begin (2401) and add each rule to a rule database (2403). The method may add each rule to a rule list of an appropriate category subtree (2405). The method may initialize a changeset (2407). The method may add to the changeset an update of priority for rule having a priority change (2409).

The method may update each category subtree (2411). The method may check if all updates succeeded (2413). If yes, the method may commit the changeset to hardware (e.g., the RCDS being actively searched) and the method thereafter ends (2417) in the example embodiment. If no, the method the method may roll back the changeset (2419) and remove the rules from the rule database (2421) and the method thereafter ends (2417) in the example embodiment.

Figure 25:
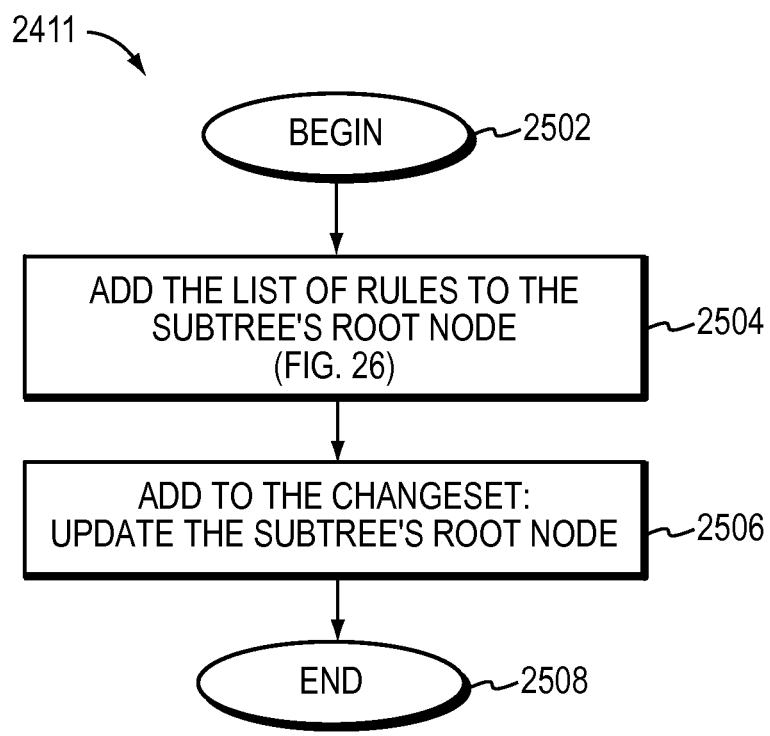
FIG. 25 is a flow diagram of an example embodiment of a method for updating each category subtree.

FIG. 25 is a flow diagram of an example embodiment of a method for updating each category subtree (2411). The method may begin (2502) and add the list of rules to the category subtree's root node (2504). The method may add to the changeset and update for the subtree's root node (2506) and the method thereafter ends (2508) in the example embodiment.

Figure 26:
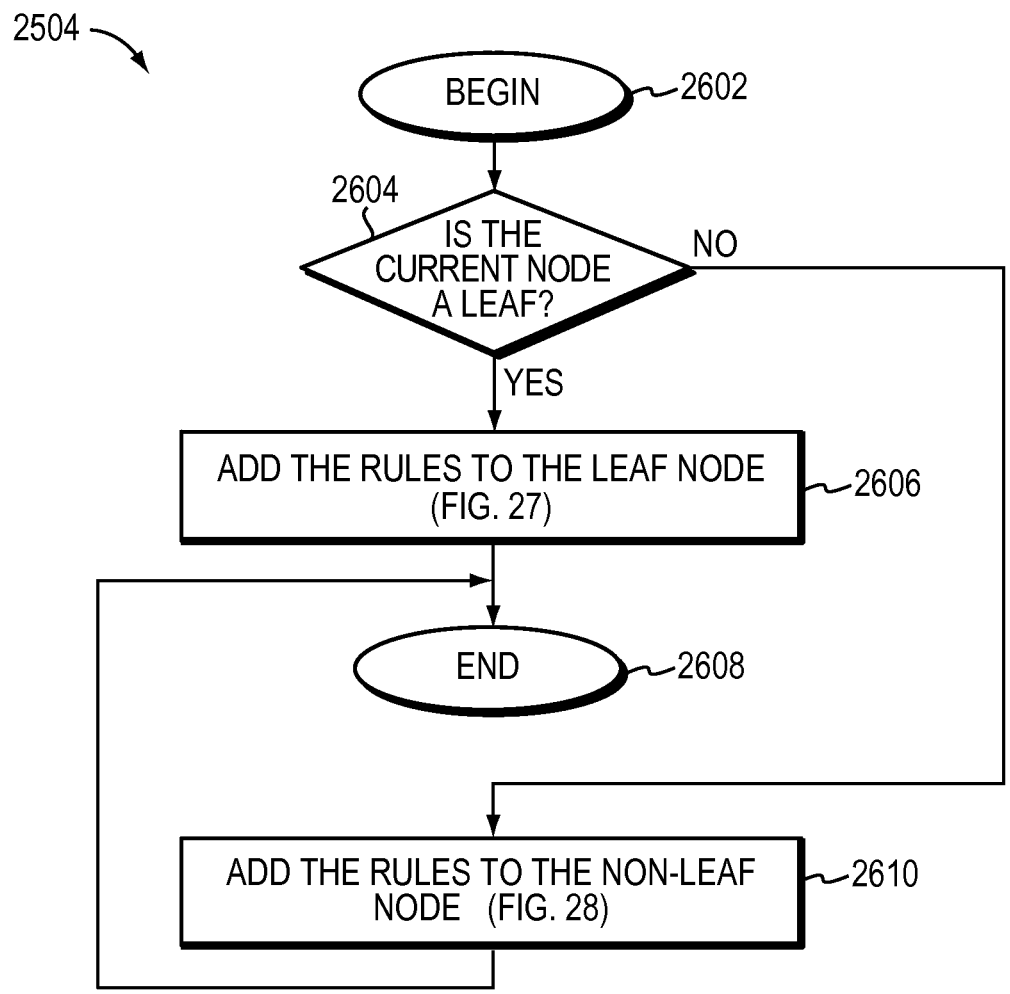
FIG. 26 is a flow diagram of an embodiment of a method for adding the list of rules to a subtree's root node.

FIG. 26 is a flow diagram of an embodiment of a method for adding the list of rules to a subtree's root node (2504). The method may begin (2602) and check if a current node is a leaf (2604). If yes, the method may add the rules to the leaf node (2606) and the method thereafter ends (2608) in the example embodiment. If no, the method may add the rules to the non-leaf node (2610) and the method thereafter ends (2608) in the example embodiment.

Figure 27:
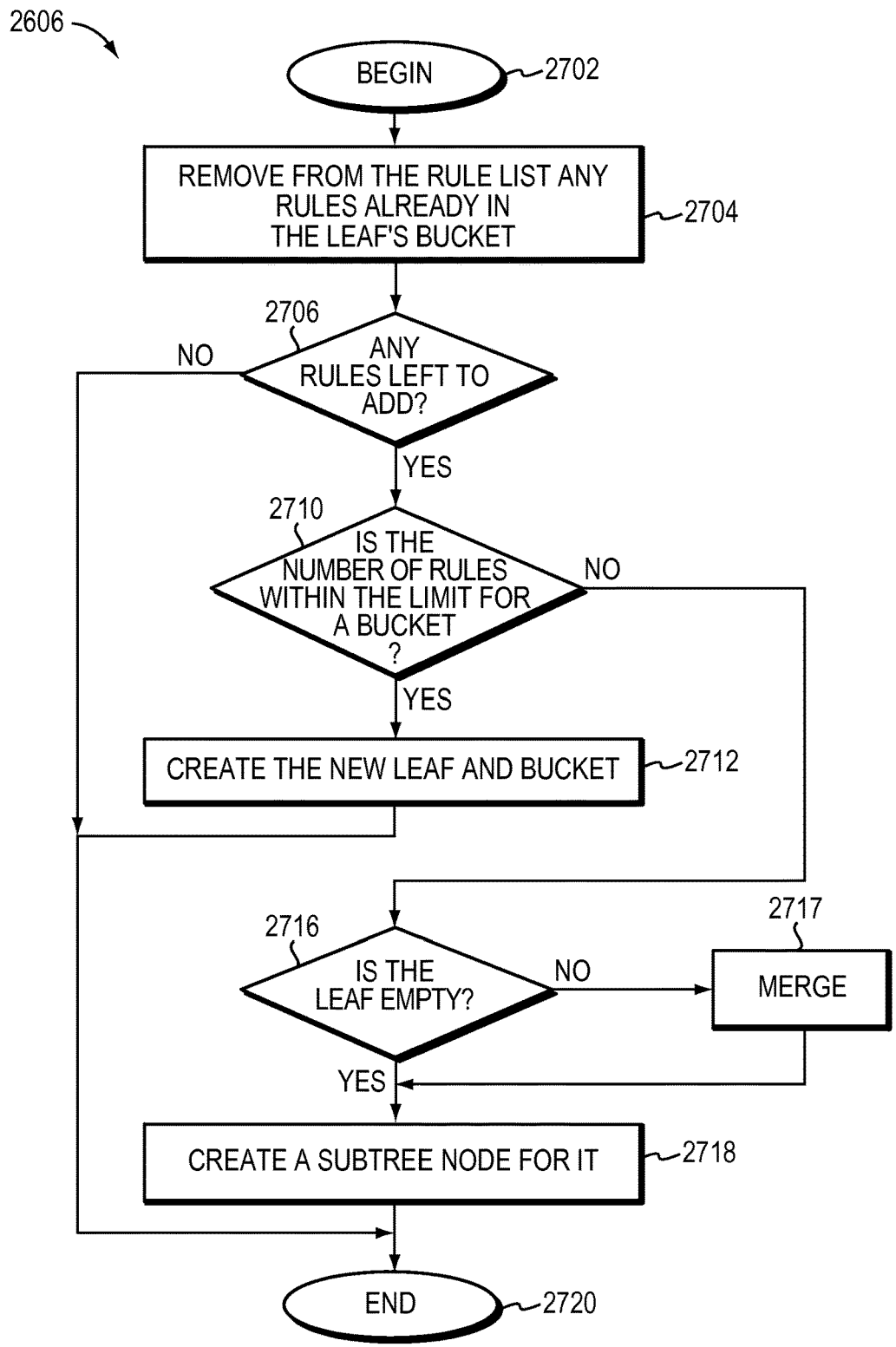
FIG. 27 is a flow diagram of an example embodiment of a method for adding rules to a leaf node.

FIG. 27 is a flow diagram of an example embodiment of a method for adding rules to a leaf node (2606). The method begins (2702) and removes from the rule list any rules already in the leaf node's bucket (2704). The method may check if any rules are left to add (2706). If no, the method thereafter ends (2720) in the example embodiment. If yes, the method may check if the number of rules is within the limit of a bucket (2710). If yes, the method may create the new leaf and the bucket (2712) and the method thereafter ends (2720) in the example embodiment. If no, the method may check if the leaf is empty (2716). If the leaf is empty, the method may create a subtree node and any nodes below it (2718) as disclosed by FIG. 9 (908) of the method (900) disclosed above, and the method thereafter ends (2720) in the example embodiment. If the leaf is not empty, the method may merge the leaf's list of rules with the list of rules to be added (2717), create a subtree node and any nodes below it (2718) as disclosed by FIG. 9 (908) of the method (900), and the method thereafter ends (2720) in the example embodiment.

Figure 28:
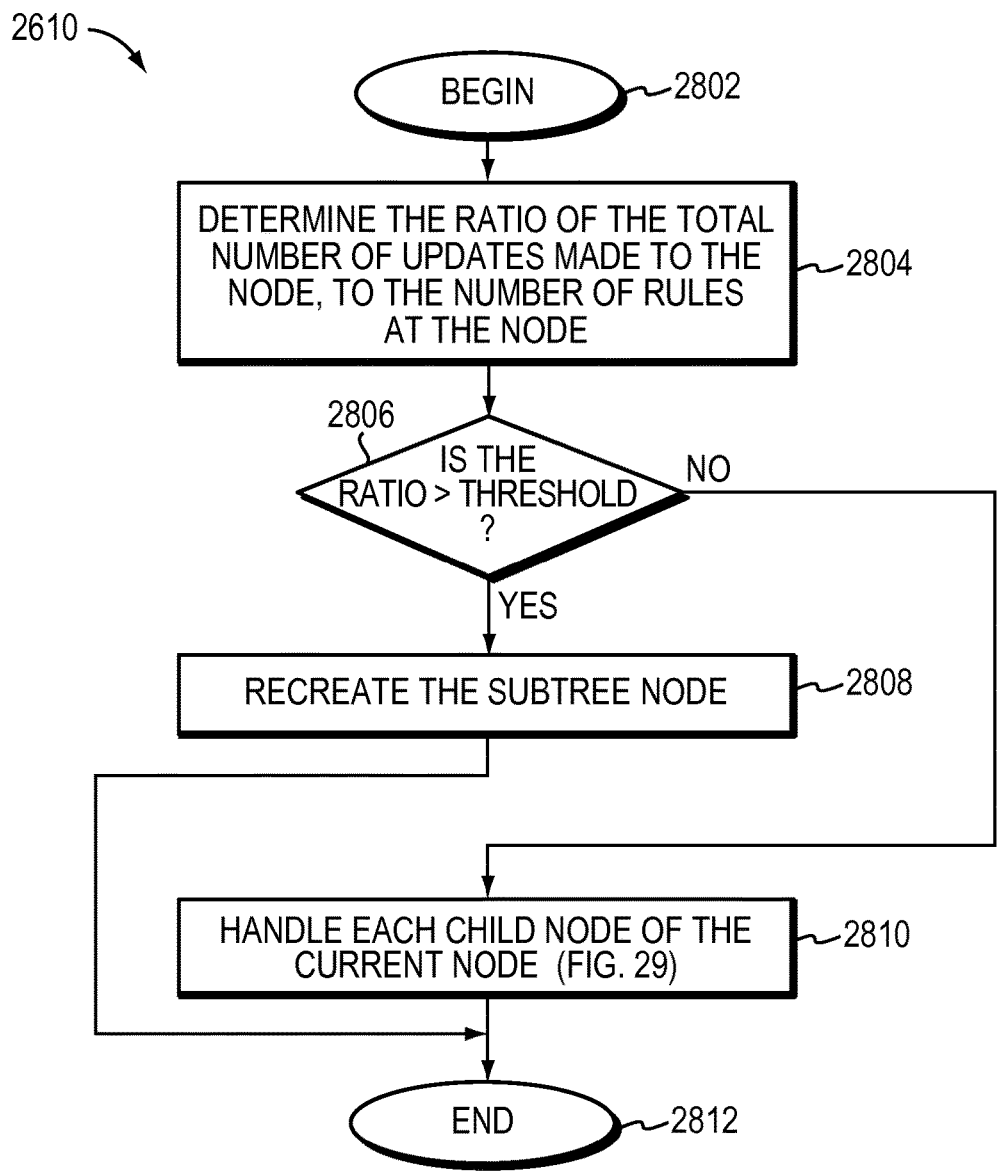
FIG. 28 is a flow diagram of an example embodiment of a method for adding rules to a non-leaf node.

FIG. 28 is a flow diagram of an example embodiment of a method for adding rules to a non-leaf node (2610). The method may begin (2802) and determine a ratio of a total number of updates made to the non-leaf node to a total number of rules at the non-leaf node (2804). The method may check if the ratio is greater than a given threshold (2806). If yes, the method may recreate a subtree node and any nodes below it (2808) as disclosed by FIG. 9 (908) of the method (900) disclosed above, and the method thereafter ends (2812) in the example embodiment. If no, the method may handle each child node of the non-leaf node according to the example embodiment of a method disclosed by FIG. 29 below and the method thereafter ends (2812) in the example embodiment.

Figure 29:
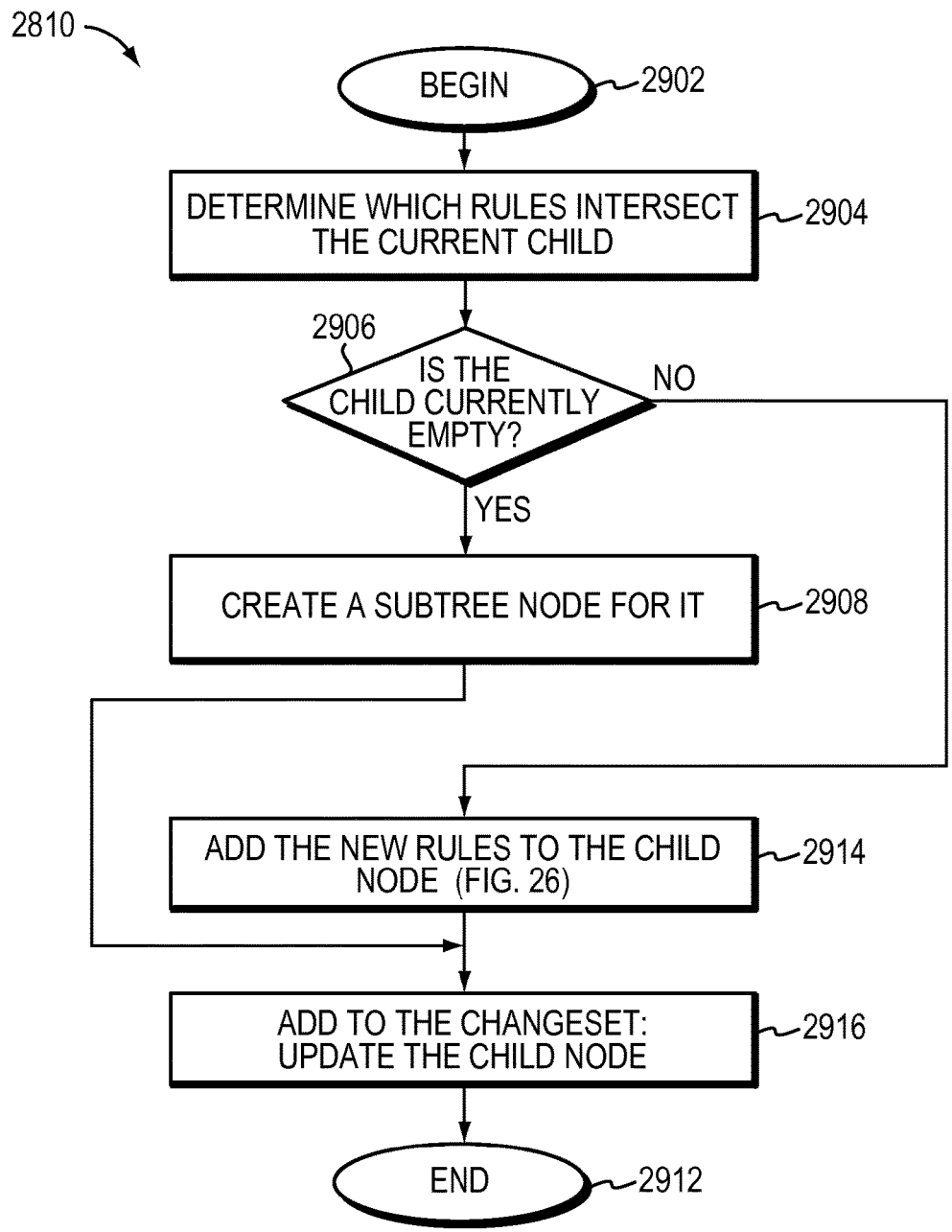
FIG. 29 is a flow diagram of an example embodiment of a method for handling each child node of a node with a ratio exceeding a given threshold.

FIG. 29 is a flow diagram of an example embodiment of a method for handling each child node of a node with a ratio not exceeding a given threshold (2810). The method may begin (2902) and determine which rules intersect a given child node (2904). A check may be made for whether or not the given child node is empty (2906). If the child is empty, the method may create a subtree node and any nodes below it (2908) as disclosed by FIG. 9 (908) of the method (900) disclosed above, add to the changeset to update the child node (2916) and the method thereafter ends (2912) in the example embodiment. If the child is not empty, the method may add the new rules to the given child node as disclosed by FIG. 26 above, add to the changeset to update the child node (2916) and the method thereafter ends (2912) in the example embodiment.

While this invention has been particularly shown and described with references to example embodiments thereof, it will be understood by those skilled in the art that various changes in form and details may be made therein without departing from the scope of the invention encompassed by the appended claims.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

As will be appreciated by one skilled in the art, techniques disclosed herein may be embodied as a system, method or computer program product. Accordingly, techniques disclosed herein may take the form of an entirely hardware embodiment, an entirely software embodiment (including firmware, resident software, micro-code, etc.) or an embodiment combining software and hardware aspects that may all generally be referred to herein as a "unit," "module," or "system."

It should be understood that the block diagrams may include more or fewer elements, be arranged differently, or be represented differently. It should be understood that implementation may dictate the block and flow diagrams and the number of block and flow diagrams illustrating the execution of techniques disclosed herein.

What is claimed is:

1. A method comprising:
  receiving a batch update including a plurality of incremental updates for a Rule Compiled Data Structure (RCDS) representing a decision tree for a set of rules used for packet classification, the RCDS being utilized for packet classification by an active search process;
  updating the set of rules and one or more rule lists based on the batch update received, each of the one or more rule lists being a subset of the set of rules associated with a category subtree of a housekeeping tree, the housekeeping tree being an augmented representation of the RCDS separate from the RCDS;
  updating the housekeeping tree associated with each category subtree associated with the one or more rule lists updated and building a changeset specifying one or more modifications to the RCDS based on the housekeeping tree updated;
  updating a shadow image based on the changeset built and determining an update status based on one or more updates to the shadow image and the housekeeping tree, the shadow image reflecting current resources being held by the RCDS and changes to the current resources being held based on the one or more modifications to the RCDS specified and the update status indicating success or failure for the one or more updates to the housekeeping tree and the shadow image;

determining a commit or partial rollback action based on the update status, the commit action being determined given the update status indicates success and the partial rollback action being determined given the update status indicates failure; and in an event the commit action is determined, applying the changeset built to the RCDS in a manner enabling the RCDS to atomically incorporate the plurality of incremental updates from the perspective of the active search process utilizing the RCDS.

2. The method of claim 1 wherein a number of operations triggered by the plurality of incremental updates included in the batch update received is less than another number of operations triggered by the plurality of incremental updates received on an incremental basis.

3. The method of claim 1 wherein applying the changeset built to the RCDS includes issuing a number of instructions to a device and the number of instructions and a size of the changeset built are reduced in comparison to a cumulative number of instructions and a cumulative changeset size, the cumulative number of instructions and the cumulative changeset size corresponding to the plurality of incremental updates being received on an incremental basis.

4. The method of claim 1 further comprising:
determining one or more rule priority changes based on the batch update received; and
including the one or more rule priority changes determined in the changeset built.

5. The method of claim 1 wherein applying the changeset built to the RCDS is dependent on the commit action being determined.

6. The method of claim 1 wherein the partial rollback action includes:
restoring the set of rules and the one or more rule lists by backing out updates made based on the batch update received;
restoring the housekeeping tree and the shadow image by rolling back the changeset;
preventing the applying of the changeset built to the RCDS; and
deleting the changeset built.

7. The method of claim 6 wherein restoring the housekeeping tree by rolling back the changeset includes:
restoring at least one bucket directly in a bucket database;
restoring leaf nodes linked to the at least one bucket being restored; and
restoring nodes linked to the leaf nodes being restored.

8. The method of claim 6 wherein restoring the shadow image by rolling back the changeset includes freeing memory allocated based on updating the shadow image.

9. The method of claim 1 wherein the decision tree includes a plurality of nodes, each node representing one or more rules of the set of rules and having a leaf node type or a non-leaf node type, each node having the leaf node type being a leaf node linked to a bucket representing rules of the leaf node, and the one or more modifications specified by the changeset include changes to one or more of the plurality of nodes, each change including a location, old value, and new value associated with the change.

10. The method of claim 1 wherein the batch update received includes an add, delete, or modify rule operation, or a combination thereof.

11. The method of claim 1 wherein applying the changeset built to the RCDS in the manner enabling the RCDS to atomically incorporate the plurality of incremental updates includes:
enabling a given search of the active search process to view the RCDS in either a before state or an after state, the before state being a state of the RCDS before receiving the batch update for the RCDS, the after state being another state of the RCDS having the series of one or more updates based on the changeset incorporated in the RCDS, the after state being made visible to the given search based on a single update to the RCDS being searched.

12. The method of claim 1 wherein updating the housekeeping tree associated with each category subtree associated with the one or more rule lists updated includes:
adding a new rule based on the batch incremental update including an add rule operation;
deleting an existing rule based on the batch incremental update including a delete rule operation; and
modifying the existing rule based on the batch incremental update including a modify rule operation, wherein modifying the existing rule includes at least one of: modifying a priority of the existing rule or modifying at least one field of the existing rule.

13. The method of claim 12, wherein modifying the priority of the existing rule includes:
identifying a priority fit conflict based on a change in priority of the existing rule being inconsistent with a current priority ordering of the existing rule and one or more other rules;
modifying the priority of the existing rule based on the priority fit conflict not being identified; and
modifying the priority of the existing rule and priority of another rule based on the conflict being identified.

14. The method of claim 12, wherein modifying at least one field of the existing rule includes:
determining whether one or more rules need to be added or deleted; and
adding or deleting the one or more rules.

15. The method of claim 1, wherein the decision tree includes a plurality of nodes, each node representing one or more rules of the set of rules and the batch incremental update received includes add, delete, or modify operations, the method of claim 1 further comprising:
including a cover list of rules for each rule of a node in the housekeeping tree;
building the changeset specifying one or more rules to add, delete, or modify based on the batch incremental update received and the cover list; and
updating the cover list based on the changeset determined.

16. An apparatus comprising:
a memory;
a processor coupled to the memory, the processor configured to:
receive a batch update including a plurality of incremental updates for a Rule Compiled Data Structure (RCDS) representing a decision tree for a set of rules used for packet classification, the RCDS being utilized for packet classification by an active search process;
update the set of rules and one or more rule lists based on the batch update received, each of the one or more rule lists being a subset of the set of rules associated with a category subtree of a housekeeping tree, the housekeeping tree being an augmented representation of the RCDS separate from the RCDS;

update the housekeeping tree associated with each category subtree associated with the one or more rule lists updated and building a changeset specifying one or more modifications to the RCDS based on the housekeeping tree updated;

update a shadow image based on the changeset built and determine an update status based on one or more updates to the shadow image and the housekeeping tree, the shadow image reflecting current resources being held by the RCDS and changes to the current resources being held based on the one or more modifications to the RCDS specified, the update status indicating success or failure for the one or more updates to the housekeeping tree and the shadow image;

determine a commit or partial rollback action based on the update status, the commit action being determined given the update status indicates success and the partial rollback action being determined given the update status indicates failure; and in an event the commit action is determined, apply the changeset built to the RCDS in a manner enabling the RCDS to atomically incorporate the plurality of incremental updates from the perspective of the active search process utilizing the RCDS.

17. The apparatus of claim 16 wherein the processor is further configured to perform a number of operations triggered by the plurality of incremental updates included in the batch update received that is less than another number of operations triggered by the plurality of incremental updates received on an incremental basis.

18. The apparatus of claim 16 wherein to apply the changeset built to the RCDS the processor is further configured to issue a number of instructions to a device and the number of instructions and a size of the changeset built are reduced in comparison to a cumulative number of instructions and a cumulative changeset size, the cumulative number of instructions and the cumulative changeset size corresponding to the plurality of incremental updates being received on an incremental basis.

19. The apparatus of claim 16 wherein the processor is further configured to:
determine one or more rule priority changes based on the batch update received; and
include the one or more rule priority changes determined in the changeset built.

20. The apparatus of claim 16 wherein whether or not to apply the changeset built to the RCDS is dependent on the commit action being determined.

21. The apparatus of claim 16 wherein to perform the partial rollback action the processor is further configured to:
restore the set of rules and the one or more rule lists by backing out updates made based on the batch update received;
restore the housekeeping tree and the shadow image by rolling back the changeset;
prevent the applying of the changeset built to the RCDS; and
delete the changeset built.

22. The apparatus of claim 21 wherein to restore the housekeeping tree by rolling back the changeset the processor is further configured to:
restore at least one bucket directly in a bucket database;
restore leaf nodes linked to the at least one bucket being restored; and
restore nodes linked to the leaf nodes being restored.

23. The apparatus of claim 21 wherein to restore the shadow image by rolling back the changeset the processor is further configured to free memory allocated based on updating the shadow image.

24. The apparatus of claim 16 wherein the decision tree includes a plurality of nodes, each node representing one or more rules of the set of rules and having a leaf node type or a non-leaf node type, each node having the leaf node type being a leaf node linked to a bucket representing rules of the leaf node, and the one or more modifications specified by the changeset include changes to one or more of the plurality of nodes, each change including a location, old value, and new value associated with the change.

25. The apparatus of claim 16 wherein the batch update received includes an add, delete, or modify rule operation, or a combination thereof.

26. The apparatus of claim 16 wherein to apply the changeset built to the RCDS in the manner enabling the RCDS to atomically incorporate the plurality of incremental updates the processor is further configured to:
enable a given search of the active search process to view the RCDS in either a before state or an after state, the before state being a state of the RCDS before receiving the batch update for the RCDS, the after state being another state of the RCDS having the series of one or more updates based on the changeset incorporated in the RCDS, the after state being made visible to the given search based on a single update to the RCDS being searched.

27. The apparatus of claim 16 wherein to update the housekeeping tree associated with each category subtree associated with the one or more rule lists updated the processor is further configured to:
add a new rule based on the batch incremental update including an add rule operation;
delete an existing rule based on the batch incremental update including a delete rule operation; and
modify the existing rule based on the batch incremental update including a modify rule operation, wherein modifying the existing rule includes at least one of: modifying a priority of the existing rule or modifying at least one field of the existing rule.

28. The apparatus of claim 27, wherein to modify the priority of the existing rule the processor is further configured to:
identify a priority fit conflict, the priority fit conflict being a change in priority of the existing rule that is inconsistent with a current priority ordering of the existing rule and one or more other rules;
modify the priority of the existing rule based on the priority fit conflict not being identified; and
modify the priority of the existing rule and priority of another rule based on the conflict being identified.

29. The apparatus of claim 27, wherein to modify at least one field of the existing rule the processor is further configured to:
determine whether one or more rules need to be added or deleted; and
add or delete the one or more rules.

30. The apparatus of claim 16, wherein the decision tree includes a plurality of nodes, each node representing one or more rules of the set of rules and the batch incremental update received includes add, delete, or modify operations, and the processor is further configured to:
include a cover list of rules for each rule of a node in the housekeeping tree;

build the changeset specifying one or more rules to add, delete, or modify based on the batch incremental update received and the cover list; and
update the cover list based on the changeset determined.

31. A non-transitory computer-readable medium having encoded thereon a sequence of instructions which, when loaded and executed by a processor, causes the processor to:
receive a batch update including a plurality of incremental updates for a Rule Compiled Data Structure (RCDS) representing a decision tree for a set of rules used for packet classification, the RCDS being utilized for packet classification by an active search process;
update the set of rules and one or more rule lists based on the batch update received, each of the one or more rule lists being a subset of the set of rules associated with a category subtree of a housekeeping tree, the housekeeping tree being an augmented representation of the RCDS separate from the RCDS;
update the housekeeping tree associated with each category subtree associated with the one or more rule lists updated and building a changeset specifying one or more modifications to the RCDS based on the housekeeping tree updated;
update a shadow image based on the changeset built and determine an update status based on one or more updates to the shadow image and the housekeeping tree, the shadow image reflects current resources being held by the RCDS and changes to the current resources being held based on the one or more modifications to the RCDS specified, the update status indicating success or failure for the one or more updates to the housekeeping tree and the shadow image;
determine a commit or partial rollback action based on the update status, the commit action being determined given the update status indicates success and the partial rollback action being determined given the update status indicates failure; and
in an event the commit action is determined, apply the changeset built to the RCDS in a manner enabling the RCDS to atomically incorporate the plurality of incremental updates from the perspective of the active search process utilizing the RCDS.

32. The non-transitory computer-readable medium of claim 31 wherein the sequence of instructions further causes the processor to perform a number of operations triggered by the plurality of incremental updates included in the batch update received that is less than another number of operations triggered by the plurality of incremental updates received on an incremental basis.

33. The non-transitory computer-readable medium of claim 31 wherein to apply the changeset built to the RCDS the sequence of instructions further causes the processor to issue a number of instructions to a device and the number of instructions and a size of the changeset built are reduced in comparison to a cumulative number of instructions and a cumulative changeset size, the cumulative number of instructions and the cumulative changeset size corresponding to the plurality of incremental updates being received on an incremental basis.

34. The non-transitory computer-readable medium of claim 31 wherein the sequence of instructions further causes the processor to:
determine one or more rule priority changes based on the batch update received; and
include the one or more rule priority changes determined in the changeset built.

35. The non-transitory computer-readable medium of claim 31 wherein whether or not to apply the changeset built to the RCDS is dependent on the commit action being determined.

36. The non-transitory computer-readable medium of claim 31 wherein to perform the partial rollback action the sequence of instructions further causes the processor to:
restore the set of rules and the one or more rule lists by backing out updates made based on the batch update received;
restore the housekeeping tree and the shadow image by rolling back the changeset;
prevent the applying of the changeset built to the RCDS; and
delete the changeset built.

37. The non-transitory computer-readable medium of claim 36 wherein to restore the housekeeping tree by rolling back the changeset the sequence of instructions further causes the processor to:
restore at least one bucket directly in a bucket database;
restore leaf nodes linked to the at least one bucket being restored; and
restore nodes linked to the leaf nodes being restored.

38. The non-transitory computer-readable medium of claim 36 wherein to restore the shadow image by rolling back the changeset the sequence of instructions further causes the processor to free memory allocated based on updating the shadow image.

39. The non-transitory computer-readable medium of claim 31 wherein the decision tree includes a plurality of nodes, each node representing one or more rules of the set of rules and having a leaf node type or a non-leaf node type, each node having the leaf node type being a leaf node linked to a bucket representing rules of the leaf node, and the one or more modifications specified by the changeset include changes to one or more of the plurality of nodes, each change including a location, old value, and new value associated with the change.

40. The non-transitory computer-readable medium of claim 31 wherein the batch update received includes an add, delete, or modify rule operation, or a combination thereof.

41. The non-transitory computer-readable medium of claim 31 wherein to apply the changeset built to the RCDS in the manner enabling the RCDS to atomically incorporate the plurality of incremental updates the sequence of instructions further causes the processor to:
enable a given search of the active search process to view the RCDS in either a before state or an after state, the before state being a state of the RCDS before receiving the batch update for the RCDS, the after state being another state of the RCDS having the series of one or more updates based on the changeset incorporated in the RCDS, the after state being made visible to the given search based on a single update to the RCDS being searched.

42. The non-transitory computer-readable medium of claim 31 wherein to update the housekeeping tree associated with each category subtree associated with the one or more rule lists updated the sequence of instructions further causes the processor to:
add a new rule based on the batch incremental update including an add rule operation;
delete an existing rule based on the batch incremental update including a delete rule operation; and
modify the existing rule based on the batch incremental update including a modify rule operation, wherein modifying the existing rule includes at least one of:

modifying a priority of the existing rule or modifying at least one field of the existing rule.

43. The non-transitory computer-readable medium of claim 42, wherein to modify the priority of the existing rule the sequence of instructions further causes the processor to:
identify a priority fit conflict, the priority fit conflict being a change in priority of the existing rule that is inconsistent with a current priority ordering of the existing rule and one or more other rules;
modify the priority of the existing rule based on the priority fit conflict not being identified; and
modify the priority of the existing rule and priority of another rule based on the conflict being identified.

44. The non-transitory computer-readable medium of claim 42, wherein to modify at least one field of the existing rule the sequence of instructions further causes the processor to:
determine whether one or more rules need to be added or deleted; and
add or delete the one or more rules.

45. The non-transitory computer-readable medium of claim 31, wherein the decision tree includes a plurality of nodes, each node representing one or more rules of the set of rules and the batch incremental update received includes add, delete, or modify operations, and the sequence of instructions further causes the processor to:
include a cover list of rules for each rule of a node in the housekeeping tree;
build the changeset specifying one or more rules to add, delete, or modify based on the batch incremental update received and the cover list; and
update the cover list based on the changeset determined.

\* \* \* \* \*